United States Patent
Crabtree et al.

(10) Patent No.: US 12,155,693 B1
(45) Date of Patent: Nov. 26, 2024

(54) RAPID PREDICTIVE ANALYSIS OF VERY LARGE DATA SETS USING THE DISTRIBUTED COMPUTATIONAL GRAPH

(71) Applicant: QOMPLX LLC, Reston, VA (US)

(72) Inventors: Jason Crabtree, Vienna, VA (US); Andrew Sellers, Monument, CO (US)

(73) Assignee: QOMPLX LLC, Reston, VA (US)

( * ) Notice: Subject to any disclaimer, the term of this patent is extended or adjusted under 35 U.S.C. 154(b) by 0 days.

(21) Appl. No.: 18/779,064

(22) Filed: Jul. 21, 2024

Related U.S. Application Data

(63) Continuation of application No. 18/582,519, filed on Feb. 20, 2024, which is a continuation of application No. 18/501,977, filed on Nov. 3, 2023, now Pat. No. 12,003,534, which is a continuation of application No. 17/974,257, filed on Oct. 26, 2022, now Pat. No. (Continued)

(51) Int. Cl.
*H04L 29/06* (2006.01)
*H04L 9/06* (2006.01)
*H04L 9/40* (2022.01)

(52) U.S. Cl.
CPC ........ *H04L 63/1466* (2013.01); *H04L 9/0643* (2013.01); *H04L 63/1416* (2013.01); *H04L 63/1425* (2013.01)

(58) Field of Classification Search
CPC .............. H04L 63/1466; H04L 9/0643; H04L 63/1416; H04L 63/1425; G06F 16/2477; G06F 9/5038
See application file for complete search history.

(56) References Cited

U.S. PATENT DOCUMENTS

| | | |
|---|---|---|
| 3,370,192 A | 2/1968 | Schwartz et al. |
| 5,669,000 A | 9/1997 | Jessen et al. |
| (Continued) | | |

FOREIGN PATENT DOCUMENTS

| | | |
|---|---|---|
| CA | 2930026 A1 | 5/2015 |
| WO | 2014159150 A1 | 10/2014 |
| (Continued) | | |

OTHER PUBLICATIONS

Chou, Jerry, et al. "Parallel index and query for large scale data analysis." Proceedings of 2011 international conference for high performance computing, networking, storage and analysis. 2011. (Year: 2011).*

(Continued)

*Primary Examiner* — Ka Shan Choy
(74) *Attorney, Agent, or Firm* — GALVIN PATENT LAW LLC; Brian R. Galvin

(57) ABSTRACT

A system for fully integrated collection of business impacting data, analysis of that data and generation of both analysis driven business decisions and analysis driven simulations of alternate candidate business actions has been devised and reduced to practice. This business operating system may be (Continued)

used to monitor and predictively warn of events that impact the security of business infrastructure and may also be employed to monitor client-facing services supported by both software and hardware to alert in case of reduction or failure and also predict deficiency, service reduction or failure based on current event data.

16 Claims, 30 Drawing Sheets

Related U.S. Application Data 11,818,169, which is a continuation of application No. 17/169,924, filed on Feb. 8, 2021, now Pat. No. 11,570,209, which is a continuation-in-part of application No. 15/837,845, filed on Dec. 11, 2017, now Pat. No. 11,005,824, which is a continuation-in-part of application No. 15/825,350, filed on Nov. 29, 2017, now Pat. No. 10,594,714, which is a continuation-in-part of application No. 15/725,274, filed on Oct. 4, 2017, now Pat. No. 10,609,079, which is a continuation-in-part of application No. 15/655,113, filed on Jul. 20, 2017, now Pat. No. 10,735,456, which is a continuation-in-part of application No. 15/616,427, filed on Jun. 7, 2017, now abandoned, and a continuation-in-part of application No. 15/237,625, filed on Aug. 15, 2016, now Pat. No. 10,248,910, which is a continuation-in-part of application No. 15/206,195, filed on Jul. 8, 2016, now abandoned, which is a continuation-in-part of application No. 15/186,453, filed on Jun. 18, 2016, now abandoned, which is a continuation-in-part of application No. 15/166,158, filed on May 26, 2016, now abandoned, which is a continuation-in-part of application No. 15/141,752, filed on Apr. 28, 2016, now Pat. No. 10,860,962, which is a continuation-in-part of application No. 15/091,563, filed on Apr. 5, 2016, now Pat. No. 10,204,147, and a continuation-in-part of application No. 14/986,536, filed on Dec. 31, 2015, now Pat. No. 10,210,255, and a continuation-in-part of application No. 14/925,974, filed on Oct. 28, 2015, now abandoned, said application No. 15/616,427 is a continuation-in-part of application No. 14/925,974, filed on Oct. 28, 2015, now abandoned.

(60) Provisional application No. 62/596,105, filed on Dec. 7, 2017.

(56) References Cited

U.S. PATENT DOCUMENTS

| | | | |
|---|---|---|---|
| 5,953,011 A | 9/1999 | Matsuoka | |
| 6,256,544 B1 | 7/2001 | Weissinger | |
| 6,477,572 B1 | 11/2002 | Elderton et al. | |
| 6,792,425 B2* | 9/2004 | Yagawa | G06Q 20/108 713/153 |
| 6,857,073 B2 | 2/2005 | French et al. | |
| 6,906,709 B1 | 6/2005 | Larkin et al. | |
| 7,072,863 B1 | 7/2006 | Phillips et al. | |
| 7,139,747 B1 | 11/2006 | Najork | |
| 7,171,515 B2 | 1/2007 | Ohta et al. | |
| 7,222,366 B2 | 5/2007 | Bruton, III et al. | |
| 7,227,948 B2 | 6/2007 | Ohkuma et al. | |
| 7,266,821 B2 | 9/2007 | Polizzi et al. | |
| 7,281,125 B2 | 10/2007 | Challener et al. | |
| 7,310,632 B2 | 12/2007 | Meek et al. | |
| 7,373,524 B2 | 5/2008 | Motsinger et al. | |
| 7,437,718 B2 | 10/2008 | Fournet et al. | |
| 7,448,046 B2 | 11/2008 | Navani et al. | |
| 7,480,940 B1 | 1/2009 | Agbabian et al. | |
| 7,493,593 B2 | 2/2009 | Koehler | |
| 7,530,105 B2 | 5/2009 | Gilbert et al. | |
| 7,546,207 B2 | 6/2009 | Nix et al. | |
| 7,546,333 B2 | 6/2009 | Alon et al. | |
| 7,546,637 B1 | 6/2009 | Agbabian et al. | |
| 7,603,709 B2 | 10/2009 | Lewis et al. | |
| 7,603,714 B2 | 10/2009 | Johnson et al. | |
| 7,653,188 B2 | 1/2010 | Kloberdans et al. | |
| 7,657,406 B2 | 2/2010 | Tolone et al. | |
| 7,660,815 B1 | 2/2010 | Scofield et al. | |
| 7,685,296 B2 | 3/2010 | Brill et al. | |
| 7,698,213 B2 | 4/2010 | Lancaster | |
| 7,702,821 B2 | 4/2010 | Feinberg et al. | |
| 7,739,653 B2 | 6/2010 | Venolia | |
| 7,743,421 B2 | 6/2010 | Cosquer et al. | |
| 7,774,335 B1 | 8/2010 | Scofield et al. | |
| 7,818,224 B2 | 10/2010 | Boerner | |
| 7,818,417 B2 | 10/2010 | Ginis et al. | |
| 7,840,677 B2 | 11/2010 | Li et al. | |
| 7,925,561 B2 | 4/2011 | Xu | |
| 7,933,926 B2 | 4/2011 | Ebert | |
| 8,006,303 B1 | 8/2011 | Dennerline et al. | |
| 8,055,712 B2 | 11/2011 | Kagawa et al. | |
| 8,065,257 B2 | 11/2011 | Kuecuekyan | |
| 8,069,190 B2 | 11/2011 | McColl et al. | |
| 8,116,450 B2 | 2/2012 | Agrawal et al. | |
| 8,132,260 B1 | 3/2012 | Mayer et al. | |
| 8,156,029 B2 | 4/2012 | Szydlo | |
| 8,205,259 B2 | 6/2012 | Stute | |
| 8,209,274 B1 | 6/2012 | Lin et al. | |
| 8,245,302 B2 | 8/2012 | Evans et al. | |
| 8,346,753 B2 | 1/2013 | Hayes | |
| 8,352,347 B2 | 1/2013 | Howard et al. | |
| 8,352,412 B2 | 1/2013 | Alba et al. | |
| 8,370,192 B2 | 2/2013 | Deo et al. | |
| 8,380,843 B2 | 2/2013 | Loizeaux et al. | |
| 8,386,519 B2 | 2/2013 | Kenedy et al. | |
| 8,407,800 B2 | 3/2013 | Schlegel et al. | |
| 8,417,656 B2 | 4/2013 | Beg et al. | |
| 8,457,996 B2 | 6/2013 | Winkler et al. | |
| 8,495,521 B2 | 7/2013 | Fried | |
| 8,516,594 B2 | 8/2013 | Bennett et al. | |
| 8,516,596 B2 | 8/2013 | Sandoval et al. | |
| 8,548,777 B2 | 10/2013 | Sturrock et al. | |
| 8,566,945 B2 | 10/2013 | Sima | |
| 8,583,639 B2 | 11/2013 | Chitnis et al. | |
| 8,595,240 B1 | 11/2013 | Otey et al. | |
| 8,601,554 B2 | 12/2013 | Gordon et al. | |
| 8,601,587 B1 | 12/2013 | Powell et al. | |
| 8,607,197 B2 | 12/2013 | Barcia et al. | |
| 8,615,800 B2 | 12/2013 | Baddour et al. | |
| 8,654,127 B2 | 2/2014 | Kenttala et al. | |
| 8,677,473 B2 | 3/2014 | Dennerline et al. | |
| 8,707,275 B2 | 4/2014 | Mascaro et al. | |
| 8,712,596 B2 | 4/2014 | Scott | |
| 8,725,597 B2 | 5/2014 | Mauseth et al. | |
| 8,726,393 B2 | 5/2014 | Macy et al. | |
| 8,732,162 B2* | 5/2014 | Harris | H04L 67/1029 707/694 |
| 8,751,867 B2 | 6/2014 | Marvasti et al. | |
| 8,752,178 B2 | 6/2014 | Coates et al. | |
| 8,781,990 B1 | 7/2014 | de Alfaro et al. | |
| 8,782,080 B2 | 7/2014 | Lee et al. | |
| 8,788,306 B2 | 7/2014 | Delurgio et al. | |
| 8,793,758 B2 | 7/2014 | Raleigh et al. | |
| 8,806,361 B1 | 8/2014 | Noel et al. | |
| 8,813,234 B1 | 8/2014 | Bowers et al. | |
| 8,819,772 B2 | 8/2014 | Bettini et al. | |
| 8,826,426 B1 | 9/2014 | Dubey | |
| 8,839,440 B2 | 9/2014 | Yun et al. | |
| 8,897,900 B2 | 11/2014 | Smith et al. | |
| 8,898,442 B2 | 11/2014 | Stoitsev | |
| 8,914,878 B2 | 12/2014 | Burns et al. | |
| 8,949,960 B2 | 2/2015 | Berkman et al. | |
| 8,959,494 B2 | 2/2015 | Howard | |
| 8,990,392 B1 | 3/2015 | Stamos | |
| 8,997,233 B2 | 3/2015 | Green et al. | |

(56) References Cited

U.S. PATENT DOCUMENTS

| | | |
|---|---|---|
| 9,009,837 B2 | 4/2015 | Nunez Di Croce |
| 9,015,708 B2 | 4/2015 | Choudhury et al. |
| 9,021,477 B2 | 4/2015 | Choudhury et al. |
| 9,031,870 B2 | 5/2015 | Kenedy et al. |
| 9,043,332 B2 | 5/2015 | Noel et al. |
| 9,049,207 B2 | 6/2015 | Hugard, IV et al. |
| 9,069,725 B2 | 6/2015 | Jones |
| 9,092,616 B2 | 7/2015 | Kumar et al. |
| 9,100,430 B1 | 8/2015 | Seiver et al. |
| 9,110,706 B2 | 8/2015 | Yu et al. |
| 9,129,108 B2 | 9/2015 | Drissi et al. |
| 9,134,966 B2 | 9/2015 | Brock et al. |
| 9,137,024 B2 | 9/2015 | Swingler et al. |
| 9,152,727 B1 | 10/2015 | Balducci et al. |
| 9,166,990 B2 | 10/2015 | Eswaran et al. |
| 9,171,079 B2 | 10/2015 | Banka et al. |
| 9,185,124 B2 | 11/2015 | Chakraborty |
| 9,202,040 B2 | 12/2015 | Rosenblatt et al. |
| 9,203,827 B2 | 12/2015 | Srinivasan et al. |
| 9,210,185 B1 | 12/2015 | Pinney Wood et al. |
| 9,231,962 B1 | 1/2016 | Yen et al. |
| 9,235,732 B2 | 1/2016 | Eynon et al. |
| 9,253,643 B2 | 2/2016 | Pattar et al. |
| 9,256,735 B2 | 2/2016 | Stute |
| 9,262,787 B2 | 2/2016 | Binion et al. |
| 9,264,395 B1 | 2/2016 | Stamos |
| 9,276,951 B2 | 3/2016 | Choi et al. |
| 9,286,103 B2 | 3/2016 | Acharya et al. |
| 9,292,692 B2 | 3/2016 | Wallrabenstein |
| 9,292,699 B1 | 3/2016 | Stuntebeck et al. |
| 9,294,498 B1 | 3/2016 | Yampolskiy et al. |
| 9,300,682 B2 | 3/2016 | Burnham et al. |
| 9,319,430 B2 | 4/2016 | Bell, Jr. et al. |
| 9,336,481 B1 | 5/2016 | Ionson |
| 9,338,061 B2 | 5/2016 | Chen et al. |
| 9,344,444 B2 | 5/2016 | Lippmann et al. |
| 9,349,103 B2 | 5/2016 | Eberhardt, III et al. |
| 9,355,385 B2 * | 5/2016 | Benzatti ............... G06Q 10/109 |
| 9,369,482 B2 | 6/2016 | Borohovski et al. |
| 9,384,345 B2 | 7/2016 | Dixon et al. |
| 9,390,376 B2 | 7/2016 | Harrison et al. |
| 9,400,962 B2 | 7/2016 | Prasad |
| 9,438,616 B2 | 9/2016 | Singla et al. |
| 9,461,876 B2 | 10/2016 | Van Dusen et al. |
| 9,466,041 B2 | 10/2016 | Simitsis et al. |
| 9,467,461 B2 | 10/2016 | Balderas |
| 9,495,188 B1 | 11/2016 | Ettema et al. |
| 9,501,647 B2 | 11/2016 | Yampolskiy et al. |
| 9,503,467 B2 | 11/2016 | Lefebvre et al. |
| 9,503,472 B2 | 11/2016 | Laidlaw et al. |
| 9,509,716 B2 | 11/2016 | Shabtai et al. |
| 9,515,826 B2 | 12/2016 | Whelan et al. |
| 9,516,053 B1 | 12/2016 | Muddu et al. |
| 9,521,166 B2 | 12/2016 | Wilson |
| 9,541,982 B2 | 1/2017 | Lipasti et al. |
| 9,558,220 B2 | 1/2017 | Nixon et al. |
| 9,560,065 B2 | 1/2017 | Neil et al. |
| 9,565,204 B2 | 2/2017 | Chesla |
| 9,571,517 B2 | 2/2017 | Vallone et al. |
| 9,578,046 B2 | 2/2017 | Baker |
| 9,596,141 B2 | 3/2017 | McDowall |
| 9,600,792 B2 | 3/2017 | Foehr et al. |
| 9,602,513 B2 | 3/2017 | Gamage et al. |
| 9,602,529 B2 | 3/2017 | Jones et al. |
| 9,602,530 B2 | 3/2017 | Ellis et al. |
| 9,609,009 B2 | 3/2017 | Muddu et al. |
| 9,609,015 B2 | 3/2017 | Natarajan et al. |
| 9,619,291 B2 | 4/2017 | Pueyo et al. |
| 9,639,575 B2 | 5/2017 | Leida et al. |
| 9,652,538 B2 | 5/2017 | Shivaswamy et al. |
| 9,652,604 B1 | 5/2017 | Johansson et al. |
| 9,654,495 B2 | 5/2017 | Hubbard et al. |
| 9,661,019 B2 | 5/2017 | Liu |
| 9,667,600 B2 | 5/2017 | Piqueras Jover et al. |
| 9,667,641 B2 | 5/2017 | Muddu et al. |
| 9,672,283 B2 | 6/2017 | Pappas et al. |
| 9,672,355 B2 | 6/2017 | Titonis et al. |
| 9,674,211 B2 | 6/2017 | Curcic et al. |
| 9,674,249 B1 | 6/2017 | Kekre et al. |
| 9,679,125 B2 | 6/2017 | Bailor et al. |
| 9,680,867 B2 | 6/2017 | Hughes et al. |
| 9,686,293 B2 | 6/2017 | Golshan et al. |
| 9,690,645 B2 | 6/2017 | Samuni et al. |
| 9,699,205 B2 | 7/2017 | Muddu et al. |
| 9,712,553 B2 | 7/2017 | Nguyen et al. |
| 9,721,086 B2 | 8/2017 | Shear et al. |
| 9,729,421 B2 | 8/2017 | Brech et al. |
| 9,729,538 B2 | 8/2017 | Plotnik et al. |
| 9,734,169 B2 | 8/2017 | Redlich et al. |
| 9,734,220 B2 | 8/2017 | Karpistsenko et al. |
| 9,736,173 B2 | 8/2017 | Li et al. |
| 9,749,343 B2 | 8/2017 | Watters et al. |
| 9,749,344 B2 | 8/2017 | Watters et al. |
| 9,753,796 B2 | 9/2017 | Mahaffey et al. |
| 9,756,067 B2 | 9/2017 | Boyadjiev et al. |
| 9,762,443 B2 | 9/2017 | Dickey |
| 9,771,225 B2 | 9/2017 | Stone et al. |
| 9,772,934 B2 * | 9/2017 | Maag ............... G06F 11/0775 |
| 9,774,407 B2 | 9/2017 | Hudson et al. |
| 9,774,522 B2 | 9/2017 | Vasseur et al. |
| 9,774,616 B2 | 9/2017 | Flores et al. |
| 9,781,144 B1 | 10/2017 | Otvagin et al. |
| 9,807,104 B1 | 10/2017 | Sarra |
| 9,832,213 B2 | 11/2017 | Underwood et al. |
| 9,842,000 B2 | 12/2017 | Bishop et al. |
| 9,858,322 B2 | 1/2018 | Theimer et al. |
| 9,860,208 B1 | 1/2018 | Ettema et al. |
| 9,875,360 B1 | 1/2018 | Grossman et al. |
| 9,882,929 B1 | 1/2018 | Ettema et al. |
| 9,887,933 B2 | 2/2018 | Lawrence, III |
| 9,910,993 B2 | 3/2018 | Grossman et al. |
| 9,911,088 B2 | 3/2018 | Nath et al. |
| 9,917,860 B2 | 3/2018 | Senanayake et al. |
| 9,928,366 B2 | 3/2018 | Ladnai et al. |
| 9,930,058 B2 | 3/2018 | Carpenter et al. |
| 9,942,295 B2 | 4/2018 | Rider et al. |
| 9,946,517 B2 | 4/2018 | Talby et al. |
| 9,952,899 B2 | 4/2018 | Novaes |
| 9,954,879 B1 | 4/2018 | Sadaghiani et al. |
| 9,954,884 B2 | 4/2018 | Hassell et al. |
| 9,965,627 B2 | 5/2018 | Ray et al. |
| 9,967,264 B2 | 5/2018 | Harris et al. |
| 9,967,265 B1 | 5/2018 | Peer et al. |
| 9,967,282 B2 | 5/2018 | Thomas et al. |
| 9,967,283 B2 | 5/2018 | Ray et al. |
| 9,967,625 B2 | 5/2018 | Korst et al. |
| 9,984,129 B2 | 5/2018 | Patel et al. |
| 9,992,228 B2 | 6/2018 | Ray et al. |
| 10,009,378 B2 | 6/2018 | Chiviendacz et al. |
| 10,027,711 B2 | 7/2018 | Gill et al. |
| 10,038,559 B2 | 7/2018 | Burrows et al. |
| 10,044,675 B1 | 8/2018 | Ettema et al. |
| 10,050,985 B2 | 8/2018 | Mhatre et al. |
| 10,055,473 B2 | 8/2018 | Allen et al. |
| 10,061,635 B2 | 8/2018 | Ellwein |
| 10,074,052 B2 | 9/2018 | Banerjee et al. |
| 10,078,664 B2 | 9/2018 | Gustafson et al. |
| 10,083,236 B2 | 9/2018 | Crosby |
| 10,102,480 B2 | 10/2018 | Dirac et al. |
| 10,108,907 B2 | 10/2018 | Bugay et al. |
| 10,109,014 B1 | 10/2018 | Bischoff et al. |
| 10,110,415 B2 | 10/2018 | Radivojevic et al. |
| 10,120,907 B2 | 11/2018 | de Castro Alves et al. |
| 10,122,687 B2 | 11/2018 | Thomas et al. |
| 10,122,764 B1 | 11/2018 | Obaidi |
| 10,146,592 B2 | 12/2018 | Bishop et al. |
| 10,152,676 B2 | 12/2018 | Strom |
| 10,154,049 B2 | 12/2018 | Sancheti et al. |
| 10,162,969 B2 | 12/2018 | Knapp |
| 10,168,691 B2 | 1/2019 | Zornio et al. |
| 10,180,780 B2 | 1/2019 | Ainalem |
| 10,185,832 B2 | 1/2019 | Cam |
| 10,191,768 B2 | 1/2019 | Bishop et al. |
| 10,205,735 B2 | 2/2019 | Apostolopoulos |

(56) References Cited

U.S. PATENT DOCUMENTS

| | | |
|---|---|---|
| 10,210,246 B2 | 2/2019 | Stojanovic et al. |
| 10,210,470 B2 | 2/2019 | Partha Ray |
| 10,212,176 B2 | 2/2019 | Wang |
| 10,212,184 B2 | 2/2019 | Sweeney et al. |
| 10,216,485 B2 | 2/2019 | Misra et al. |
| 10,217,348 B2 | 2/2019 | Poder et al. |
| 10,261,763 B2 | 4/2019 | Fink et al. |
| 10,275,545 B2 | 4/2019 | Yeager et al. |
| 10,277,629 B1 | 4/2019 | Guntur |
| 10,284,570 B2 | 5/2019 | Schmidtler et al. |
| 10,289,841 B2 | 5/2019 | Tang et al. |
| 10,290,141 B2 | 5/2019 | Kennedy et al. |
| 10,298,607 B2 | 5/2019 | Tang et al. |
| 10,305,902 B2 | 5/2019 | Kim |
| 10,318,739 B2 | 6/2019 | Brucker et al. |
| 10,318,882 B2 | 6/2019 | Brueckner et al. |
| 10,320,828 B1 | 6/2019 | Derbeko et al. |
| 10,321,278 B2 | 6/2019 | Proctor |
| 10,324,773 B2 | 6/2019 | Wing et al. |
| 10,338,913 B2 | 7/2019 | Franchitti |
| 10,367,829 B2 | 7/2019 | Huang et al. |
| 10,380,140 B2 | 8/2019 | Sherman |
| 10,387,124 B2 | 8/2019 | Chaudhuri et al. |
| 10,387,631 B2 | 8/2019 | Duggal et al. |
| 10,410,113 B2 | 9/2019 | Clayton et al. |
| 10,410,214 B2 | 9/2019 | Doyle |
| 10,438,001 B1 | 10/2019 | Hariprasad |
| 10,440,054 B2 | 10/2019 | Robertson |
| 10,445,482 B2 | 10/2019 | Ren |
| 10,452,664 B2 | 10/2019 | Le Mouel et al. |
| 10,462,112 B1 | 10/2019 | Makmel et al. |
| 10,505,954 B2 | 12/2019 | Stokes, III et al. |
| 10,511,498 B1 | 12/2019 | Narayan et al. |
| 10,515,062 B2 | 12/2019 | Tidwell et al. |
| 10,515,366 B1 | 12/2019 | Gorelik et al. |
| 10,530,796 B2 | 1/2020 | Patterson et al. |
| 10,540,624 B2 | 1/2020 | Hui et al. |
| 10,579,691 B2 | 3/2020 | Levine et al. |
| 10,601,854 B2 | 3/2020 | Lokamathe et al. |
| 10,606,454 B2 | 3/2020 | Pani |
| 10,609,059 B2 | 3/2020 | Apostolopoulos |
| 10,628,578 B2 | 4/2020 | Eksten et al. |
| 10,643,144 B2 | 5/2020 | Bowers et al. |
| 10,645,086 B1 | 5/2020 | Hadler |
| 10,645,100 B1 | 5/2020 | Wang et al. |
| 10,673,880 B1 | 6/2020 | Pratt et al. |
| 10,715,534 B2 | 7/2020 | Sander et al. |
| 10,719,524 B1* | 7/2020 | Nguyen ............... G06F 16/248 |
| 10,740,358 B2 | 8/2020 | Chan et al. |
| 10,764,321 B2 | 9/2020 | Bower, III et al. |
| 10,776,847 B1 | 9/2020 | Comar et al. |
| 10,789,367 B2 | 9/2020 | Joseph Durairaj et al. |
| 10,791,131 B2 | 9/2020 | Nor et al. |
| 10,817,530 B2 | 10/2020 | Siebel et al. |
| 10,861,028 B2 | 12/2020 | Silberman et al. |
| 10,862,916 B2 | 12/2020 | Hittel et al. |
| 10,871,951 B2 | 12/2020 | Ding et al. |
| 10,911,470 B2 | 2/2021 | Muddu et al. |
| 10,944,772 B2 | 3/2021 | Mulchandani et al. |
| 10,958,667 B1 | 3/2021 | Maida et al. |
| 10,965,711 B2 | 3/2021 | Schiappa et al. |
| 10,977,551 B2 | 4/2021 | Van Seijen et al. |
| 10,985,997 B2 | 4/2021 | Duggal et al. |
| 10,992,698 B2 | 4/2021 | Patel et al. |
| 11,030,520 B2 | 6/2021 | Mankovskii et al. |
| 11,032,307 B2 | 6/2021 | Tsironis |
| 11,113,667 B1 | 9/2021 | Jiang et al. |
| 11,138,514 B2 | 10/2021 | Hu et al. |
| 11,194,900 B2 | 12/2021 | Loman et al. |
| 11,256,791 B2 | 2/2022 | Douglas et al. |
| 11,334,831 B2 | 5/2022 | Abu El Ata et al. |
| 11,392,875 B2 | 7/2022 | Carstens et al. |
| 11,477,641 B2 | 10/2022 | Damlaj et al. |
| 11,539,663 B2 | 12/2022 | Chasman et al. |
| 11,574,206 B2 | 2/2023 | Butler, Jr. et al. |
| 11,736,299 B2 | 8/2023 | Cerna, Jr. |
| 2004/0255167 A1 | 12/2004 | Knight |
| 2005/0071223 A1 | 3/2005 | Jain et al. |
| 2005/0165822 A1 | 7/2005 | Yeung et al. |
| 2005/0198099 A1 | 9/2005 | Motsinger et al. |
| 2005/0289072 A1 | 12/2005 | Sabharwal |
| 2006/0149575 A1 | 7/2006 | Varadarajan et al. |
| 2007/0055558 A1 | 3/2007 | Shanahan et al. |
| 2007/0136821 A1 | 6/2007 | Hershaft et al. |
| 2007/0150744 A1 | 6/2007 | Cheng et al. |
| 2007/0168370 A1 | 7/2007 | Hardy |
| 2007/0276714 A1 | 11/2007 | Beringer |
| 2008/0021866 A1 | 1/2008 | Hinton et al. |
| 2008/0270203 A1 | 10/2008 | Holmes et al. |
| 2009/0012760 A1 | 1/2009 | Schunemann |
| 2009/0094372 A1 | 4/2009 | Nyang et al. |
| 2009/0199002 A1 | 8/2009 | Erickson |
| 2009/0319247 A1 | 12/2009 | Ratcliffe, III et al. |
| 2010/0083240 A1 | 4/2010 | Siman |
| 2010/0115276 A1 | 5/2010 | Betouin et al. |
| 2010/0275183 A1 | 10/2010 | Panicker et al. |
| 2010/0299651 A1 | 11/2010 | Fainekos et al. |
| 2010/0325685 A1 | 12/2010 | Sanbower |
| 2011/0087888 A1 | 4/2011 | Rennie |
| 2011/0225287 A1 | 9/2011 | Dalal et al. |
| 2011/0307467 A1 | 12/2011 | Severance |
| 2012/0215575 A1 | 8/2012 | Deb et al. |
| 2012/0296845 A1 | 11/2012 | Andrews et al. |
| 2013/0036108 A1* | 2/2013 | Corbeau ............... G06F 16/958 707/769 |
| 2013/0046751 A1 | 2/2013 | Tsiatsis et al. |
| 2013/0117831 A1 | 5/2013 | Hook et al. |
| 2013/0132149 A1 | 5/2013 | Wei et al. |
| 2013/0159219 A1 | 6/2013 | Pantel et al. |
| 2014/0082729 A1 | 3/2014 | Shim et al. |
| 2014/0149186 A1 | 5/2014 | Flaxer et al. |
| 2014/0244612 A1 | 8/2014 | Bhasin et al. |
| 2014/0279762 A1 | 9/2014 | Xaypanya et al. |
| 2014/0324521 A1 | 10/2014 | Mun |
| 2015/0081363 A1 | 3/2015 | Taylor et al. |
| 2015/0128258 A1 | 5/2015 | Novozhenets |
| 2015/0149979 A1 | 5/2015 | Talby et al. |
| 2015/0161738 A1 | 6/2015 | Stempora |
| 2015/0170053 A1 | 6/2015 | Miao |
| 2015/0172311 A1 | 6/2015 | Freedman et al. |
| 2015/0242509 A1 | 8/2015 | Pall et al. |
| 2015/0281225 A1 | 10/2015 | Schoen et al. |
| 2015/0295775 A1 | 10/2015 | Dickey |
| 2015/0317745 A1 | 11/2015 | Collins et al. |
| 2015/0347414 A1 | 12/2015 | Xiao et al. |
| 2015/0379111 A1 | 12/2015 | Hwang |
| 2016/0004858 A1 | 1/2016 | Chen et al. |
| 2016/0006629 A1 | 1/2016 | Ianakiev et al. |
| 2016/0012235 A1 | 1/2016 | Lee et al. |
| 2016/0057159 A1 | 2/2016 | Yin et al. |
| 2016/0088000 A1 | 3/2016 | Siva Kumar et al. |
| 2016/0099960 A1 | 4/2016 | Gerritz et al. |
| 2016/0119365 A1 | 4/2016 | Barel |
| 2016/0140519 A1 | 5/2016 | Trepca et al. |
| 2016/0180240 A1 | 6/2016 | Majumdar et al. |
| 2016/0219066 A1 | 7/2016 | Vasseur et al. |
| 2016/0275123 A1 | 9/2016 | Lin et al. |
| 2016/0330233 A1 | 11/2016 | Hart |
| 2016/0364307 A1 | 12/2016 | Garg et al. |
| 2016/0371363 A1 | 12/2016 | Muro et al. |
| 2017/0010589 A1 | 1/2017 | de Anda Fast |
| 2017/0023509 A1 | 1/2017 | Kim et al. |
| 2017/0090893 A1 | 3/2017 | Aditya et al. |
| 2017/0207926 A1 | 7/2017 | Gil et al. |
| 2017/0241791 A1 | 8/2017 | Madigan et al. |
| 2018/0268264 A1 | 9/2018 | Marwah et al. |
| 2018/0336250 A1 | 11/2018 | Llaves et al. |
| 2018/0365302 A1* | 12/2018 | Tabun ............... G06F 16/9535 |
| 2019/0188797 A1 | 6/2019 | Przechocki et al. |
| 2020/0004752 A1 | 1/2020 | Majumdar et al. |
| 2020/0177618 A1 | 6/2020 | Hassanzadeh et al. |
| 2020/0304534 A1 | 9/2020 | Rakesh et al. |
| 2020/0356664 A1 | 11/2020 | Maor |

(56) References Cited

U.S. PATENT DOCUMENTS

2020/0364346 A1 11/2020 Gourisetti et al.
2020/0396246 A1 12/2020 Zoldi et al.
2021/0075822 A1 3/2021 Chung et al.

FOREIGN PATENT DOCUMENTS

WO 2015089463 A1 6/2015
WO 2020079685 A1 4/2020

OTHER PUBLICATIONS

Boukhtouta, et al, "Graph-theoretic characterization of cyber-threat infrastructures", Digital Investigation, 2015, vol. 14, p. S3-S15, USA.
Cui, et al, "Non-intrusive process-based monitoring system to mitigate and prevent VM vulnerability explorations", Collaboratecom, 2013, Austin, USA.
Ekelhart, et al, "Integrating attacker behavior in IT security analysis: a discrete-event simulation approach", ResearchGate, 2015.
Fisk, Varghese, "Agile and Scalable Analysis of Network Events".
Gedik et al, "Elastic Scaling for Data Stream Processing", IEEE Transactions on Parallel and Distributed Systems, Jun. 2014, vol. 25, No. 6, p. 1447-1463.
Jajodia, et al, "Advanced Cyber Attack Modeling, Analysis, and Visualization", AFRL Final Technical Report, Mar. 2010, USA.
JPCERT-CC, "Detecting Lateral Movement through Tracking Event Logs (Version 2)", 2017, p. 1-16, Japan.
Jungles et al, "Mitigating Pass-the-Hash (PtH) Attacks and Other Credential Theft Techniques", TwC Next, 2012.
Kbar, "Wireless Network Token-Based Fast Authentication", 17th International Conference on Telecommunications, 2010, p. 227-233.
Kiesling et al, "Selecting security control portfolios: a multi-objective simulation-optimization approach", EURO Journal on Decision Processes, Apr. 2016.
Kotenko, "A Cyber Attack Modeling and Impact Assessment framework", Conference Paper, Jan. 2013.
Kumar, et al, "DFuse: A Framework for Distributed Data Fusion", Georgia Institute of Technology.
Lu, et al, "Sybil Attack Detection through Global Topology Pattern Visualization", 2011.
Pasqualetti et al, "Attack Detection and Identification in Cyber-Physical Systems", IEEE Transactions on Automatic Control, vol. 58, No. 11, p. 2715-2729.
Patapanchala, "Exploring Security Metrics for Electric Grid Infrastructure Leveraging Attack Graphs", Oregon State Thesis, 2016.
Shandilya et al, "Use of Attack Graphs in Security Systems", Journal of Computer Networks and Communications, vol. 2014.
Yang et al, "Attack Projection", Advances in Information Security 62, 2014, p. 239-261.
Zargar et al, "XABA: A Zero-Knowledge Anomaly-Based Behavioral Analysis Method to Detect Insider Threats", 2016.
Excerpts of raw documentation source located in the Apache Logging Flume GitHub "apache/logging-flume" repository tagged as Apache Flume Release 1.6.0, dated May 5, 2015, full release available at https://github.com/apache/logging-flume/tree/release-1.6.0, 200 pages.
Excerpts of raw documentation source located in the Apache Airflow GitHub "apache/airflow" repository tagged as Apache Airflow Release v1.5.1, dated Sep. 4, 2015, full release available at https://github.com/apache/airflow/tree/1.5.1, 75 pages.
Excerpts of raw documentation source located in the Apache Apex core GitHub "apache/apex-core" repository tagged as Apache Apex Core Release v3.1.1, dated Oct. 8, 2015, full release available at https://github.com/apache/apex-core/tree/v3.1.1, 158 pages.
Excerpts of raw documentation source located in the Apache Beam GitHub "apache/beam" repository tagged as Apache Beam Release v1.2.0, dated Oct. 5, 2015, full release available at https://github.com/apache/beam/tree/v1.2.0, 31 pages.
Excerpts of raw documentation source located in the Apache Flink GitHub "apache/flink" repository tagged as Apache Flink Release 0.9.7, dated Aug. 27, 2015, full release available at https://github.com/apache/flink/tree/release-0.9.1, 712 pages.
Excerpts of raw documentation source located in the Apache Hadoop GiHub "apache/hadoop" repository tagged as Apache Hadoop Release 2.6.1, dated Sep. 23, 2015, full release available at https://github.com/apache/hadoop/tree/release-2.6.1, 1640 pages.
Excerpts of raw documentation source located in the Apache Ignite GitHub "apache/ignite" repository tagged as Apache Ignite Release 1.4.1, dated Sep. 25, 2015, full release available at https://github.com/apache/ignite/tree/1.4.1, 103 pages.
Excerpts of raw documentation source located in the Apache Kafka GitHub "apache/kafka" repository tagged as Apache Kafka Release 0.8.2.2, dated Sep. 2, 2015, full release available at https://github.com/apache/kafka/tree/0.8.2.2, 13 pages.
Excerpts of raw documentation source located in the Apache NiFi GitHub "apache/nifi" repository tagged as Apache NiFi Release nifi-0.3.0-RC1, dated Sep. 14, 2015, full release available at https://github.com/apache/nifi/tree/nifi-0.3.0-RC1, 286 pages.
Excerpts of raw documentation source located in the Apache Samza GitHub "apache/samza" repository tagged as Apache Samza Release 0.9.1-rc1, date Jun. 23, 2015, full release available at https://github.com/apache/samza/tree/release-0.9.1-rc1, 221 pages.
Excerpts of raw documentation source located in the Apache Spark GitHub "apache/spark" repository tagged as Apache Spark Release v. 15.1-rc1, dated Sep. 23, 2015, full release available at https://github.com/apache/spark/tree/v1.5.1, 2122 pages.
Excerpts of raw documentation source located in the Apache Storm GitHub "apache/storm" repository tagged as Apache Storm Release v0.10.0-beta1, dated Jun. 19, 2015, full release available at https://github.com/apache/storm/tree/v0.10.0-beta1, 589 pages.

* cited by examiner

```
import scrapy
from scrapy.spiders import CrawlSpider, Rule
from scrapy.linkextractors import LinkExtractor
```
~1610

```
class MySpider(CrawlSpider)
    name = 'example. com'
    allowed_domains = ['example.com']
    start_urls = ['http://www.example.com']
```
~1620

```
    rules = (
        # Extract links matching 'category.php' (but not matching 'subsection.php')
        # and follow links from them (since no callback means follow=True by default).
        Rule(LinkExtractor(allow=( 'category\.php', ), deny=( 'subsection\.php', ))),

# Extract links matching 'item.php' and parse them with the spider's
        method parse_item
            Rule(LinkExtractor(allow=('item\.php', )), callback='parse_item'),
    )
```
1630

```
    def parse_item(self, response):
        self.logger.info('Hi, this is an item page! %s', response.url)
        item = scrapy.Item()
        item[' id'] = response. xpath ( '/ ltd [@id="item_id"] /text()'). re( r' ID: (\d+)' )
        item['name'] = response.xpath('//td[@id="item_name"]/text()').extract()
        item[' description'] = response. xpath ( '/ /td [@id="item_description"] /text()')extract()
        return item
```
1640

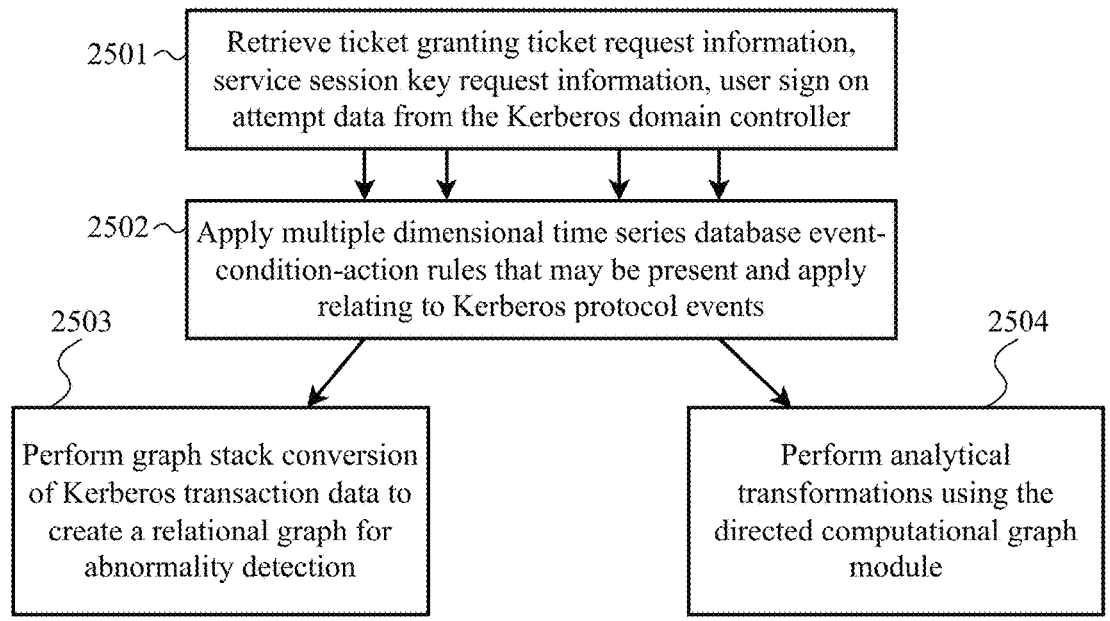
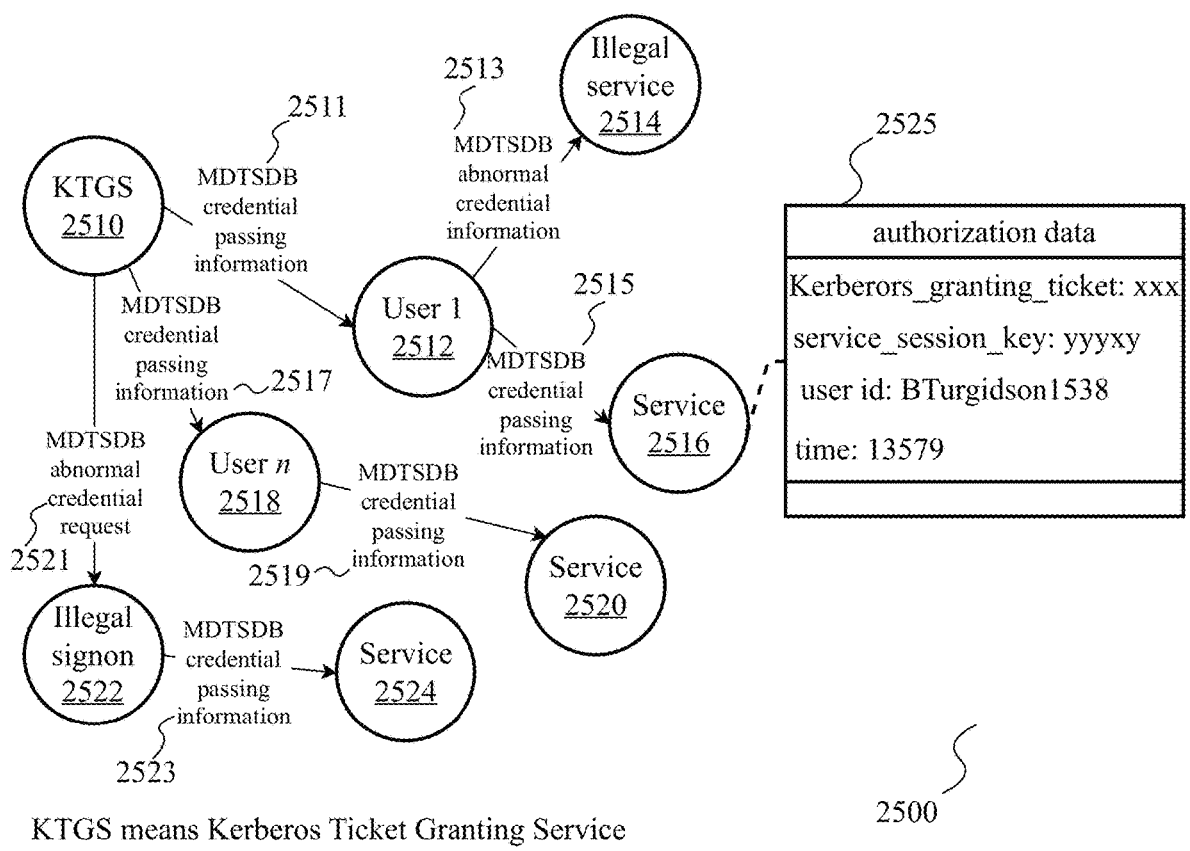
FIG. 25

RAPID PREDICTIVE ANALYSIS OF VERY LARGE DATA SETS USING THE DISTRIBUTED COMPUTATIONAL GRAPH

CROSS-REFERENCE TO RELATED APPLICATIONS

This application is a continuation of U.S. patent application Ser. No. 18/582,519, filed Feb. 20, 2024; which is a continuation of U.S. patent application Ser. No. 18/501,977, filed Nov. 3, 2023, now issued as U.S. Pat. No. 12,003,534 on Jun. 4, 2024; which is a continuation of U.S. patent application Ser. No. 17/974,257, filed Oct. 26, 2022, now issued as U.S. Pat. No. 11,818,169 on Nov. 14, 2023; which is a continuation of U.S. patent application Ser. No. 17/169,924, filed on Feb. 8, 2021, now issued as U.S. Pat. No. 11,570,209 on Jan. 31, 2023; which is a continuation-in-part of U.S. patent application Ser. No. 15/837,845, filed on Dec. 11, 2017, now issued as U.S. Pat. No. 11,005,824 on May 11, 2021; said application Ser. No. 15/837,845 claims benefit of U.S. Provisional Pat. App. No. 62/596,105, filed on Dec. 7, 2017; said application Ser. No. 15/837,845 is a continuation-in-part of U.S. patent application Ser. No. 15/825,350, filed Nov. 29, 2017, now issued as U.S. Pat. No. 10,594,714 on Mar. 17, 2020; which is a continuation-in-part of U.S. patent application Ser. No. 15/725,274, filed Oct. 4, 2017, now issued as U.S. Pat. No. 10,609,079 on Mar. 31, 2020; which is a continuation-in-part of U.S. patent application Ser. No. 15/655,113, filed Jul. 20, 2017, now issued as U.S. Pat. No. 10,735,456 on Aug. 4, 2020; which is a continuation-in-part of U.S. patent application Ser. No. 15/616,427, filed Jun. 7, 2017; which is a continuation-in-part of U.S. patent application Ser. No. 14/925,974, filed Oct. 28, 2015; said application Ser. No. 15/655,113 is a continuation-in-part of U.S. patent application Ser. No. 15/237,625, filed Aug. 15, 2016, now issued as U.S. Pat. No. 10,248,910 on Apr. 2, 2019; which is a continuation-in-part of U.S. patent application Ser. No. 15/206,195, filed Jul. 8, 2016; which is a continuation-in-part of U.S. patent application Ser. No. 15/186,453, filed Jun. 18, 2016; which is a continuation-in-part of U.S. patent application Ser. No. 15/166,158 (which is explicitly incorporated by reference in its entirety herein), filed May 26, 2016; which is a continuation-in-part of U.S. patent application Ser. No. 15/141,752 (which is explicitly incorporated by reference in its entirety herein), filed Apr. 28, 2016, issued as U.S. Pat. No. 10,860,962 on Dec. 8, 2020; which is a continuation-in-part of U.S. patent application Ser. No. 15/091,563 (which is explicitly incorporated by reference in its entirety herein), filed Apr. 5, 2016, now issued as U.S. Pat. No. 10,204,147 on Feb. 12, 2019; said application Ser. No. 15/141,752 is a continuation-in-part of U.S. patent application Ser. No. 14/986,536 (which is explicitly incorporated by reference in its entirety herein), filed on Dec. 31, 2015, now issued as U.S. Pat. No. 10,210,255 on Feb. 19, 2019; said application Ser. No. 15/141,752 is a continuation-in-part of U.S. application Ser. No. 14/925,974 (which is explicitly incorporated by reference in its entirety herein), filed Oct. 28, 2015.

BACKGROUND OF THE INVENTION

Field of the Invention

The present invention is in the field of analysis of very large data sets using distributed computational graph tools which allow for transformation of data through both linear and non-linear transformation pipelines.

Background

The ability to transfer information between individuals, even over large distances, is credited with allowing mankind to rise from a species of primate gatherer-scavengers to forming simple communities. The ability to stably record information so that it could be analyzed for repetitive events, trends, and serve as a base to be expanded and built upon. It is safe to say that the availability of information in formats that allow it to be analyzed and added to by both individuals contemporary to its accrual and those who come after is the most powerful tool available to mankind and likely is what has propelled us to the level of social and technological achievement we have attained.

Nothing has augmented our ability to gather and store information analogous to the rise of electronic and computer technology. There are sensors of all types to measure just about any condition one can imagine. Computers have allowed the health information for a large portion of the human population is stored and accessible. Similarly, detailed data on vehicular accidents, both environmental and vehicle component factors Airline mishaps and crashes can be recreated and studied in great detail. Item information is recorded for the majority of consumer purchases. Further examples abound, but the point has been made. Computer database technology has allowed all of this information to be reliably stored for future retrieval and analysis. The benefits of database technology are so strong that there are very few businesses large or small that do not make some use of a data and knowledge storage solution, either directly for such tasks as inventory control and forecasting or customer relations, or indirectly for ordering. The meteoric rise of computer networking the internet has only served to turn the accrual of information into a torrent as now huge populations can exchange observations, data and ideas, even invited to do so; vast arrays of sensors can be tied together in meaningful ways all of which can be stored for future analysis and use. The receipt and storage of data has gotten to the point where an expert has been quoted as estimating that as much data is currently accrued in two days as was accrued in all history prior to 2003 (Eric Schmidt, Google). Entirely new distributed data storage and retrieval technologies such as Hadoop, and map/reduce; and graph and column based data store organization have been developed to accommodate the influx of information and provide some ability to retrieve information in a guided fashion, but such retrieval has proven to be too labor intensive and rigid to be of use in all but the more superficial and simple of campaigns. Presently, we are accruing vast amounts of information daily but do not have the tools to analyze all but a trickle into knowledge or informed action. What is needed is a system to allow the analysis of current, possibly complex and changing streaming data of interest in the context of the vast stored data that has accumulated relating to it such that meaningful conclusions made and effective action can be taken. To be of use, such a system would also need to possess the ability to self-assess its own operations and key intermediate factors in both the data stream and stored information and make changes to its own function to optimize function and maximize the probability of reliable conclusions.

Data pipelines, which are a progression of functions which each perform some action or transformation on a data stream, offer a mechanism to process quantities of data in the volume discussed directly above. To date however, data pipelines have either been extremely limited in what they do, for example "move data from a web based merchant site to a distributed data store; extract all purchases and classify by product type and region; store the result logs" or have been rigidly programmed and possibly required the uses of highly specific remote protocol calls to perform needed tasks. Even with these additions their capabilities have been very limited and, they have all been linear in configuration which precludes their use for analysis and conclusion or action discovery in a majority of complex situations where branching or even recurrent modification is needed.

What is needed is a system that intelligently combines processing of a current data stream with the ability to retrieve relevant stored data in such a way that conclusions or actions could be drawn in a predictive manner. To work in a timely and efficient manner, the system needs the ability to monitor for both operational issues within its components and should be able to learn and react to intermediate determinations of the analyses it runs and also should be able to self-modify to maintain optimal operation.

The ability to transfer information between individuals, even over large distances, is credited with allowing mankind to rise from a species of primate gatherer-scavengers to form simple communities. The ability to stably record information so that it could be analyzed for the presence of repetitive events, trends, and to serve as a base to be expanded and built upon was another substantial advance in the art. It is safe to say that the availability of information in formats that allow it to be analyzed and added to by both individuals contemporary to its accrual and those who come after is an extremely powerful tool available to mankind and likely is what has propelled us to the level of social and technological achievement we have attained.

Nothing has augmented our ability to gather and store information analogous to the rise of electronic and computer technology. There are sensors of all types to measure just about any condition one can imagine. Computers have allowed the health information for a large portion of the human population to be stored and accessible. Similarly, mass quantities of detailed data concerning the workings of government, as well as economics, demographics, climate change, and population shifts are all being continuously stored for public analysis and made available on the World Wide Web. The meteoric rise of computer networking and the internet has only served to turn the accrual of information into a torrent as now huge populations can exchange observations, data and ideas, are even invited to do so; vast arrays of sensors can be tied together in meaningful ways all generating data which can be stored for future analysis and use. The receipt and storage of data has gotten to the point where an expert has been quoted as estimating that as much data is currently accrued in two days as was accrued in all history prior to 2003 (Eric Schmidt, Google); much of this data makes its way to the World Wide Web. Entirely new distributed data storage technologies such as map/reduce; key-value pairs, and graph and column based data store organization have been developed to accommodate the influx of information and to provide the ability to store retrieved information in a structured way, yet vast amounts of this data posted to sources available through the Web lack machine parsable descriptive tags that allow the currently available web page indexing and retrieval technologies to access and process it. At this time this data is therefore virtually invisible without the use of highly specialized, tedious, and time consuming programming methodology. Coined the "deep web", this body of data is believed to be orders of magnitude larger than the indexed, searchable, "clear" portion of the World Wide Web. Presently, we are accruing vast amounts of this type of information daily but do not have the tools to analyze all but a trickle into knowledge or informed action.

What is needed is a system to rapidly search, index, and retrieve unstructured or poorly structured data from hypertext transfer protocol type sources such as the World Wide Web that is extremely scalable, allows multiple heterogeneous concurrent searches to be conducted, and exposes a well defined, highly customizable, simplified, search agent configuration interface. This system should also allow post-search data processing capabilities as well as direct output and persistent storage facilities for retrieved information and programming interfaces to receive search directives from other software and pass retrieved data to other software for further processing.

The ability to collect environmental information such as temperature, pressure, light levels, presence of individual chemical compounds and sound, to list a very small number of the total possibilities, continuously and in real time, even over large distances, using remote sensors has increased mankind's potential to manage and control all aspects of our ever more complex existence many fold. In addition to physical sensors, such as gravimeters, methane sensors and thermocouples, which are just a few examples of what one traditionally thinks of when sensors are discussed, there are a large number of electronic hardware and software hybrid sensors which measure computer or cluster computation speed, computer network traffic speed, pathway, destinations, bottlenecks, again, just to name a very small set of examples. Unfortunately, it is not the number or types of sensors that we can manufacture and deploy that is preventing mankind from making use of their potential and the vast amounts of information returned by them, it is instead our lack of ability to reliably retrieve and store the continuous steam of data each sensor supplies and then to manipulate that data in ways that produce meaningful, actionable results, such as repetitive events that lead to a specific climax of interest, or recognition of important trends from the raw data streams.

Quite recently, headway has been made in this problem area. Boundary has reported successful capture and short term storage of data streams generated from their time series network monitoring sensors by paring down the number of sensor parameters that they were recording, aggregating the stream entering the system such that, for example ten seconds of sensor data would be committed to their data store as a single block and, also limiting each committed block to include readings from an arbitrary and finite number of their network sensors. These data, a block measuring a defined time period by an arbitrary subpopulation of the total sensors are written as blocks to a straight key:value pair data store for a predetermined amount of time, but then must be purged to maintain low enough data storage levels to keep the system functioning. There is no provision for long-term storage of the captured data. The developers were also able to retrieve some of the raw data based on time recorded sensor ID and a keyword from the data store into which the sensor data was stored. This system, dubbed Kobayashi by the developers (Hungry Hungry Kobayashi-Dietrich Featherston from Boundary; https://vimeo.com/42902962:2012), was a very important foundation for sensor data stream capture and simple retrieval of sensor data from a data store over a short period of time. While Kobayashi advanced the art by its ability to capture and store simplified data streams from a set of sensors, Boundary's development could not perform several tasks required for functional sensor data stream capture and analysis. These requirements derive from a list comprising: 1) The strictly time interval based commitment schedule used in Kobayashi works very well with reliable time series sensors, which means data arrives uniformly over time, but does not work satisfactorily when sensor data arrives irregularly and a large amount may be received simultaneously; 2) Kobayashi makes no provision for long term storage of the sensor data—the developers provided that only $8.64 \times 10^4$, the number of seconds in a day, be stored in the data store and then the data is purged; 3) Kobayashi has no robust query language to retrieve specific data from the data store using anything but the most rudimentary scripts; 4) There are no transformative capabilities, especially crucial when attempting to analyze large quantities of potentially noisy and complex data.

What is needed is a system and method to capture time series data to a data store from a plurality of sensors which may send data at irregular intervals, where a large amount of data may come from the array of sensors concurrently. What is further needed is a system and method for the long term archive storage of older data, possibly no longer needed for current analysis and which would lead to unacceptably high maintenance overhead in the live database, but which could be crucial in longer term trend or antecedent event analysis. Finally, what is needed is a system and methods to allow straightforward, standardized search and analysis of specific sensor data based upon complex search criteria followed by employment of transformation tools to maximize data informational potential as well as a robust set of presentation formats to maximize the informational value of the transformed data.

Over the past decade the amount of financial, operational, infrastructure, risk management and philosophical information available to decision makers of a business from such sources as ubiquitous sensors found on a business's equipment or available from third party sources, detailed cause and effect data, and business process monitoring software has expanded to the point where the data has overwhelmed the abilities of virtually anyone to follow all of it much less interpret and make meaningful use of that available data in a given business environment. In other words, the torrent of business related information now available to a decision maker of group of decision makers has far out grown the ability of those in most need of its use to either fully follow it or reliably use it. Failure to recognize important trends or become aware of information in a timely fashion has led to highly visible, customer facing, outages at NETFLIX™, FACEBOOK™, and UPS™ over the past few years, just to list a few.

There have been several developments in business software that have arisen with the purpose of streamlining or automating either business data analysis or business decision process. PLANATIR™ offers software to isolate patterns in large volumes of data, DATABRICKS™ offers custom analytics services ANAPLAN™ offers financial impact calculation services and there are other software sources that mitigate some aspect of business data relevancy identification, analysis of that data and business decision automation, but none of these solutions handle more than a single aspect of the whole task. Similarly products like DATADOG™ and BMC INSIGHT™ allow businesses to monitor the function of their IT infrastructure and business software but lack the ability to perform the complex operation queries of large sections of that infrastructure so as to forecast impending bottlenecks, deficiencies and even customer facing failures.

What is needed is a fully integrated system that retrieves business relevant information from many diverse sources, identifies and analyzes that high volume data, transforming it to a business useful format and then uses that data to create intelligent predictive business decisions and business pathway simulations. Forming a "business operating system."

SUMMARY OF THE INVENTION

The inventor has developed a system for rapid predictive analysis of very large data sets using a distributed computational graph, that intelligently combines processing of a current data stream with the ability to retrieve relevant stored data in such a way that conclusions or actions could be drawn in a predictive manner.

According to a preferred embodiment of the invention, a system for rapid predictive analysis of very large data sets using the distributed computational graph, comprising a data receipt software module, a data filter software module, a data formalization software module, an input event data store module, a batch event analysis server, a system sanity and retrain software module, a messaging software module, a transformation pipeline software module, and an output software module, is disclosed. The data receipt software module: receives streams of input from one or more of a plurality of data sources, and sends the data stream to the data filter module. The filter software module: receives streams of data from the data receipt software module; removes data records from the stream for a plurality of reasons drawn from, but not limited to, a set comprising absence of all information, damage to data in the record, and presence of in-congruent information or missing information which invalidates the data record; splits filtered data stream into two or more identical parts; sends one identical data stream to the data formalization software module; and sends another identical data stream to the transformation pipeline module of the distributed graph computational module. The data formalization module: receives data stream from the data filter software module; formats the data within data stream based upon a set of predetermined parameters so as to prepare for meaningful storage in a data store; and places the formatted data stream into the input event data store. The input event data store: receives properly formatted data from the data formalization module; and stores the data by method suited to the long term availability, timely retrieval, and analysis of the accumulated data; The batch event analysis server: accesses the data store for information of interest based upon a set of predetermined parameters; aggregates data retrieved from the data store as predetermined that represent such interests as trends of importance, past instances of an event or set of events within a system under analysis or possible cause and effect relationships between two or more variables over many iterations; and provides summary information based upon the breadth of the data analyzed to the messaging software module; and receives communication from the messaging software module which may be in the form of requests for particular information or directives concerning the information being supplied at that time. The transformation pipeline software module: receives streaming data from the data filter software module; performs one or more functions on data within data stream; provides data resultant from the set of function pipeline back to the system; and receives directives from the system sanity and retrain module to modify the function of the pipeline. The messaging software module: receives administrative directives from those conducting the analysis; receives data store analysis summaries from batch event analysis server; receives results of pipeline data functions from transformation pipeline software module; and sends data analysis status and progress related messages as well as administrative execution directives to the system sanity and retrain software module. The system sanity and retrain software module: receives data analysis status and progress information from the messaging software module; compares all incoming information against preassigned parameters to ensure system stability; changes operational behavior within other software modules of system using preexisting guidelines to return required system function; sends alert signal through the output module concerning degraded system status as necessary; and receives and applies any administrative requests for changes in system function. Finally, the output module: receives information destined for outside of the system; formats that information based upon designated end target; and routes that information to the proper port for intended further action.

According to another preferred embodiment of the invention, a method for a system for the predictive analysis of very large data sets using the distributed computational graph, the method comprising the following steps: To receive streaming input from one or more of a plurality of data sources. To filter data of incomplete, misconfigured or damaged input. To formalize input data for use in batch and streaming portions of method using pre-designed standard. To perform a set of one or more data transformations on formalized input. To perform sanity checks of results of transformation pipeline analysis of streaming data as well as analysis process retraining based upon batch analysis of input data. Finally, to output the results of the analysis process in format predecided upon by the authors of the analysis.

The inventor has developed a distributed system for large volume deep web data extraction that is extremely scalable, allows multiple heterogeneous concurrent searches, has powerful web scrape result processing capabilities and uses a well defined, highly customizable, simplified, search agent configuration interface requiring minimal specialized programming knowledge.

According to a preferred embodiment of the invention, a distributed system for large volume deep web data extraction comprising a distributed scrape campaign controller module stored in a memory of and operating on a processor of a computing device, a scrape requests data store stored in a memory of and operating on a processor of a computing device, a scrape request monitor module stored in a memory of and operating on a processor of a computing device, one or more scrape servers stored in a memory of and operating on a processor of one of more computing devices, a persistence service module stored in a memory of and operating on a processor of a computing device, a persistence data store stored in a memory of and operating on a processor of a computing device and an output module stored in a memory of and operating on a processor of a computing device is disclosed. The distributed scrape campaign controller module: may receive web search configuration parameters from a plurality of possible software applications through HTTP based APIs, may also receive web search configuration parameters from either a computer terminal or a plurality of possible software applications through a command line interface, uses the scrape request data store to store both generalized search control parameters and configuration parameters specific to individual web search agents (spiders) derived from the HTTP API and command line interface directives, coordinates one or more World Wide Web searches (scrapes) using both general search control parameters and spider specific configuration data, and receives scrape progress feedback information from the request data store monitor module which may lead to issuance of further web search control parameters. The scrape request data store: receives World Wide Web search control parameters and spider specific configuration information from the distributed scrape campaign controller module, and stores scrape control parameters, spider configuration parameters, scrape status data. The request data store monitor module: monitors the web scrape status data stored for each ongoing search in the scrape request data store, processes that information as programmatically pre-determined for the search monitored, sends the processed data to the distributed scrape campaign controller as appropriate. The scrape server: hosts the independent spiders on that server, receives scrape specific control directives and spider configuration parameters from the distributed scrape campaign controller module, controls and monitors the spiders on that server, returns scrape status data from the spiders on that server to the distributed scrape campaign controller and scrape request data store, sends web page data retrieved by its spiders to the persistence service module for possible persistent data store storage and possible output. Finally, the output module: produces results in a format pre-determined by the owners of the scrape campaign.

According to another preferred embodiment of the invention, a method for large volume deep web data extraction using a distributed computer system, the method comprising the steps of: To receive World Wide Web scrape control directives and web scrape agent (spider) configuration data from a command line interface or HTTP based interface. To store the World Wide Web scrape control directives and spider configuration data in a database. To initiate and coordinate web scraping campaigns using the stored web scrape control directives and spider configuration parameters employing a plurality of independent spiders possibly distributed over a plurality of servers. To monitor the progress and health status of scrape campaigns using a set of predetermined programmatic criteria making either preprogrammed or manual modifications to parameters of the campaign as desired for optimal operation. To aggregate and possibly transform scrape data retrieved by the independent spiders per design of the scrape campaign. Finally, output scrape campaign status and result information in formats pre-decided during design of the campaign, optionally storing that result information in a data store.

Accordingly, the inventor has developed a distributed system for the capture and storage of time series data from sensors with heterogeneous reporting profiles which can scale to receive periods of high data throughput. The system further includes the capacity to archive data that has surpassed a predetermined age within the live data store but which is still required. The system includes a robust SQL-like query language that not only permits users to use complex logic to specifically select desired data, but also to employ data transformation processes on selected data before data is displayed.

According to a preferred embodiment of the invention, a system for capture, analysis and storage of data time series from sensors with heterogeneous report interval profiles comprising a data stream management engine stored in a memory of and operating on a processor of a computing device, a multidimensional time series data store stored in a memory of and operating on a processor of a computing device, a data query and output engine stored in a memory of and operating on a processor of one of more computing devices is disclosed. According to the embodiment, the data stream management engine receives a plurality of sensor data, aggregates the sensor data over a predetermined amount of time, a predetermined quantity of data, or a predetermined number of events for transmission into the multidimensional time series data store, transmits a specific quantity of aggregated sensor data per each access connection predetermined to allow reliable transmission to and inclusion of the data into the multidimensional time series data store, and transparently transmits quantities of aggregated sensor data too large to be reliably transferred by one access connection using a further plurality access connections to allow capture of all aggregated sensor data by the multidimensional time series data store under conditions of heavy sensor data influx. Also according to the embodiment, the multidimensional time series data store stores aggregated sensor data in a simple key-value pair format with very little or no data transformation from how the aggregated sensor data is received, and stores data for a predetermined number of samples and then automatically purges the oldest data. Further, in some embodiments the data query and output engine is a point of interaction to set up analysis prior to sensor data collection by specifying such parameters as number of events or time units to be placed within each quantum of aggregated sensor data, the number of connection lanes between the data stream management engine and the multidimensional time series data store, number of lanes that can be combined at one time to transfer aggregated sensor data to the multidimensional data store, number of interrelated dimensions to be stored per sensor, has an SQL like query language to retrieve sensor data of interest from the multidimensional time series database in a useful format and is the point of interaction for selecting transformations performed on the retrieved multidimensional time series data store as well as specifying the format of data output.

According to another preferred embodiment of the invention, a method for capture, analysis and storage of data time series from sensors with heterogeneous report interval profiles is disclosed, the method comprising the steps of: (a) receiving raw data from remote sensors with irregular reporting interval profiles; (b) aggregating the sensor data based upon the number of sensors included in the analysis and a predetermined time interval or a predetermined number of events; (c) transferring aggregated sensor data to a multidimensional time series data store using one to a predetermined plurality of communication lines dependent upon the number of raw sensors reporting data; (d) storing un-transformed aggregated sensor data in a key-value pair data store for a predetermined period of time, removing the stored aggregated sensor data as it times out; (e) retrieving aggregated sensor data of interest to an ongoing analysis from the multidimensional data store using an SQL-like query language; and (f) transforming then formatting that data as best suited to its role in the ongoing analysis.

Accordingly, the inventor has developed a distributed system for the fully integrated retrieval, and deep analysis of business operational information from a plurality of sources. The system further uses results of business information analytics to optimize the making of business decisions and allow for alternate action pathways to be simulated using the latest data and machine mediated prediction algorithms.

According to a preferred embodiment of the invention, a system for comprising: a business data retrieval engine stored in a memory of and operating on a processor of a computing device, a business data analysis engine stored in a memory of and operating on a processor of a computing device and a business decision and business action path simulation engine stored in a memory of and operating on a processor of one of more computing devices. Wherein, the business information retrieval engine: retrieves a plurality of business related data from a plurality of sources, accepts a plurality of analysis parameters and control commands directly from human interface devices or from one or more command and control storage devices, and stores accumulated retrieved information for processing by data analysis engine or predetermined data timeout. The business information analysis engine: retrieves a plurality of data types from the business information retrieval engine, performs a plurality of analytical functions and transformations on retrieved data based upon the specific goals and needs set forth in a current campaign by business process analysis authors. Wherein the business decision and business action path simulation engine: employs results of data analyses and transformations performed by the business information analysis engine, together with available supplemental data from a plurality of sources as well as any current campaign specific machine learning, commands and parameters from business process analysis authors to formulate current business operations and risk status reports and employs results of data analyses and transformations performed by the business information analysis engine, together with available supplemental data from a plurality of sources, any current campaign specific commands and parameters from business process analysis authors, as well as input gleaned from machine learning algorithms to deliver business action pathway simulations and business decision support to a first end user.

According to another embodiment of the invention, the system's business information retrieval engine is stored in the memory of and operating on a processor of a computing device, employs a portal for human interface device input at least a portion of which are business related data and at least another portion of which are commands and parameters related to the conduct of a current business analysis campaign. The business information retrieval engine employs a high throughput deep web scraper stored in the memory of an operating on a processor of a computing device, which receives at least some spider configuration parameters from the highly customizable cloud based interface, coordinates one or more world wide web searches (scrapes) using both general search control parameters and individual web search agent (spider) specific configuration data, receives scrape progress feedback information which may lead to issuance of further web search control parameters, controls and monitors the spiders on distributed scrape servers, receives the raw scrape campaign data from scrape servers, aggregates at least portions of scrape campaign data from each web site or web page traversed as per the parameters of the scrape campaign. The archetype spiders are provided by a program library and individual spiders are created using configuration files. Scrape campaign requests are persistently stored and can be reused or used as the basis for similar scrape campaigns. The business information retrieval engine employs a multidimensional time series data store stored in a memory of and operating on a processor of a computing device to receive a plurality of data from a plurality of sensors of heterogeneous types, some of which may have heterogeneous reporting and data payload transmission profiles, aggregates the sensor data over a predetermined amount of time, a predetermined quantity of data or a predetermined number of events, retrieves a specific quantity of aggregated sensor data per each access connection predetermined to allow reliable receipt and inclusion of the data, transparently retrieves quantities of aggregated sensor data too large to be reliably transferred by one access connection using a further plurality access connections to allow capture of all aggregated sensor data under conditions of heavy sensor data influx and stores aggregated sensor data in a simple key-value pair with very little or no data transformation from how the aggregated sensor data is received. Last, the business data analysis engine employs a directed computational graph stored in the memory of an operating system on a processor of a computing device which, retrieves streams of input from one or more of a plurality of data sources, filters data to remove data records from the stream for a plurality of reasons drawn from, but not limited to a set comprising absence of all information, damage to data in the record, and presence of in-congruent information or missing information which invalidates the data record, splits filtered data stream into two or more identical parts, formats data within one data stream based upon a set of predetermined parameters so as to prepare for meaningful storage in a data store, sends identical data stream further analysis and either linear transformation or branching transformation using resources of the system.

According to another embodiment of the invention, a method for fully integrated capture, and transformative analysis of business impactful information resulting in predictive decision making and simulation the method comprising the steps of: (a) retrieving business related data and analysis campaign command and control information using a business information retrieval engine stored in the memory of an operating on a processor of a computing device; (b) analyzing and transforming retrieved business related data using a business information analysis engine stored in the memory of an operating on a processor of a computing device in conjunction with previously designed analysis campaign command and control information; and (c) presenting business decision critical information as well as business action pathway simulation information using a business decision and business action path simulation engine based upon the results of analysis of previously retrieved business related data and previously entered analysis campaign command and control information.

Accordingly, the inventor has developed a distributed system for the fully integrated retrieval, and deep analysis of business operational information from a plurality of sources. The system further uses results of business information analytics to optimize the making of business decisions and allow for alternate action pathways to be simulated using the latest data and machine mediated prediction algorithms. Specifically, portions of the system are applied to the areas of IT security and predictively enhancing the reliability of client-facing IT infrastructure.

According to a preferred embodiment of the invention, a system for fully integrated collection of business impacting data, analysis of that data and generation of both analysis driven business decisions and analysis driven simulations of alternate candidate business decision comprising: a business data retrieval engine stored in a memory of and operating on a processor of a computing device, a business data analysis engine stored in a memory of and operating on a processor of a computing device and a business decision and business action path simulation engine stored in a memory of and operating on a processor of one of more computing devices. The business information retrieval engine: retrieves a plurality of business related data from a plurality of sources, accepts a plurality of analysis parameters and control commands directly from human interface devices or from one or more command and control storage devices and stores accumulated retrieved information for processing by data analysis engine or predetermined data timeout. The business information analysis engine: retrieves a plurality of data types from the business information retrieval engine, and performs a plurality of analytical functions and transformations on retrieved data based upon the specific goals and needs set forth in a current campaign by business process analysis authors. The business decision and business action path simulation engine: employs results of data analyses and transformations performed by the business information analysis engine, together with available supplemental data from a plurality of sources as well as any current campaign specific machine learning, commands and parameters from business process analysis authors to formulate current business operations and risk status reports and employs results of data analyses and transformations performed by the business information analysis engine, together with available supplemental data from a plurality of sources, any current campaign specific commands and parameters from business process analysis authors, as well as input gleaned from machine learned algorithms to deliver business action pathway simulations and business decision support to a first end user.

According to another embodiment of the invention, the system's business information retrieval engine a stored in the memory of and operating on a processor of a computing device, employs a portal for human interface device input at least a portion of which are business related data and at least another portion of which are commands and parameters related to the conduct of a current business analysis campaign. The business information retrieval engine employs a high volume deep web scraper stored in the memory of an operating on a processor of a computing device, which receives at least some scrape control and spider configuration parameters from the highly customizable cloud based interface, coordinates one or more world wide web searches (scrapes) using both general search control parameters and individual web search agent (spider) specific configuration data, receives scrape progress feedback information which may lead to issuance of further web search control parameters, controls and monitors the spiders on distributed scrape servers, receives the raw scrape campaign data from scrape servers, aggregates at least portions of scrape campaign data from each web site or web page traversed as per the parameters of the scrape campaign. The archetype spiders are provided by a program library and individual spiders are created using configuration files. Scrape campaign requests are persistently stored and can be reused or used as the basis for similar scrape campaigns. The business information retrieval engine employs a multidimensional time series data store stored in a memory of and operating on a processor of a computing device to receive a plurality of data from a plurality of sensors of heterogeneous types, some of which may have heterogeneous reporting and data payload transmission profiles, aggregates the sensor data over a predetermined amount of time, a predetermined quantity of data or a predetermined number of events, retrieves a specific quantity of aggregated sensor data per each access connection predetermined to allow reliable receipt and inclusion of the data, transparently retrieves quantities of aggregated sensor data too large to be reliably transferred by one access connection using a further plurality access connections to allow capture of all aggregated sensor data under conditions of heavy sensor data influx and stores aggregated sensor data in a simple key-value pair with very little or no data transformation from how the aggregated sensor data is received. Last, the business data analysis engine employs a directed computational graph stored in the memory of an operating on a processor of a computing device which, retrieves streams of input from one or more of a plurality of data sources, filters data to remove data records from the stream for a plurality of reasons drawn from, but not limited to a set comprising absence of all information, damage to data in the record, and presence of in-congruent information or missing information which invalidates the data record, splits filtered data stream into two or more identical parts, formats data within one data stream based upon a set of predetermined parameters so as to prepare for meaningful storage in a data store, sends identical data stream further analysis and either linear transformation or branching transformation using resources of the system.

According to another embodiment of the invention, a method for fully integrated capture, and transformative analysis of business impactful information resulting in predictive decision making and simulation the method comprising the steps of: (a) retrieving business related data and analysis campaign command and control information using a business information retrieval engine stored in the memory of an operating on a processor of a computing device; (b) analyzing and transforming retrieved business related data using a business information analysis engine stored in the memory of an operating on a processor of a computing device in conjunction with previously designed analysis campaign command and control information; and (c) presenting business decision critical information as well as business action pathway simulation information using a business decision and business action path simulation engine based upon the results of analysis of previously retrieved business related data and previously entered analysis campaign command and control information.

According to another embodiment of the invention, a method for the detection of Kerberos based security exploits using a system for fully integrated capture, and analysis of business information the method comprising the steps of: (a) retrieving ticket granting ticket request information, service session key request information, user sign on attempt data from a Kerberos domain controller using a multidimensional time series database module stored in a memory of and operating on a processor of a computing device; (b) applying any pre-programmed multiple dimensional time series event-condition-action rules that are present and apply to Kerberos protocol events using the multidimensional time series database module; (c) performing conversion of data into graphs where objects are vertices and their relationships edges between vertices using a graph stack service stored in a memory of and operating on a processor of a computing device; and (d) performing an analytical transformation using a directed computational graph module. This technology stack may be applied without loss of generality to other problems, according to the invention.

According to yet another embodiment of the invention, a method to monitor the function of business critical IT infrastructure and business software performance using a system for fully integrated capture, and analysis of business information resulting in improved client-facing IT infrastructure reliability the method comprising the steps of: (a) Monitor IT equipment and application status statistics as well as failure messages using a multidimensional time series database module stored in a memory of and operating on a processor of a computing device. (b) Process the data retrieved from multidimensional time series database module using a graph stack service stored in a memory of and operating on a processor of a computing device with infrastructure items and software forming vertices of a relational graph and relationships between them forming edges of the graph. (c) Transform data acquired by the multidimensional time series database module using directed computational graph to formulate more complex diagnostic queries based upon the existing data using pre-programmed logic and machine learning and then process the results of those complex queries as predetermined by authors of the monitoring effort. (d) Present the results in format best suited to the downstream use of the processed data and wherein at least one set of results are displayed using an observation and state estimation service stored in a memory of and operating on a processor of a computing device.

BRIEF DESCRIPTION OF THE DRAWING FIGURES

The accompanying drawings illustrate several embodiments of the invention and, together with the description, serve to explain the principles of the invention according to the embodiments. One skilled in the art will recognize that the particular embodiments illustrated in the drawings are merely exemplary, and are not intended to limit the scope of the present invention.

FIG. 16. is a method diagram showing an exemplary configuration of a spider as used according to an embodiment of the invention or HTTPS.

Figure 17:
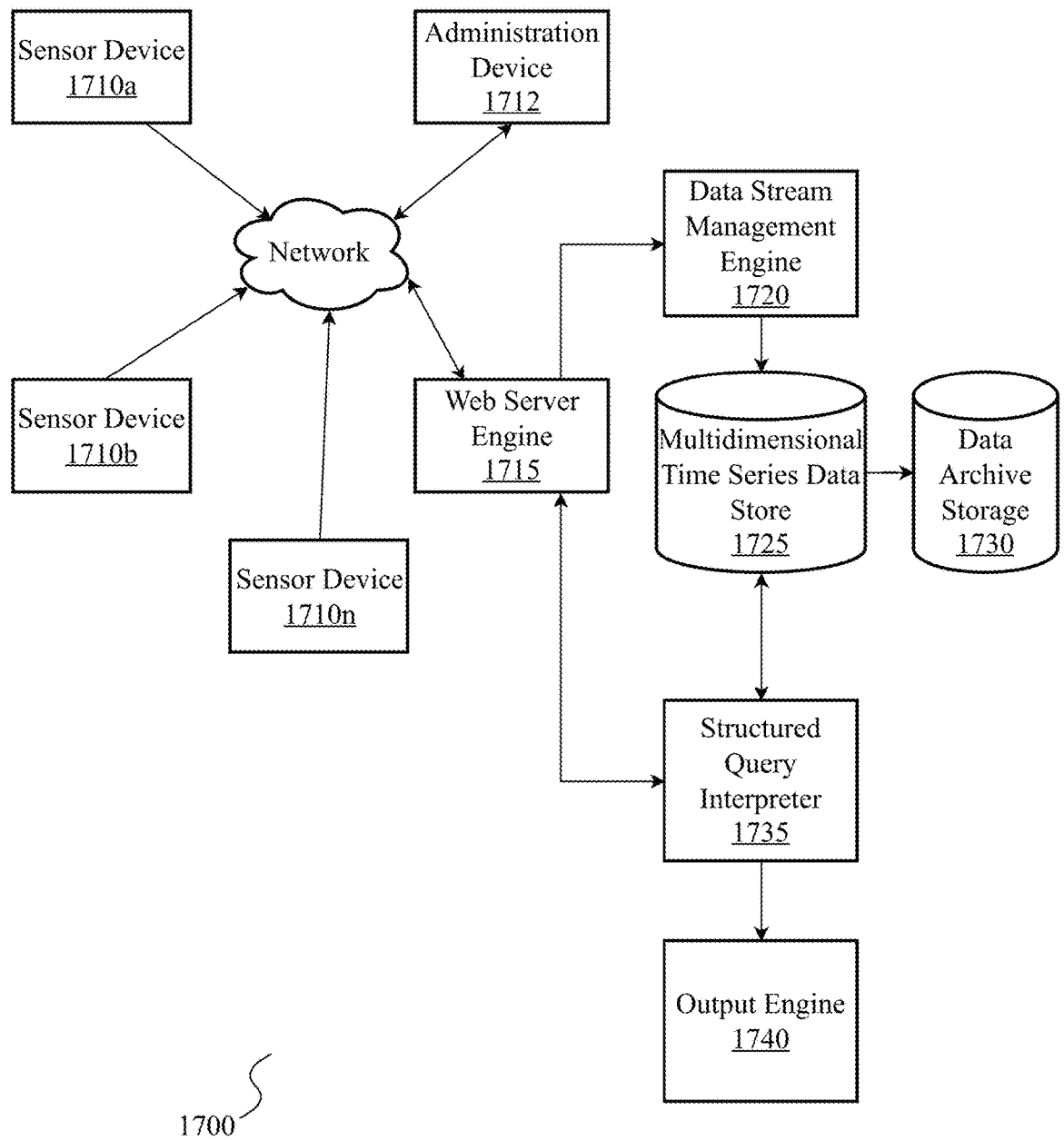

FIG. 17 is a diagram of an exemplary architecture of a system for the capture and storage of time series data from sensors with heterogeneous reporting profiles according to an embodiment of the invention.

Figure 18:
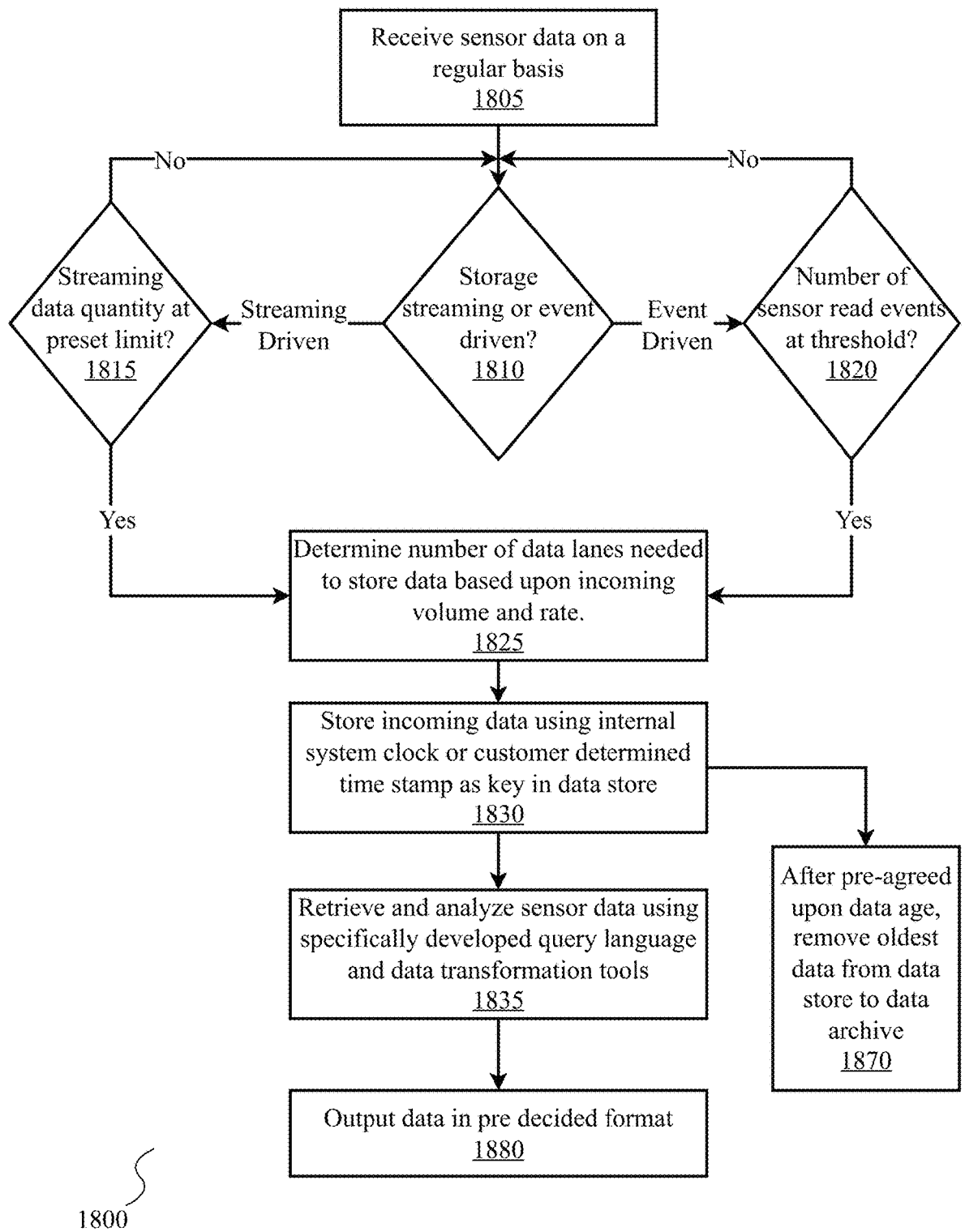

FIG. 18 is a method flow diagram showing an exemplary set of step used in the capture and storage of time series data from sensors with heterogeneous reporting profiles according to an embodiment of the invention.

Figure 19:
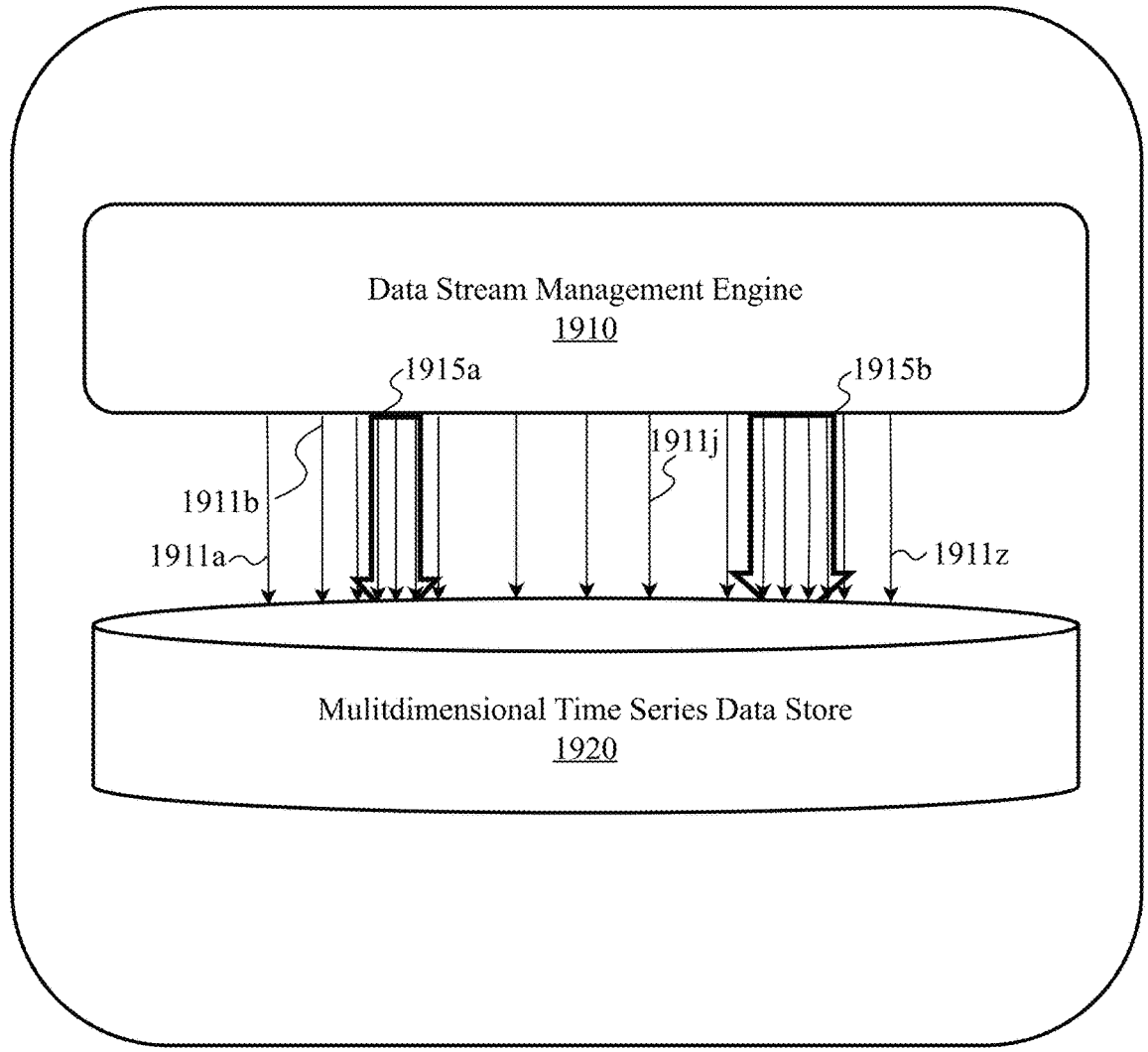

FIG. 19 is a process flow diagram of a method for the use of meta access channels to transparently accommodate levels of data streaming which would overload a single access channel according to an embodiment of the invention.

Figure 20:
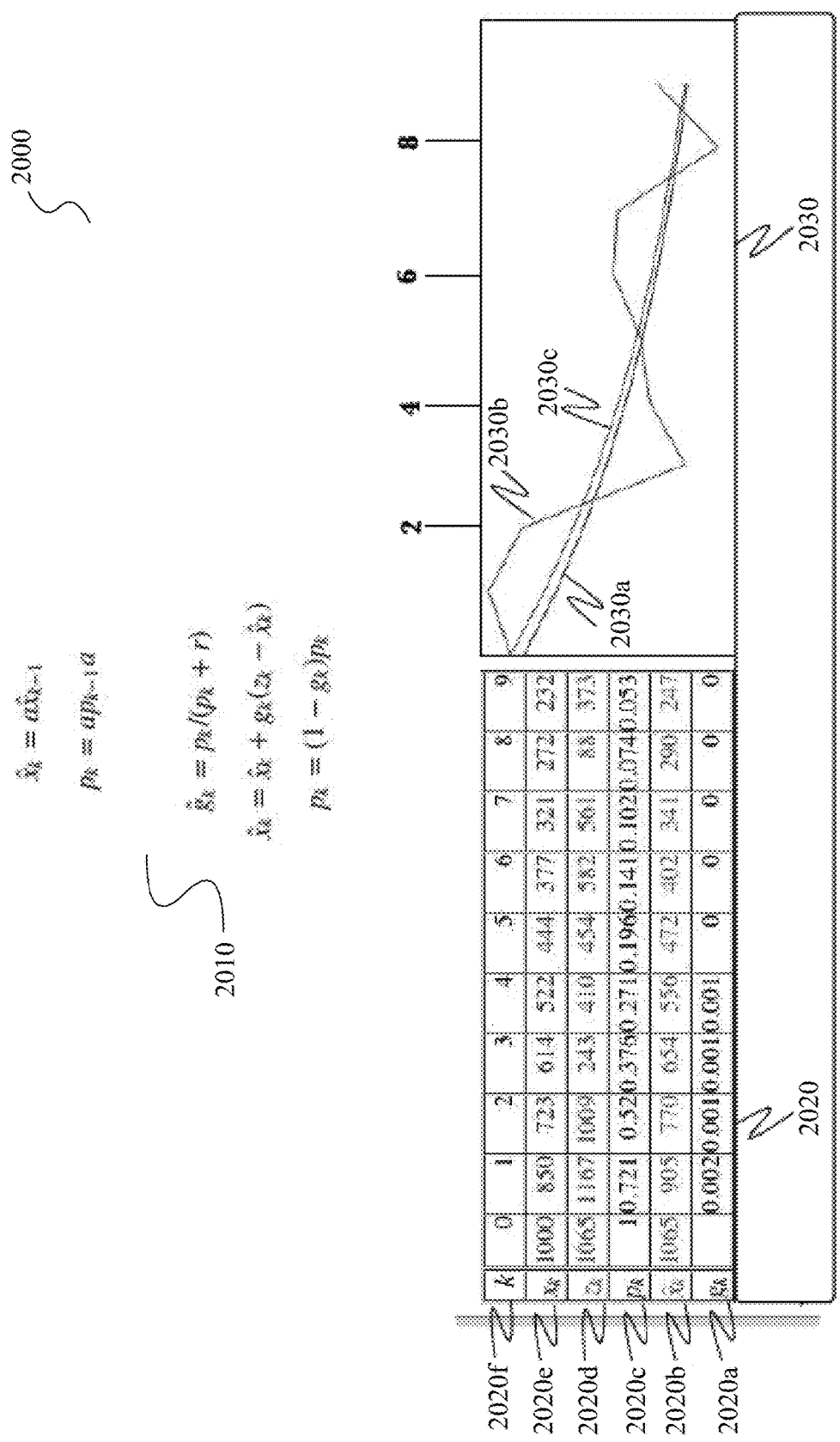

FIG. 20 is a simplified example of the use a Kalman filter to extract and smooth estimated system state from noisy sensor data according to an embodiment of the invention.

Figure 21:
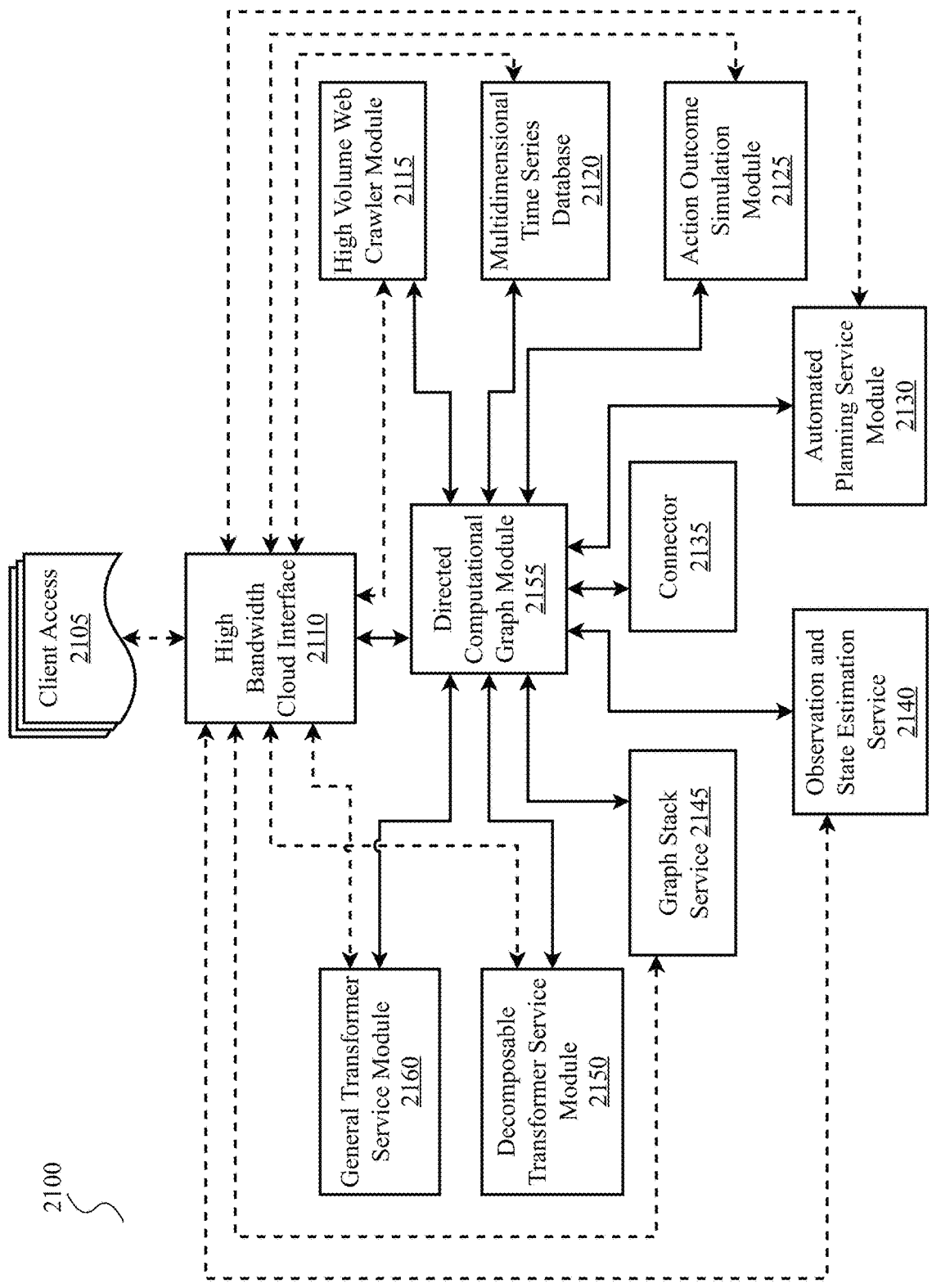

FIG. 21 is a diagram of an exemplary architecture of a business operating system according to an embodiment of the invention.

Figure 22:
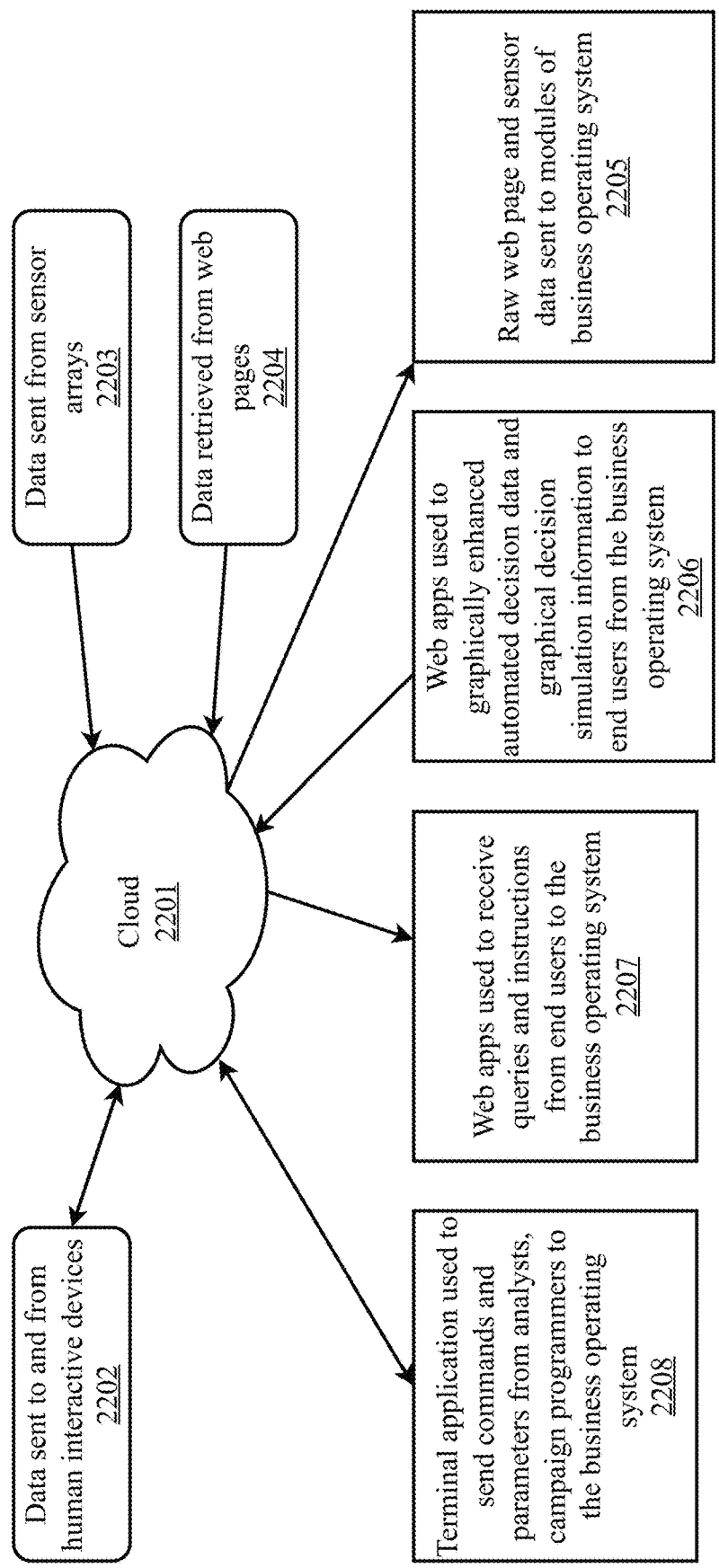

FIG. 22 is a process flow diagram showing an exemplary set of steps used in the function of the very high bandwidth cloud interface.

Figure 23:
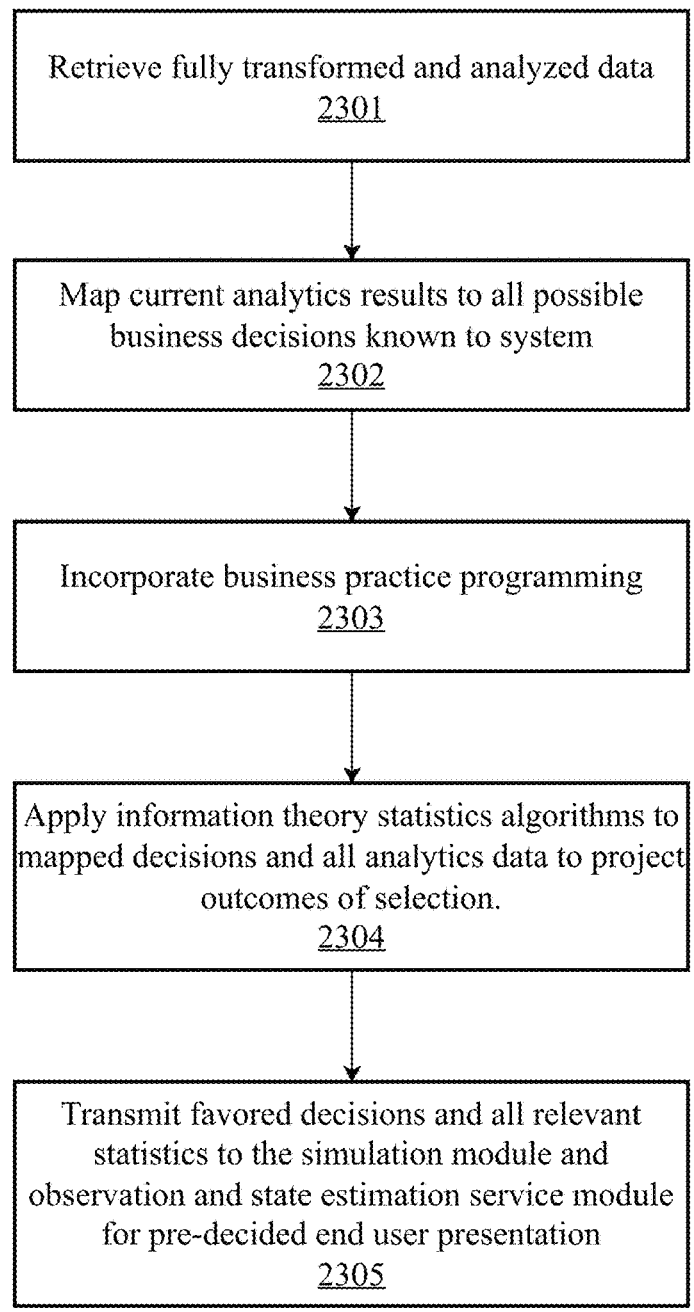

FIG. 23 is a method process flow diagram showing the operation of an automated planning service module according to an embodiment of the invention.

Figure 24:
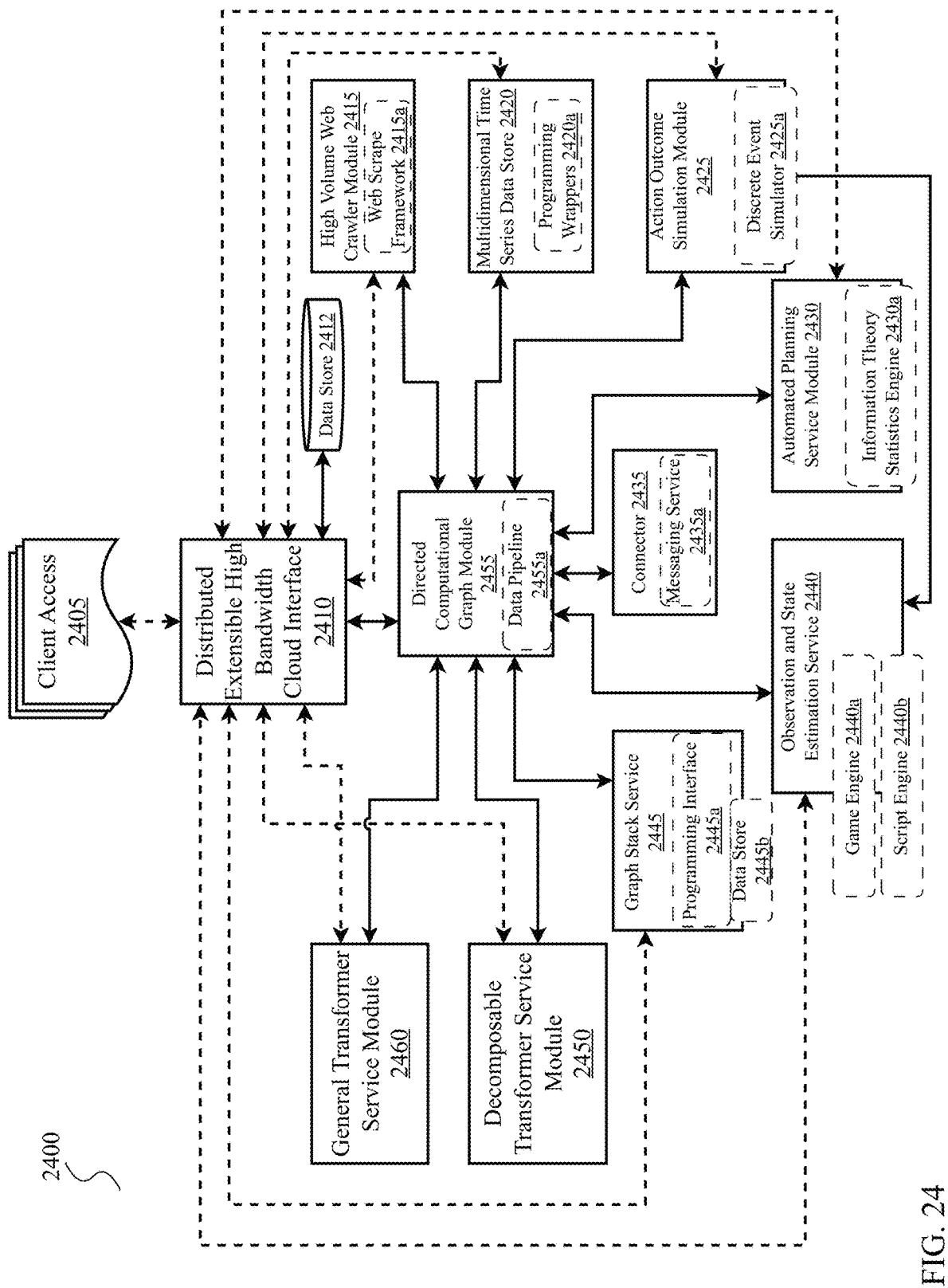

FIG. 24 is a diagram of an exemplary architecture of a business operating system according to an embodiment of the invention.

FIG. 25 is a process flow diagram showing an exemplary set of steps used in the function of the very high bandwidth cloud interface.

Figure 26:
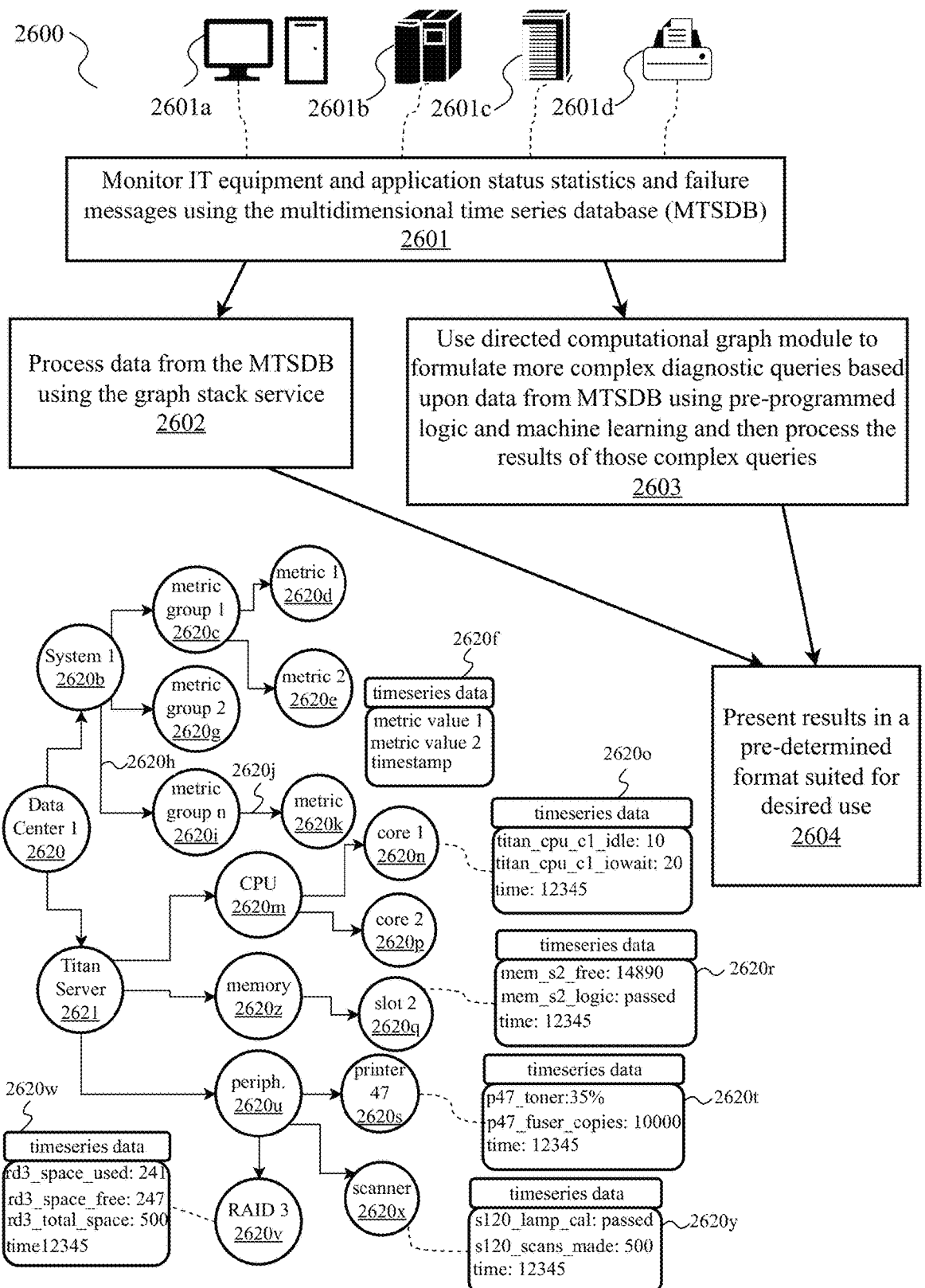

FIG. 26 is a diagram of an exemplary architecture for a linear transformation pipeline system which introduces the concept of the transformation pipeline as a directed graph of transformation nodes and messages according to an embodiment of the invention.

Figure 27:
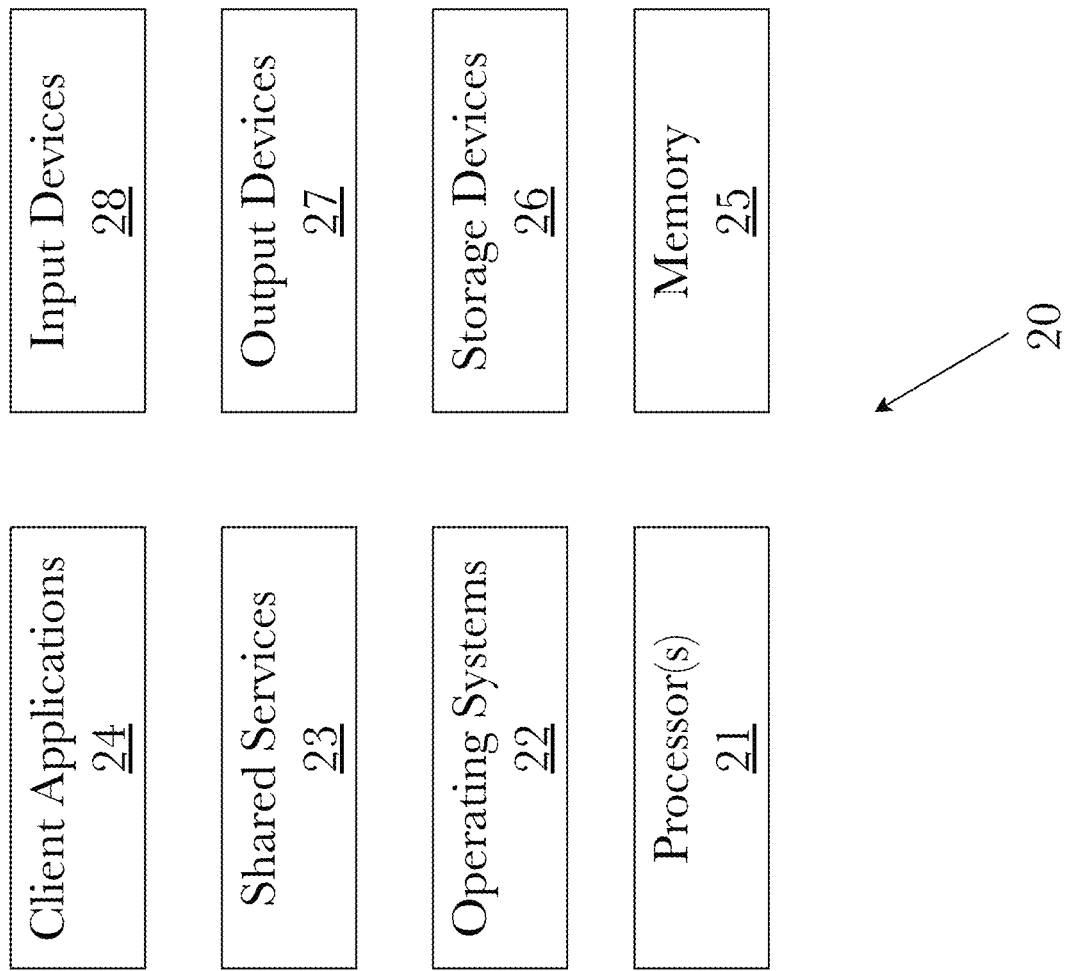

FIG. 27 is a block diagram illustrating an exemplary hardware architecture of a computing device used in various embodiments of the invention.

Figure 28:
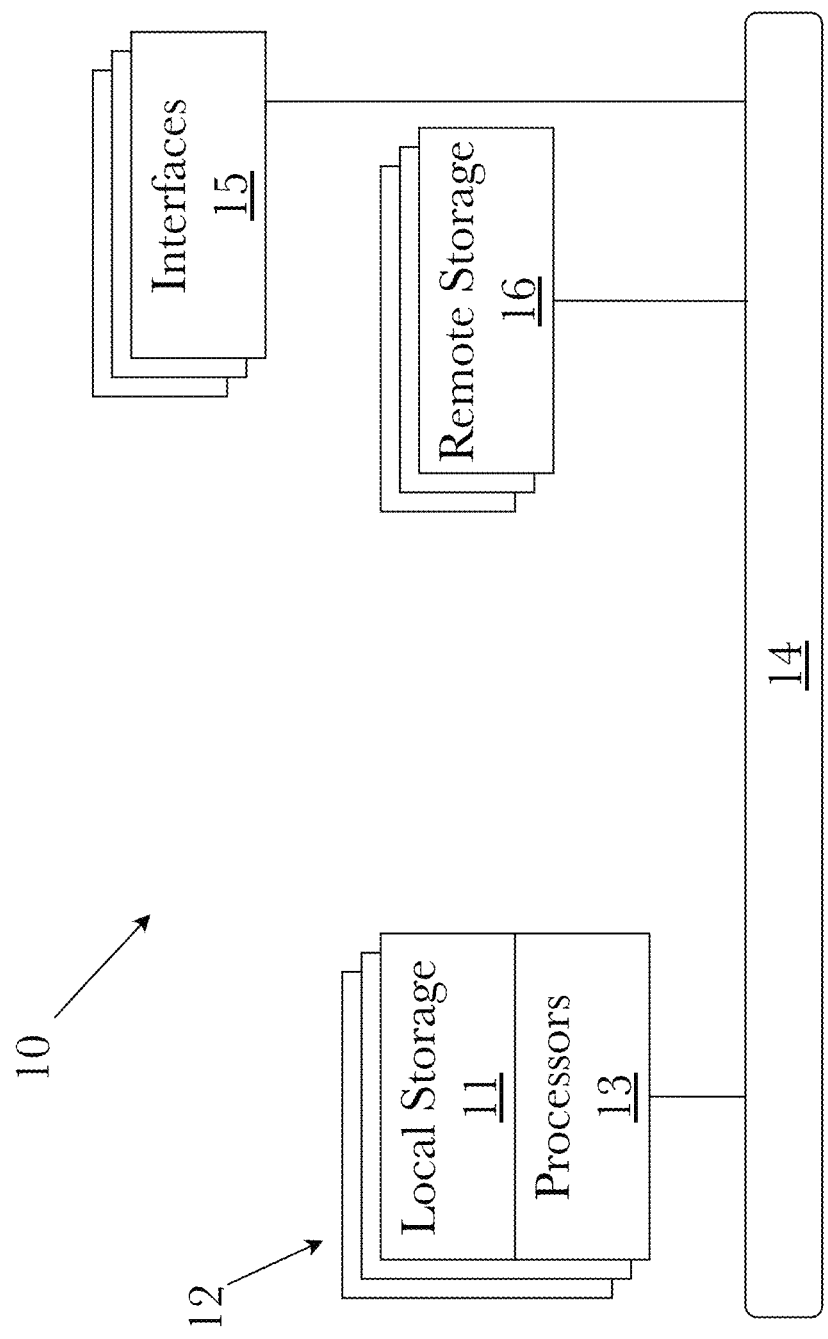

FIG. 28 is a block diagram illustrating an exemplary logical architecture for a client device, according to various embodiments of the invention.

Figure 29:
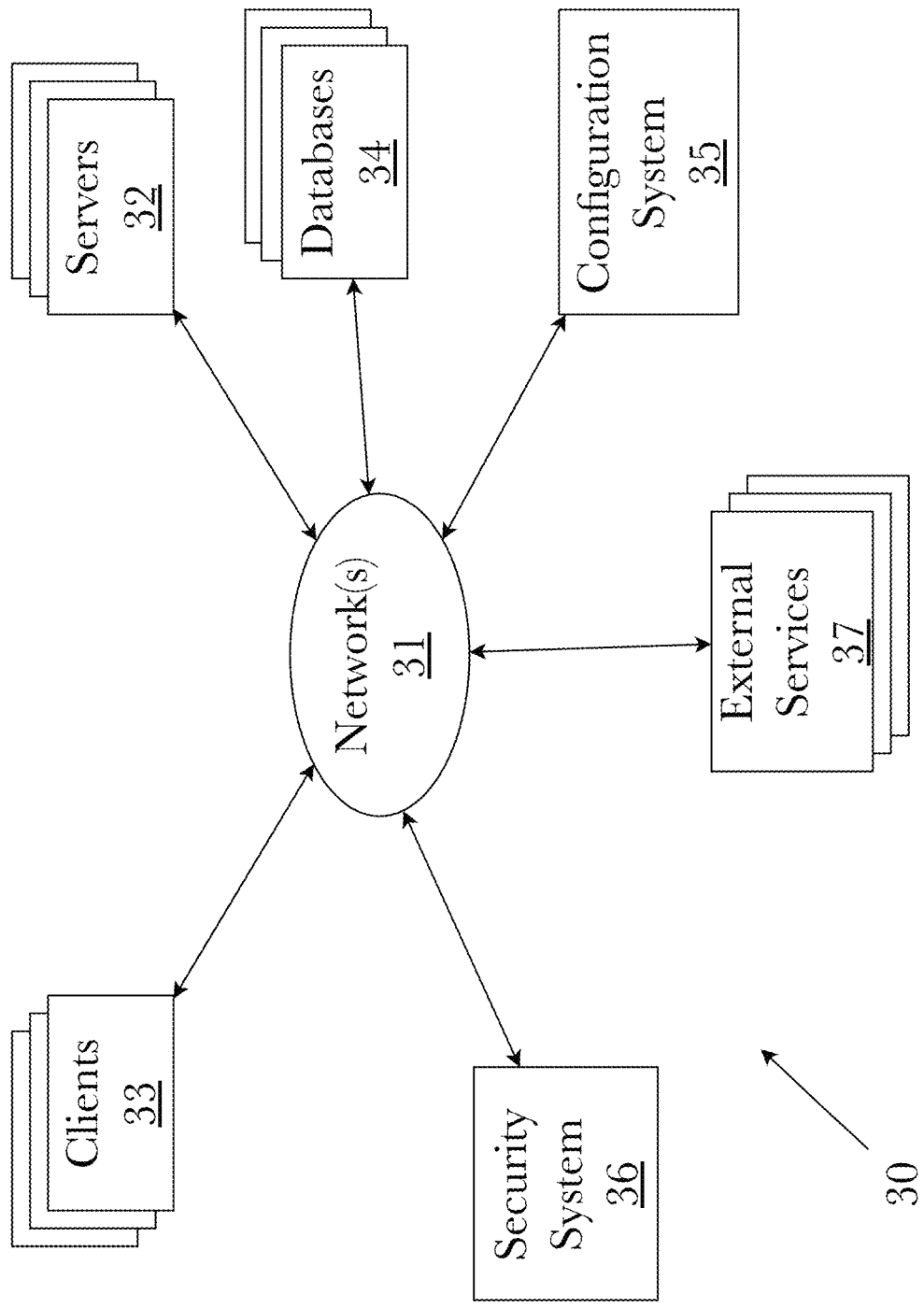

FIG. 29 is a block diagram illustrating an exemplary architectural arrangement of clients, servers, and external services, according to various embodiments of the invention.

Figure 30:
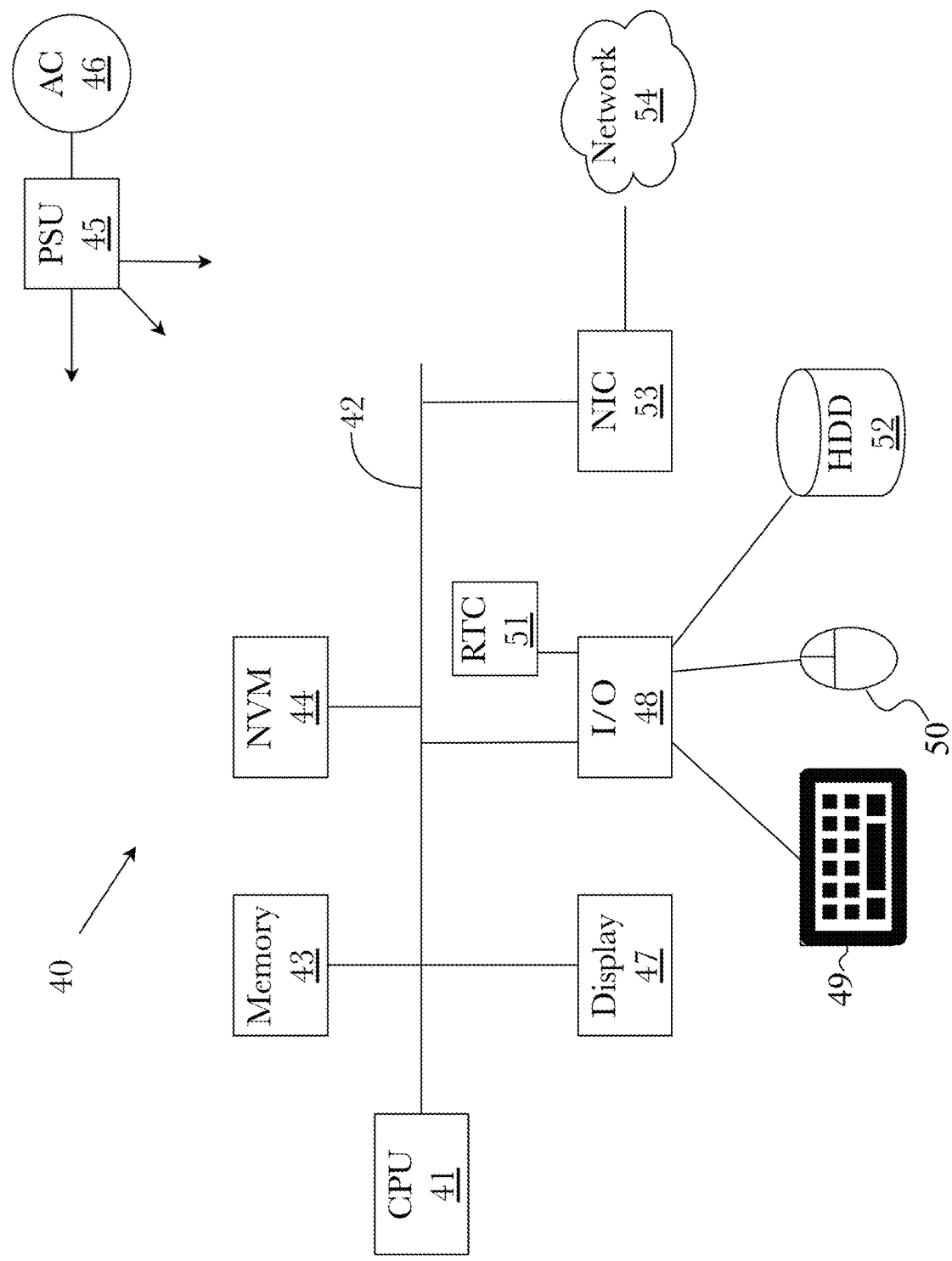

FIG. 30 is another block diagram illustrating an exemplary hardware architecture of a computing device used in various embodiments of the invention.

DETAILED DESCRIPTION

The inventor has conceived, and reduced to practice, various systems and methods for predictive analysis of very large data sets using a distributed computational graph.

The inventor has conceived, and reduced to practice, various systems and methods for scraping data, at scale, from sites on the World Wide Web using distributed computing.

The inventor has conceived, and reduced to practice, a system and method for capture, analysis, and storage of time series data from sensors with heterogeneous report interval profiles.

The inventor has conceived, and reduced to practice, a system and method for fully integrated capture and analysis of business information resulting in predictive decision making and simulation.

One or more different inventions may be described in the present application. Further, for one or more of the inventions described herein, numerous alternative embodiments may be described; it should be understood that these are presented for illustrative purposes only. The described embodiments are not intended to be limiting in any sense. One or more of the inventions may be widely applicable to numerous embodiments, as is readily apparent from the disclosure. In general, embodiments are described in sufficient detail to enable those skilled in the art to practice one or more of the inventions, and it is to be understood that other embodiments may be utilized and that structural, logical, software, electrical and other changes may be made without departing from the scope of the particular inventions. Accordingly, those skilled in the art will recognize that one or more of the inventions may be practiced with various modifications and alterations. Particular features of one or more of the inventions may be described with reference to one or more particular embodiments or figures that form a part of the present disclosure, and in which are shown, by way of illustration, specific embodiments of one or more of the inventions. It should be understood, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring sequentially (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described, it will be readily apparent that more than one device or article may be used in place of a single device or article. Similarly, where more than one device or article is described, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be noted that particular embodiments include multiple iterations of a technique or multiple manifestations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Definitions

As used herein, "graph" is a representation of information and relationships, where each primary unit of information makes up a "node" or "vertex" of the graph and the relationship between two nodes makes up an edge of the graph. Nodes can be further qualified by the connection of one or more descriptors or "properties" to that node. For example, given the node "James R," name information for a person, qualifying properties might be "183 cm tall", "DOB Aug. 13, 1965" and "speaks English". Similar to the use of properties to further describe the information in a node, a relationship between two nodes that forms an edge can be qualified using a "label". Thus, given a second node "Thomas G," an edge between "James R" and "Thomas G" that indicates that the two people know each other might be labeled "knows." When graph theory notation (Graph= (Vertices, Edges)) is applied this situation, the set of nodes are used as one parameter of the ordered pair, V and the set of 2 element edge endpoints are used as the second parameter of the ordered pair, E. When the order of the edge endpoints within the pairs of E is not significant, for example, the edge James R, Thomas G is equivalent to Thomas G, James R, the graph is designated as "undirected." Under circumstances when a relationship flows from one node to another in one direction, for example James R is "taller" than Thomas G, the order of the endpoints is significant. Graphs with such edges are designated as "directed." In the distributed computational graph system, transformations within transformation pipeline are represented as directed graph with each transformation comprising a node and the output messages between transformations comprising edges. Distributed computational graph stipulates the potential use of non-linear transformation pipelines which are programmatically linearized. Such linearization can result in exponential growth of resource consumption. The most sensible approach to overcome possibility is to introduce new transformation pipelines just as they are needed, creating only those that are ready to compute. Such method results in transformation graphs which are highly variable in size and node, edge composition as the system processes data streams. Those familiar with the art will realize that transformation graph may assume many shapes and sizes with a vast topography of edge relationships. The examples given were chosen for illustrative purposes only and represent a small number of the simplest of possibilities. These examples should not be taken to define the possible graphs expected as part of operation of the invention.

As used herein, "transformation" is a function performed on zero or more streams of input data which results in a single stream of output which may or may not then be used as input for another transformation. Transformations may comprise any combination of machine, human or machine-human interactions Transformations need not change data that enters them, one example of this type of transformation would be a storage transformation which would receive input and then act as a queue for that data for subsequent transformations. As implied above, a specific transformation may generate output data in the absence of input data. A time stamp serves as a example. In the invention, transformations are placed into pipelines such that the output of one transformation may serve as an input for another. These pipelines can consist of two or more transformations with the number of transformations limited only by the resources of the system. Historically, transformation pipelines have been linear with each transformation in the pipeline receiving input from one antecedent and providing output to one subsequent with no branching or iteration. Other pipeline configurations are possible. The invention is designed to permit several of these configurations including, but not limited to: linear, afferent branch, efferent branch and cyclical.

A "database" or "data storage subsystem" (these terms may be considered substantially synonymous), as used herein, is a system adapted for the long-term storage, indexing, and retrieval of data, the retrieval typically being via some sort of querying interface or language. "Database" may be used to refer to relational database management systems known in the art, but should not be considered to be limited to such systems. Many alternative database or data storage system technologies have been, and indeed are being, introduced in the art, including but not limited to distributed non-relational data storage systems such as Hadoop, column-oriented databases, in-memory databases, and the like. While various embodiments may preferentially employ one or another of the various data storage subsystems available in the art (or available in the future), the invention should not be construed to be so limited, as any data storage architecture may be used according to the embodiments. Similarly, while in some cases one or more particular data storage needs are described as being satisfied by separate components (for example, an expanded private capital markets database and a configuration database), these descriptions refer to functional uses of data storage systems and do not refer to their physical architecture. For instance, any group of data storage systems of databases referred to herein may be included together in a single database management system operating on a single machine, or they may be included in a single database management system operating on a cluster of machines as is known in the art. Similarly, any single database (such as an expanded private capital markets database) may be implemented on a single machine, on a set of machines using distributed technology, on several machines connected by one or more messaging systems known in the art, or in a master/slave arrangement common in the art. These examples should make clear that no particular architectural approaches to database management is preferred according to the invention, and choice of data storage technology is at the discretion of each implementer, without departing from the scope of the invention as claimed.

As used herein, "scrape campaign" means the directed deployment of web crawling agents (spiders) programmed to traverse the World Wide Web to a specific site or plurality of sites and to retrieve specifically requested data, possibly in the absence of prototypical web tags. Herein, the web sites targeted are expected to contain very large caches of both textual and graphical, with minimal tagging, type data and to require the use of large numbers of spiders possibly from multiple servers to retrieve. The rules governing the retrieval of the information to be scraped from the targeted sites or pages are also expected to be complex in nature and to require significant preplanning to successfully and meaningfully retrieve. Significant post-retrieval processing of the data may also be needed to attain the goals of the authors of the endeavor.

A "database" or "data store" (these terms may be considered substantially synonymous), as used herein, is a system adapted for the long-term storage, indexing, and retrieval of data, the retrieval typically being via some sort of querying interface or language. "Database" may be used to refer to relational database management systems known in the art, but should not be considered to be limited to such systems. Many alternative database or data storage system technologies have been, and indeed are being, introduced in the art, including but not limited to distributed non-relational data storage systems such as Hadoop, key-value databases, column-oriented databases, in-memory databases, and the like. While various embodiments may preferentially employ one or another of the various data storage subsystems available in the art (or available in the future), the invention should not be construed to be so limited, as any data storage architecture may be used according to the embodiments. Similarly, while in some cases one or more particular data storage needs are described as being satisfied by separate components (for example, an expanded private capital markets database and a configuration database), these descriptions refer to functional uses of data storage systems and do not refer to their physical architecture. For instance, any group of data storage systems of databases referred to herein may be included together in a single database management system operating on a single machine, or they may be included in a single database management system operating on a cluster of machines as is known in the art. Similarly, any single database (such as an expanded private capital markets database) may be implemented on a single machine, on a set of machines using distributed technology, on several machines connected by one or more messaging systems known in the art, or in a master/slave arrangement common in the art. These examples should make clear that no particular architectural approaches to database management is preferred according to the invention, and choice of data storage technology is at the discretion of each implementer, without departing from the scope of the invention as claimed.

As used herein, a "swimlane" is a communication channel between a time series sensor data reception and apportioning device and a data store meant to hold the apportioned data time series sensor data. A swimlane is able to move a specific, finite amount of data between the two devices. For example a single swimlane might reliably carry and have incorporated into the data store, the data equivalent of 5 seconds worth of data from 10 sensors in 5 seconds, this being its capacity. Attempts to place 5 seconds worth of data received from 6 sensors using one swimlane would result in data loss.

As used herein, a "metaswimlane" is an as-needed logical combination of transfer capacity of two or more real swimlanes that is transparent to the requesting process. Sensor studies where the amount of data received per unit time is expected to be highly heterogeneous over time may be initiated to use metaswimlanes. Using the example used above that a single real swimlane can transfer and incorporate the 5 seconds worth of data of 10 sensors without data loss, the sudden receipt of incoming sensor data from 13 sensors during a 5 second interval would cause the system to create a two swimlane metaswimlane to accommodate the standard 10 sensors of data in one real swimlane and the 3 sensor data overage in the second, transparently added real swimlane, however no changes to the data receipt logic would be needed as the data reception and apportionment device would add the additional real swimlane transparently.

Conceptual Architecture

Figure 1:
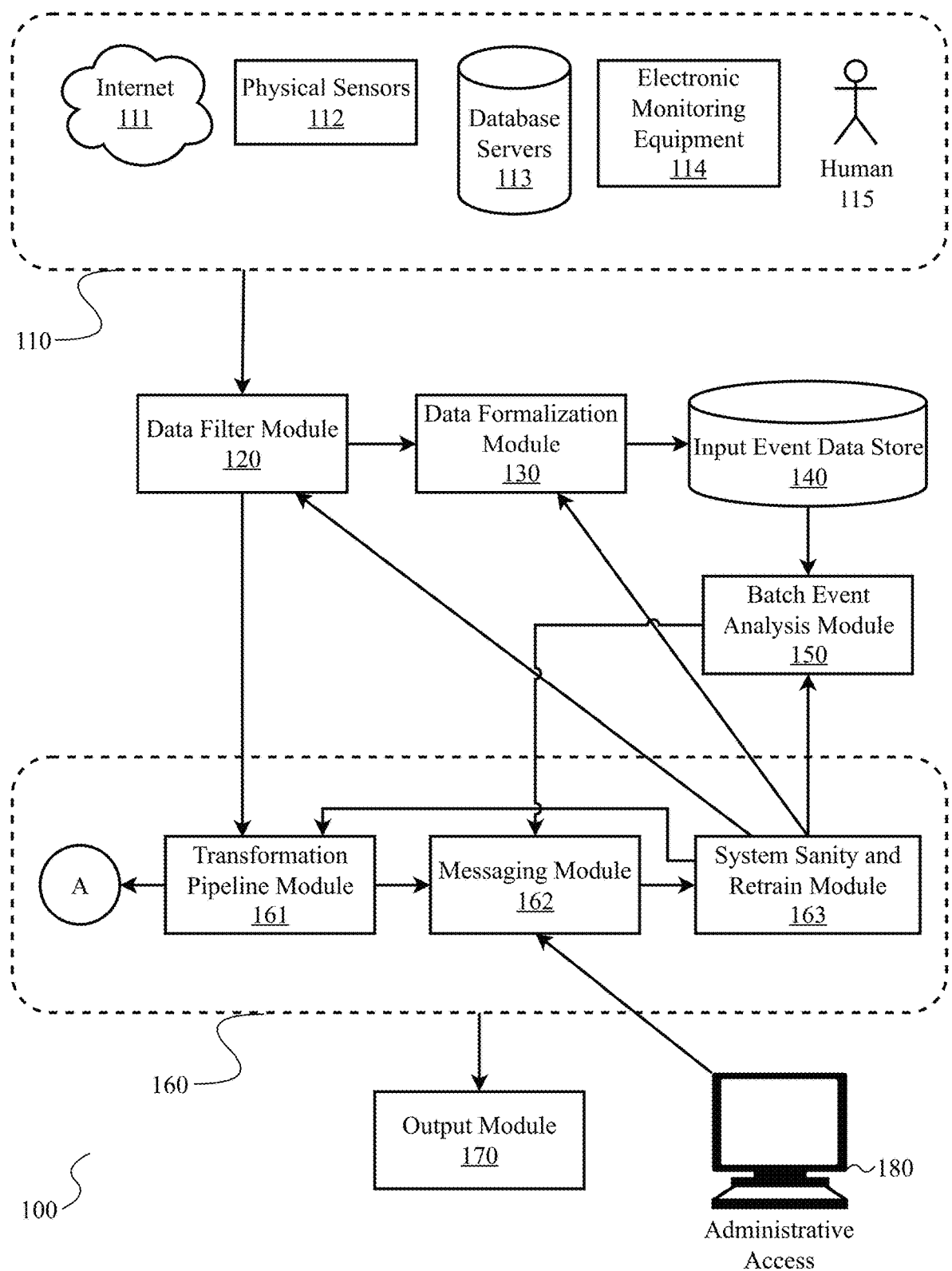
FIG. 1 is a diagram of an exemplary architecture for a system where streams of input data from one or more of a plurality of sources are analyzed to predict outcome using both batch analysis of acquired data and transformation pipeline manipulation of current streaming data according to an embodiment of the invention.

FIG. 1 is a block diagram of an exemplary architecture for a system 100 for predictive analysis of very large data sets using a distributed computational graph. According to the embodiment, streaming input feeds 110 may be a variety of data sources which may include but are not limited to the internet 111, arrays of physical sensors 112, database servers 113, electronic monitoring equipment 114 and direct human interaction 115 ranging from a relatively few number of participants to a large crowd sourcing campaign. Streaming data from any combinations of listed sources and those not listed may also be expected to occur as part of the operation of the invention as the number of streaming input sources is not limited by the design. All incoming streaming data may be passed through a data filter software module 120 to remove information that has been damaged in transit, is misconfigured, or is malformed in some way that precludes use. Many of the filter parameters may be expected to be preset prior to operation, however, design of the invention makes provision for the behavior of the filter software module 120 to be changed as progression of analysis requires through the automation of the system sanity and retrain software module 163 which may serve to optimize system operation and analysis function. The data stream may also be split into two identical substreams at the data filter software module 120 with one substream being fed into a streaming analysis pathway that includes the transformation pipeline software module 161 of the distributed computational graph 160. The other substream may be fed to data formalization software module 130 as part of the batch analysis pathway. The data formalization module 130 formats the data stream entering the batch analysis pathway of the invention into data records to be stored by the input event data store 140. The input event data store 140 can be a database of any architectural type known to those knowledgeable in the art, but based upon the quantity of the data the data store module would be expected to store and retrieve, options using highly distributed storage and map reduce query protocols, of which Hadoop is one, but not the only example, may be generally preferable to relational database schema.

Analysis of data from the input event data store may be performed by the batch event analysis software module 150. This module may be used to analyze the data in the input event data store for temporal information such as trends, previous occurrences of the progression of a set of events, with outcome, the occurrence of a single specific event with all events recorded before and after whether deemed relevant at the time or not, and presence of a particular event with all documented possible causative and remedial elements, including best guess probability information. Those knowledgeable in the art will recognize that while examples here focus on having stores of information pertaining to time, the use of the invention is not limited to such contexts as there are other fields where having a store of existing data would be critical to predictive analysis of streaming data 161. The search parameters used by the batch event analysis software module 150 are preset by those conducting the analysis at the beginning of the process, however, as the search matures and results are gleaned from the streaming data during transformation pipeline software module 161 operation, providing the system more timely event progress details, the system sanity and retrain software module 163 may automatically update the batch analysis parameters 150. Alternately, findings outside the system may precipitate the authors of the analysis to tune the batch analysis parameters administratively from outside the system 170, 162, 163. The real-time data analysis core 160 of the invention should be considered made up of a transformation pipeline software module 161, messaging module 162 and system sanity and retrain software module 163. The messaging module 162 has connections from both the batch and the streaming data analysis pathways and serves as a conduit for operational as well as result information between those two parts of the invention. The message module also receives messages from those administering analyses 180. Messages aggregated by the messaging module 162 may then be sent to system sanity and retrain software module 163 as appropriate. Several of the functions of the system sanity and retrain software module have already been disclosed. Briefly, this is software that may be used to monitor the progress of streaming data analysis optimizing coordination between streaming and batch analysis pathways by modifying or "retraining" the operation of the data filter software module 120, data formalization software module 130 and batch event analysis software module 140 and the transformation pipeline module 150 of the streaming pathway when the specifics of the search may change due to results produced during streaming analysis. System sanity and retrain module 163 may also monitor for data searches or transformations that are processing slowly or may have hung and for results that are outside established data stability boundaries so that actions can be implemented to resolve the issue. While the system sanity and retrain software module 163 may be designed to act autonomously and employs computer learning algorithms, according to some arrangements status updates may be made by administrators or potentially direct changes to operational parameters by such, according to the embodiment.

Streaming data entering from the outside data feeds 110 through the data filter software module 120 may be analyzed in real time within the transformation pipeline software module 161. Within a transformation pipeline, a set of functions tailored to the analysis being run are applied to the input data stream. According to the embodiment, functions may be applied in a linear, directed path or in more complex configurations. Functions may be modified over time during an analysis by the system sanity and retrain software module 163 and the results of the transformation pipeline, impacted by the results of batch analysis are then output in the format stipulated by the authors of the analysis which may be human readable printout, an alarm, machine readable information destined for another system or any of a plurality of other forms known to those in the art.

Figure 2:
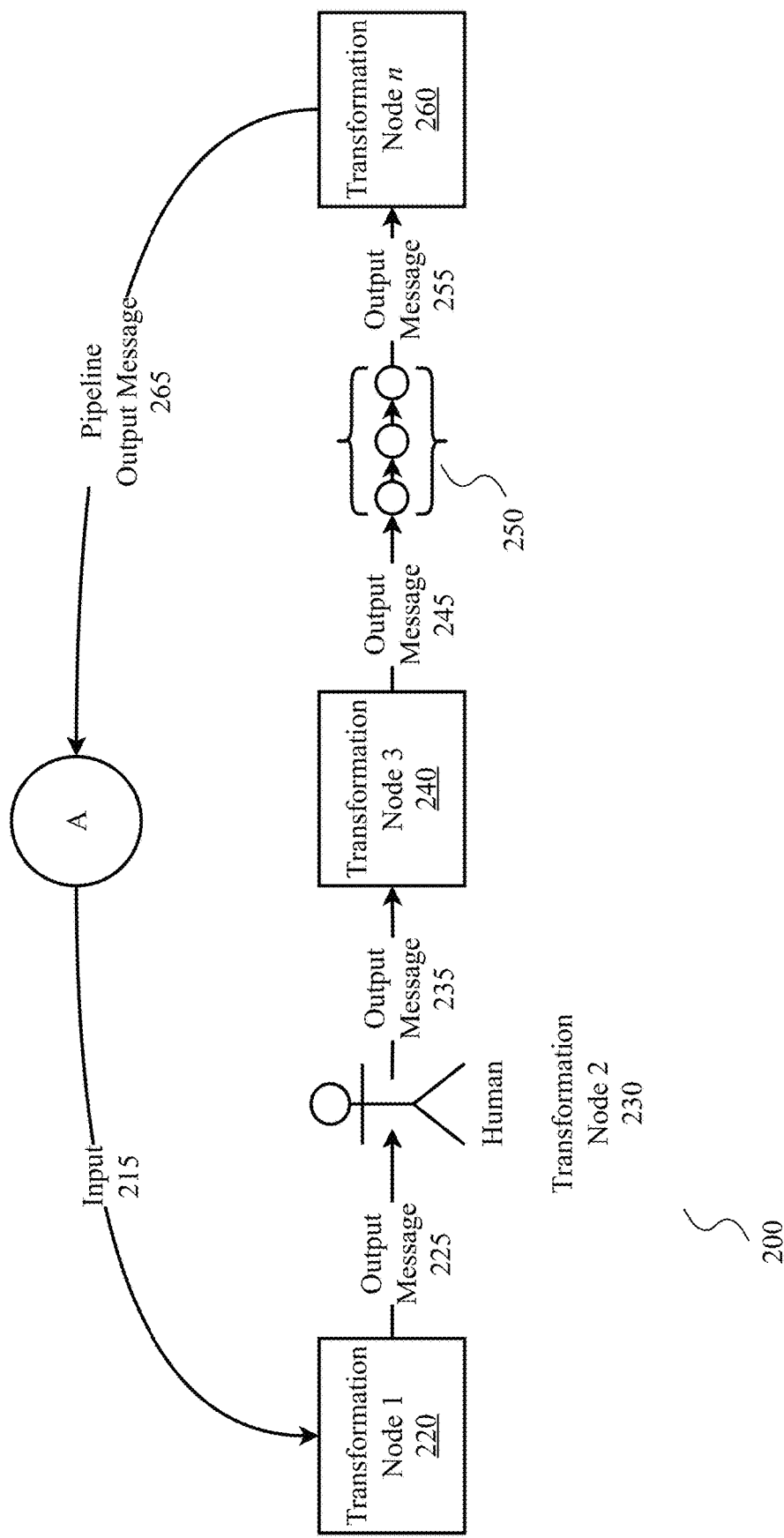
FIG. 2 (PRIOR ART) is a diagram of an exemplary architecture for a linear transformation pipeline system which introduces the concept of the transformation pipeline as a directed graph of transformation nodes and messages according to an embodiment of the invention.

FIG. 2 is a block diagram of a preferred architecture for a transformation pipeline within a system for predictive analysis of very large data sets using distributed computational graph 200. According to the embodiment, streaming input from the data filter software module 120, 215 serves as input to the first transformation node 220 of the transformation pipeline. Transformation node's function is performed on input data stream and transformed output message 225 is sent to transformation node 2 230. The progression of transformation nodes 220, 230, 240, 250, 260 and associated output messages from each node 225, 235, 245, 255 is linear in configuration this is the simplest arrangement and, as previously noted, represents the current state of the art. While transformation nodes are described according to various embodiments as uniform shape (referring to FIGS. 2-5), such uniformity is used for presentation simplicity and clarity and does not reflect necessary operational similarity between transformations within the pipeline. It should be appreciated that one knowledgeable in the field will realize that certain transformations in a pipeline may be entirely self-contained; certain transformations may involve direct human interaction 230, such as selection via dial or dials, positioning of switch or switches, or parameters set on control display, all of which may change during analysis; other transformations may require external aggregation or correlation services or may rely on remote procedure calls to synchronous or asynchronous analysis engines as might occur in simulations among a plurality of other possibilities. Further according to the embodiment, individual transformation nodes in one pipeline may represent function of another transformation pipeline. It should be appreciated that the node length of transformation pipelines depicted in no way confines the transformation pipelines employed by the invention to an arbitrary maximum length

240, 250, 260 as, being distributed, the number of transformations would be limited by the resources made available to each implementation of the invention. It should be further appreciated that there need be no limits on transform pipeline length. Output of the last transformation node and by extension, the transform pipeline 260 may be sent back to messaging software module 162 for predetermined action.

Figure 3:
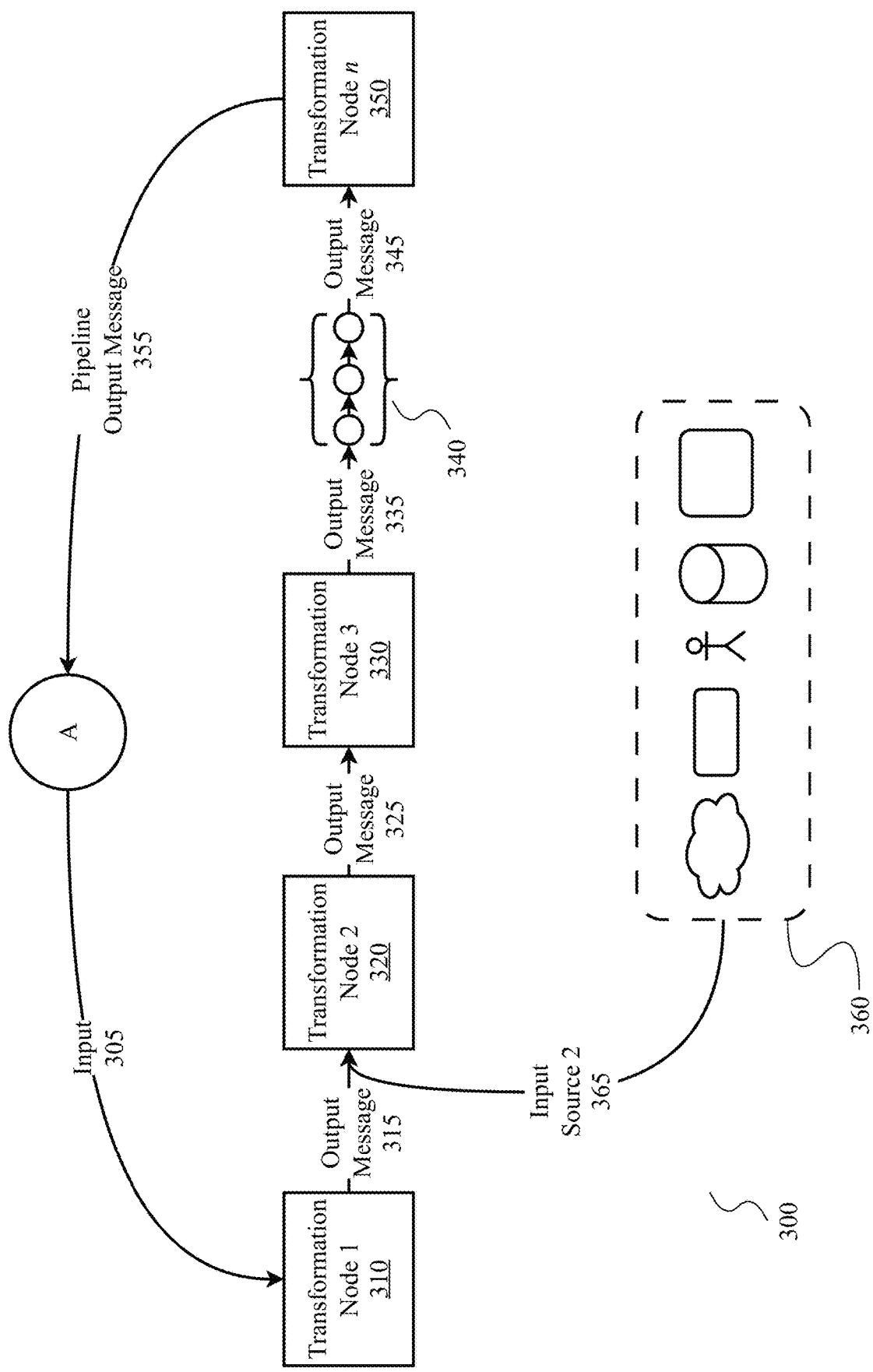
FIG. 3 is a diagram of an exemplary architecture for a transformation pipeline system where one of the transformations receives input from more than one source which introduces the concept of the transformation pipeline as a directed graph of transformation nodes and messages according to an embodiment of the invention.

FIG. 3 is a block diagram of another preferred architecture for a transformation pipeline within a system for predictive analysis of very large data sets using distributed computational graph 300. According to the embodiment, streaming input from a data filter software module 120, 305 serves as input to the first transformation node 310 of the transformation pipeline. Transformation node's function is performed on input data stream and transformed output message 315 is sent to transformation node 2 320. In this embodiment, transformation node 2 320 has a second input stream 360. The specific source of this input is inconsequential to the operation of the invention and could be another transformation pipeline software module, a data store, human interaction, physical sensors, monitoring equipment for other electronic systems or a stream from the internet as from a crowdsourcing campaign, just to name a few possibilities 360. Functional integration of a second input stream into one transformation node requires the two input stream events be serialized. The invention performs this serialization using a decomposable transformation software module (not shown), the function of which is described below, referring to FIG. 9. While transformation nodes are described according to various embodiments as uniform shape (referring to FIGS. 2-5), such uniformity is used for presentation simplicity and clarity and does not reflect necessary operational similarity between transformations within the pipeline. It should be appreciated that one knowledgeable in the field will realize that certain transformations in a pipeline may be entirely self-contained; certain transformations may involve direct human interaction 230, such as selection via dial or dials, positioning of switch or switches, or parameters set on control display, all of which may change during analysis; other transformations may require external aggregation or correlation services or may rely on remote procedure calls to synchronous or asynchronous analysis engines as might occur in simulations among a plurality of other possibilities. Further according to the embodiment, individual transformation nodes in one pipeline may represent function of another transformation pipeline. It should be appreciated that the node length of transformation pipelines depicted in no way confines the transformation pipelines employed by the invention to an arbitrary maximum length 310, 320, 330, 340, 350, as, being distributed, the number of transformations would be limited by the resources made available to each implementation of the invention. It should be further appreciated that there need be no limits on transform pipeline length. Output of the last transformation node and by extension, the transform pipeline, 350 may be sent back to messaging software module 162 for pre-decided action.

Figure 4:
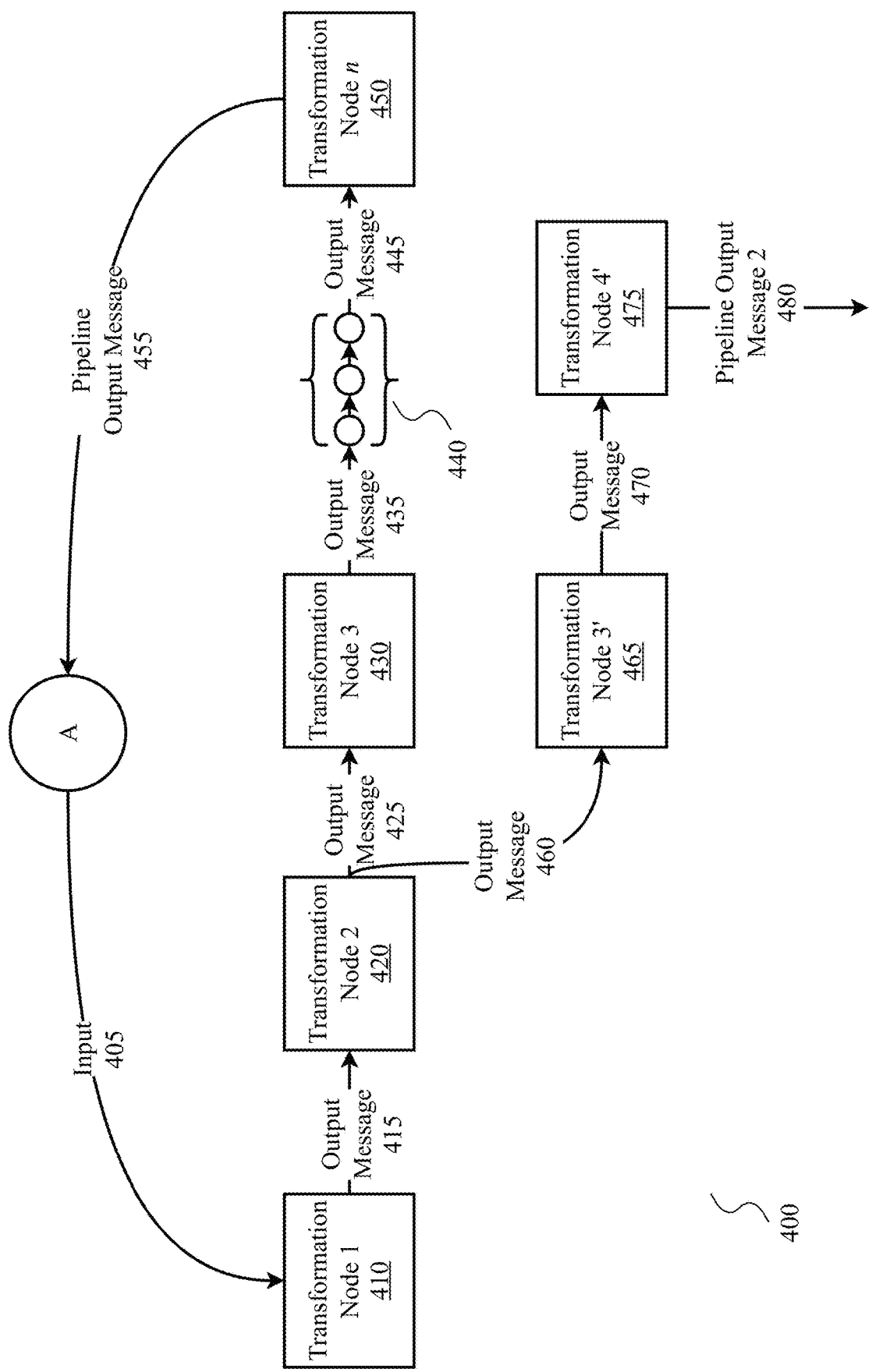
FIG. 4 is a diagram of an exemplary architecture for a transformation pipeline system where the output of one data transformation servers as the input of more than one downstream transformations which introduces the concept of the transformation pipeline as a directed graph of transformation nodes and messages according to an embodiment of the invention.

FIG. 4 is a block diagram of another preferred architecture for a transformation pipeline within a system for predictive analysis of very large data sets using distributed computational graph 300. According to the embodiment, streaming input from a data filter software module 120, 405 serves as input to the first transformation node 410 of the transformation pipeline. Transformation node's function is performed on input data stream and transformed output message 415 is sent to transformation node 2 420. In this embodiment, transformation node 2 420 sends its output stream to two transformation pipelines 430, 440, 450; 465, 475. This allows the same data stream to undergo two disparate, possibly completely unrelated, analyses without having to duplicate the infrastructure of the initial transform manipulations, greatly increasing the expressivity of the invention over current transform pipelines. Functional integration of a second output stream from one transformation node 420 requires that the two output stream events be serialized. The invention performs this serialization using a decomposable transformation software module (not shown), the function of which is described below, referring to FIG. 11. While transformation nodes are described according to various embodiments as uniform shape (referring to FIGS. 2-5), such uniformity is used for presentation simplicity and clarity and does not reflect necessary operational similarity between transformations within the pipeline. It should be appreciated that one knowledgeable in the field will realize that certain transformations in pipelines, which may be entirely self-contained; certain transformations may involve direct human interaction 230, such as selection via dial or dials, positioning of switch or switches, or parameters set on control display, all of which may change during analysis; other transformations may require external aggregation or correlation services or may rely on remote procedure calls to synchronous or asynchronous analysis engines as might occur in simulations, among a plurality of other possibilities. Further according to the embodiment, individual transformation nodes in one pipeline may represent function of another transformation pipeline. It should be appreciated that the node number of transformation pipelines depicted in no way confines the transformation pipelines employed by the invention to an arbitrary maximum length 410, 420, 430, 440, 450; 465, 475 as, being distributed, the number of transformations would be limited by the resources made available to each implementation of the invention. Further according to the embodiment, there need be no limits on transform pipeline length. Output of the last transformation node and by extension, the transform pipeline 450 may be sent back to messaging software module 162 for contemporary enabled action.

Figure 5:
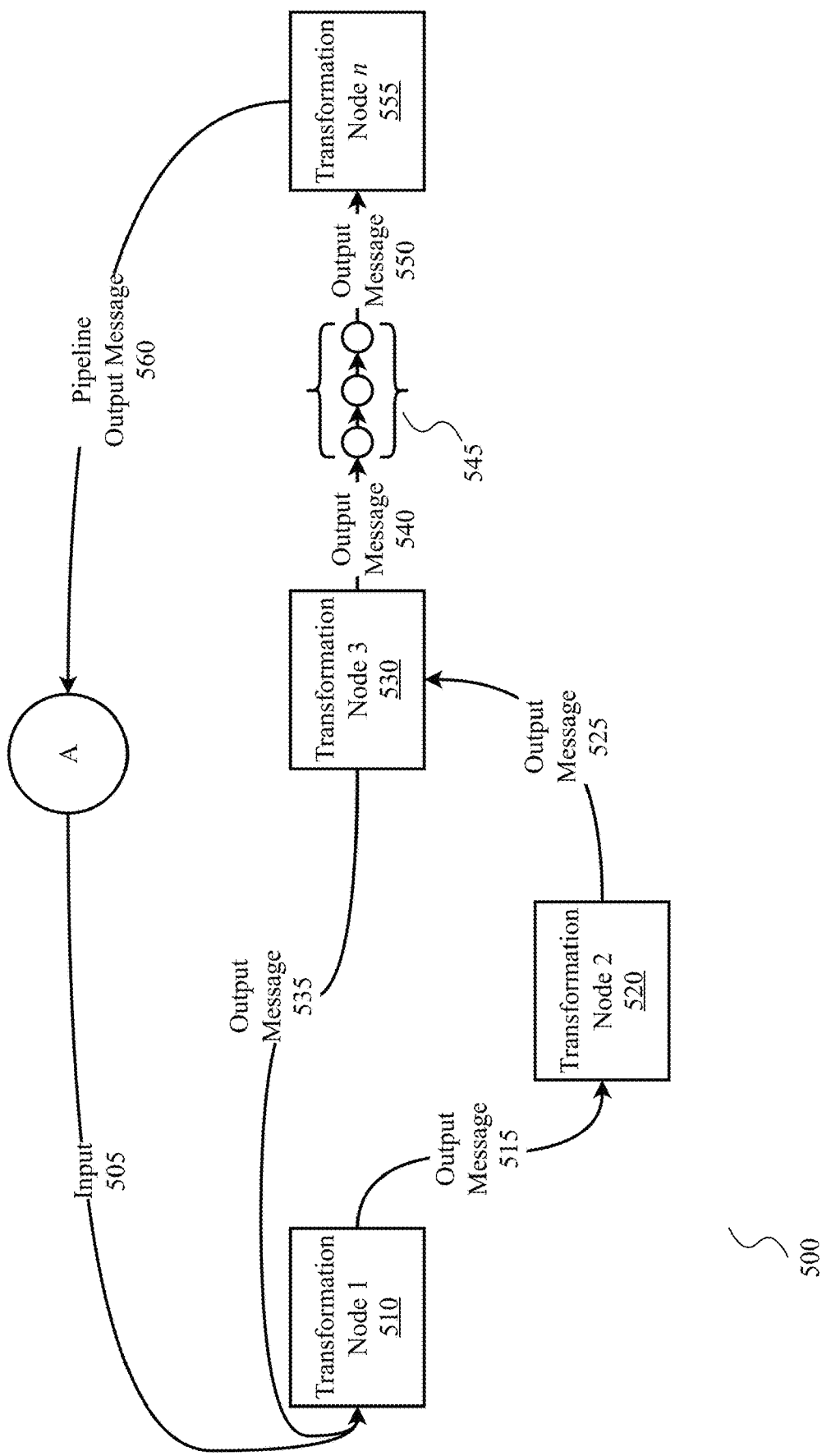
FIG. 5 is a diagram of an exemplary architecture for a transformation pipeline system where a set of three data transformations act to form a cyclical pipeline which also introduces the concept of the transformation pipeline as a directed graph of transformation nodes and messages according to an embodiment of the invention.

FIG. 5 is a block diagram of another preferred architecture for a transformation pipeline within a system for predictive analysis of very large data sets using distributed computational graph 300. According to the embodiment, streaming input from a data filter software module 120, 505 serves as input to the first transformation node 510 of the transformation pipeline. Transformation node's function may be performed on an input data stream and transformed output message 515 may then be sent to transformation node 2 520. Likewise, once the data stream is acted upon by transformation node 2 520, its output is sent to transformation node 3 530 using its output message 525. In this embodiment, transformation node 3 530 sends its output stream back to transform node 1 510 forming a cyclical relationship between transformation nodes 1 510, transformation node 2 520 and transformation node 3 530. Upon the achievement of some gateway result, the output of cyclical pipeline activity may be sent to downstream transformation nodes within the pipeline 540, 545. The presence of a generalized cyclical pathway construct allows the invention to be used to solve complex iterative problems with large data sets involved, expanding ability to rapidly retrieve conclusions for complicated issues. Functional creation of a cyclical transformation pipeline requires that each cycle be serialized. The invention performs this serialization using a decomposable transformation software module (not shown), the function of which is described below, referring to FIG.

11. While transformation nodes are described according to various embodiments as uniform shape (referring to FIGS. 2-5), such uniformity is used for presentation simplicity and clarity and does not reflect necessary operational similarity between transformations within the pipeline. It should be appreciated that one knowledgeable in the field will appreciate that certain transformations in pipelines, may be entirely self-contained; certain transformations may involve direct human interaction 230, such as selection via dial or dials, positioning of switch or switches, or parameters set on control display, all of which may change during analysis; still other transformations may require external aggregation or correlation services or may rely on remote procedure calls to synchronous or asynchronous analysis engines as might occur in simulations, among a plurality of other possibilities. Further according to the embodiment, individual transformation nodes in one pipeline may represent the cumulative function of another transformation pipeline. It should be appreciated that the node number of transformation pipelines depicted in no way confines the transformation pipelines employed by the invention to an arbitrary maximum length 510, 520, 530, 540, 550; 565, 575 as, being distributed, the number of transformations would be limited by the resources made available to each implementation of the invention. It should be further appreciated that there need be no limits on transform pipeline length. Output of the last transformation node and by extension, the transform pipeline 555 may be sent back to messaging software module 162 for concomitant enabled action.

Figure 6:
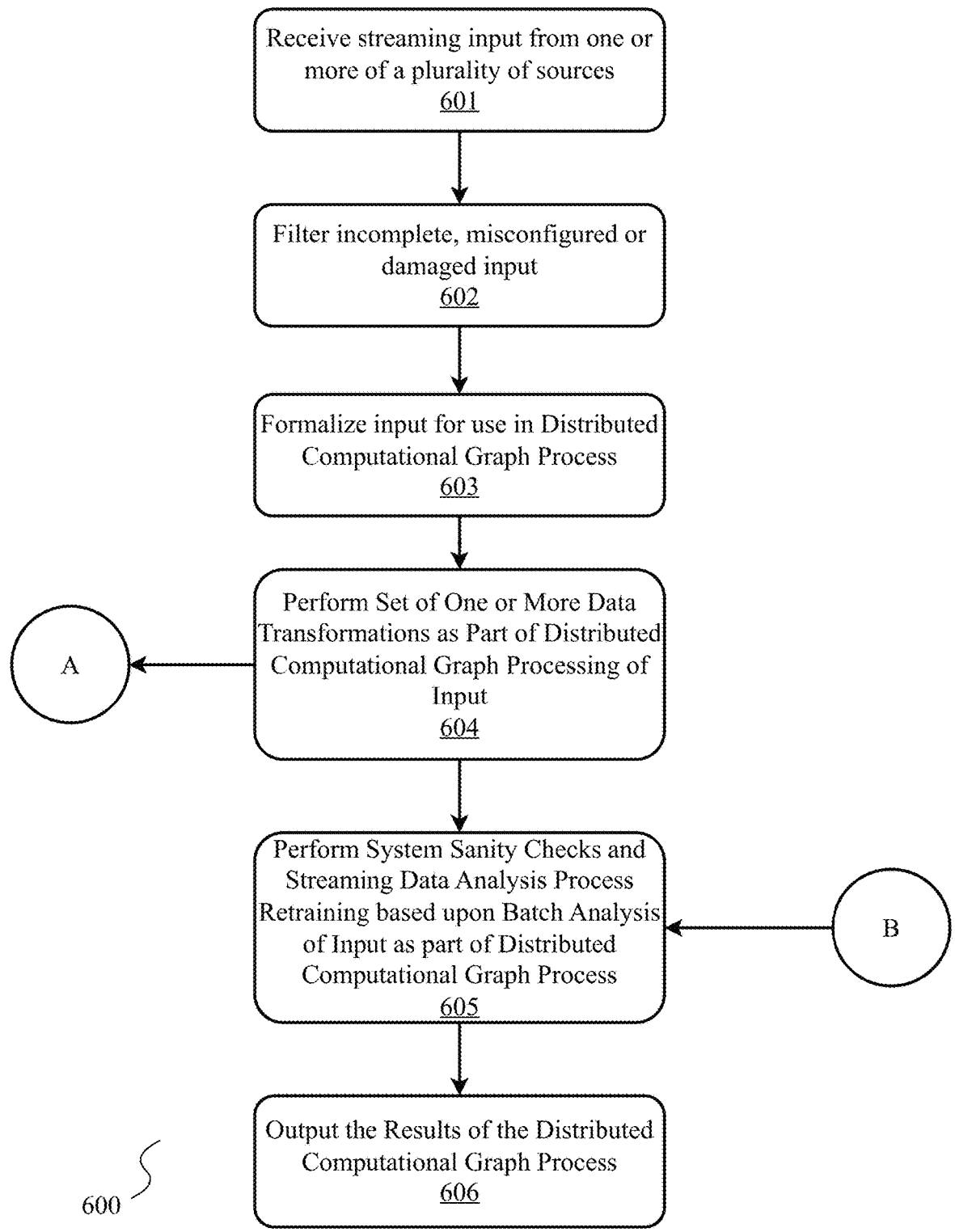
FIG. 6 is a process flow diagram of a method for the receipt, processing and predictive analysis of streaming data using a system of the invention.

FIG. 6 is a process flow diagram of a method 600 for predictive analysis of very large data sets using the distributed computational graph. One or more streams of data from a plurality of sources, which includes, but is in no way not limited to, a number of physical sensors, web based questionnaires and surveys, monitoring of electronic infrastructure, crowd sourcing campaigns, and direct human interaction, may be received by system 601. The received stream is filtered 602 to exclude data that has been corrupted, data that is incomplete or misconfigured and therefore unusable, data that may be intact but nonsensical within the context of the analyses being run, as well as a plurality of predetermined analysis related and unrelated criteria set by the authors. Filtered data may be split into two identical streams at this point (second stream not depicted for simplicity), wherein one substream may be sent for batch processing 1200 while another substream may be formalized 603 for transformation pipeline analysis 604, 161, 200, 300, 400, 500. Data formalization for transformation pipeline analysis acts to reformat the stream data for optimal, reliable use during analysis. Reformatting might entail, but is not limited to: setting data field order, standardizing measurement units if choices are given, splitting complex information into multiple simpler fields, and stripping unwanted characters, again, just to name a few simple examples. The formalized data stream may be subjected to one or more transformations. Each transformation acts as a function on the data and may or may not change the data. Within the invention, transformations working on the same data stream where the output of one transformation acts as the input to the next are represented as transformation pipelines. While the great majority of transformations in transformation pipelines receive a single stream of input, modify the data within the stream in some way and then pass the modified data as output to the next transformation in the pipeline, the invention does not require these characteristics. According to the embodiment, individual transformations can receive input of expected form from more than one source 900 or receive no input at all as would a transformation acting as a timestamp. According to the embodiment, individual transformations, may not modify the data as would be encountered with a data store acting as a queue for downstream transformations 903, 905, 1005, 1007,1105. According to the embodiment, individual transformations may provide output to more than one downstream transformations 1000. This ability lends itself to simulations where multiple possible choices might be made at a single step of a procedure all of which need to be analyzed. While only a single, simple use case has been offered for each example, in each case, that example was chosen for simplicity of description from a plurality of possibilities, the examples given should not be considered to limit the invention to only simplistic applications. Last, according to the invention, transformations in a transformation pipeline backbone may form a linear, a quasi-linear arrangement or may be cyclical 1100, where the output of one of the internal transformations serves as the input of one of its antecedents allowing recursive analysis to be run. The result of transformation pipeline analysis may then be modified by results from batch analysis of the data stream 1200 and output in format predesigned by the authors of the analysis with could be human readable summary printout, human readable instruction printout, human-readable raw printout, data store, or machine encoded information of any format known to the art to be used in further automated analysis or action schema.

Figure 7:
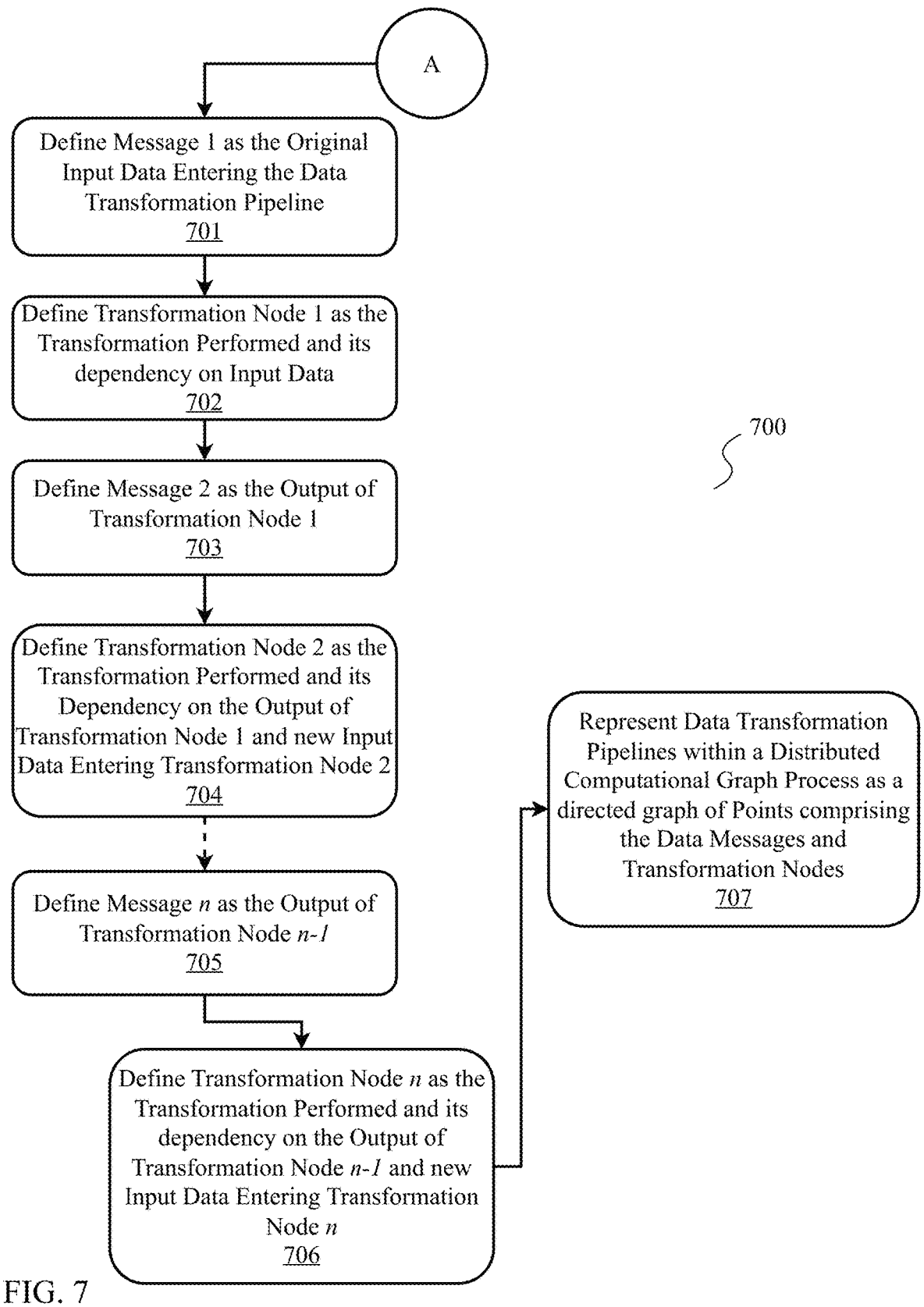
FIG. 7 is a process flow diagram of a method for representing the operation of the transformation pipeline as a directed graph function using a system of the invention.

FIG. 7 is a process flow diagram of a method 700 for an embodiment of modeling the transformation pipeline module 161 of the invention as a directed graph using graph theory. According to the embodiment, the individual transformations 702, 704, 706 of the transformation pipeline $t_1 \ldots t_n$ such that each $t_i$ T are represented as graph nodes. Transformations belonging to T are discrete transformations over individual datasets $d_i$, consistent with classical functions. As such, each individual transformation $t_j$, receives a set of inputs and produces a single output. The input of an individual transformation $t_i$, is defined with the function in: $t_i\ d_1 \ldots d_k$ such that $in(t_i)=[d_1 \ldots d_k]$ and describes a transformation with k inputs. Similarly, the output of an individual transformation is defined as the function out: $t_i$ $[ld_1]$ to describe transformations that produce a single output (usable by other transformations). A dependency function can now be defined such that $dep(t_a,t_b)\ out(t_a)in(t_b)$ The messages carrying the data stream through the transformation pipeline 701,703, 705 make up the graph edges. Using the above definitions, then, a transformation pipeline within the invention can be defined as G=(V,E) where message($t_1,t_2 \ldots t(_{n-1}),t_n$)V and all transformations $t_1 \ldots t_n$ and all dependencies $dep(t_i,t_j)$E 707.

Figure 8:
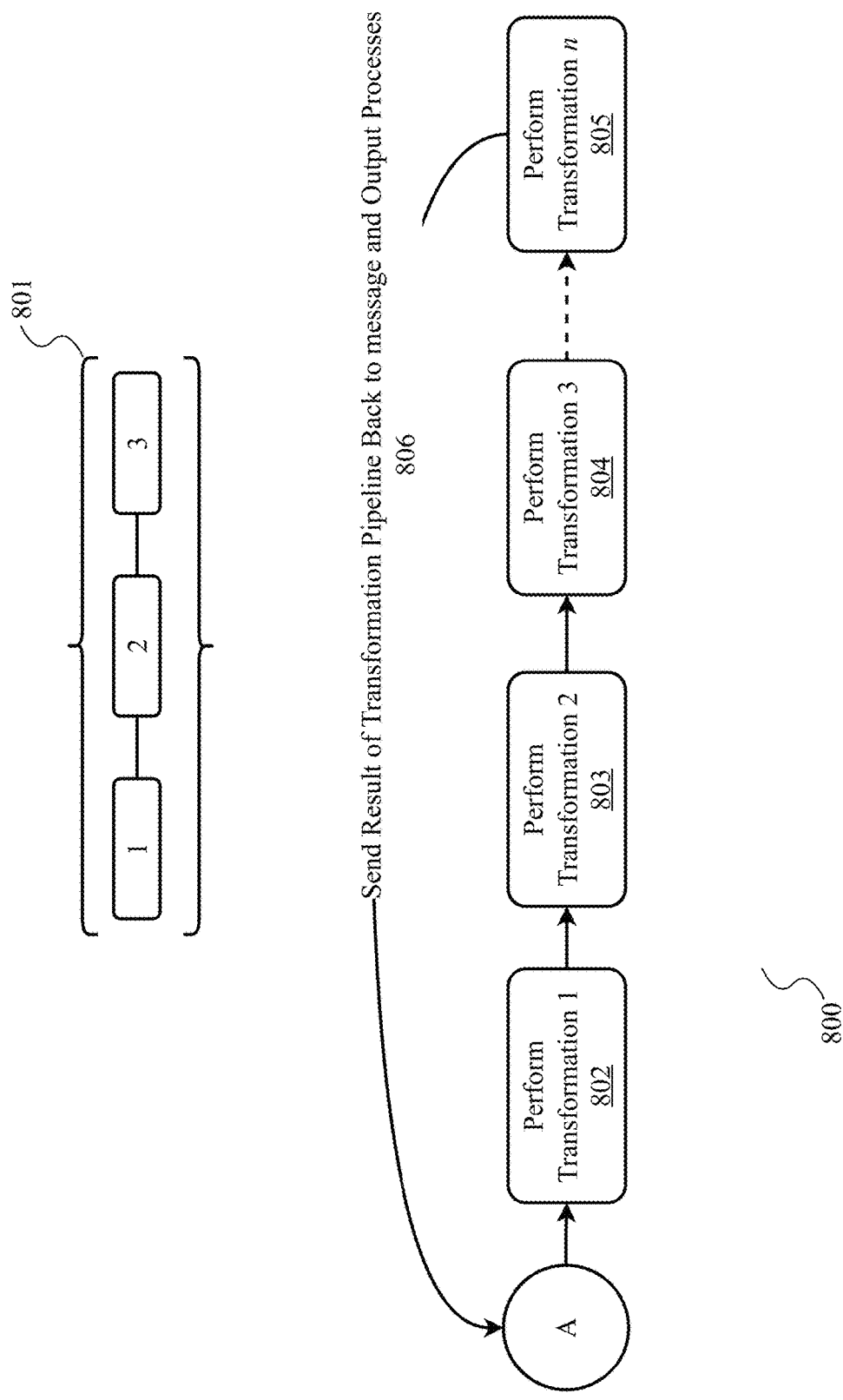
FIG. 8 (PRIOR ART) is a process flow diagram of a method for a linear data transformation pipeline using a system of the invention.

FIG. 8 is a process flow diagram of a method 800 for one embodiment of a linear transformation pipeline 801. This is the simplest of configurations as the input stream is acted upon by the first transformation node 802 and the remainder of the transformations within the pipeline are then performed sequentially 802, 803, 804, 805 for the entire pipeline with no introduction of new data internal to the initial node or splitting output stream prior to last node of the pipeline 805. This configuration is the current state of the art for transformation pipelines and is the most general form of these constructs. Linear transformation pipelines require no special manipulation to simplify the data pathway and are thus referred to as non-decomposable. The example depicted in this diagram was chosen to convey the configuration of a linear transformation pipeline and is the simplest form of the configuration felt to show the point. It in no way implies limitation of the invention.

Figure 9:
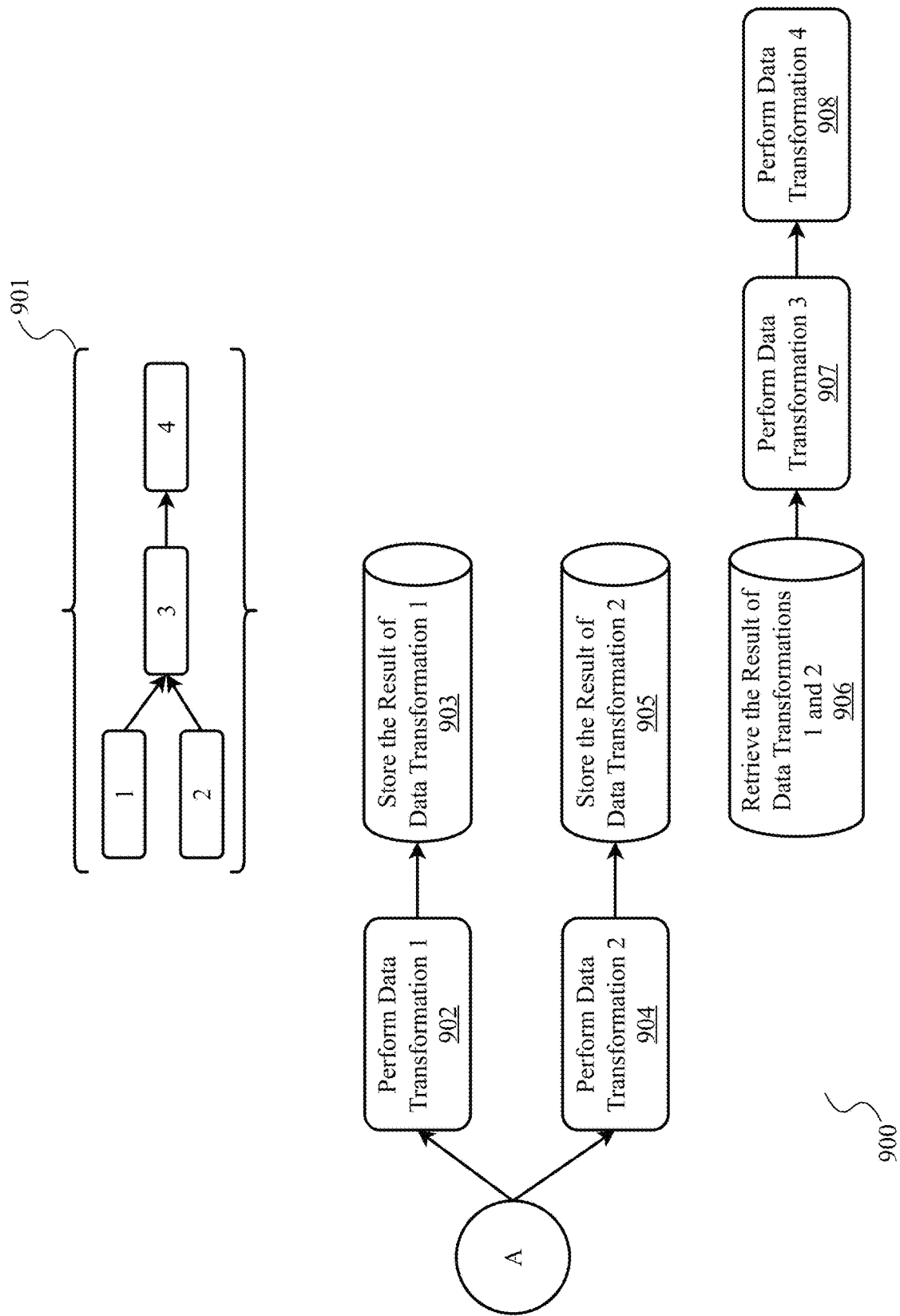
FIG. 9 is a process flow diagram of a method for the disposition of input from two antecedent data transformations into a single data transformation of transformation pipeline using a system of the invention.

FIG. 9 is a process flow diagram of a method 900 for one embodiment of a transformation pipeline where one transformation node 907 in a transformation pipeline receives data streams from two source transformation nodes 901. The invention handles this transformation pipeline configuration by decomposing or serializing the input events 902-903, 904-905 heavily relying on post transformation function continuation. The results of individual transformation nodes 902, 904 just antecedent to the destination transformation node 906 and placed into a single specialized data storage transformation node 903, 905 (shown twice as process occurs twice). The combined results then retrieved from the data store 906 and serve as the input stream for the transformation node within the transformation pipeline backbone 907, 908. The example depicted in this diagram was chosen to convey the configuration of transformation pipelines with individual transformation nodes that receive input from two source nodes 902, 904 and is the simplest form of the configuration felt to show the point. It in no way implies limitation of the invention. One knowledgeable in the art will realize the great number of permutations and topologies possible, especially as the invention places no design restrictions on the number of transformation nodes receiving input from greater than one sources or the number sources providing input to a destination node.

Figure 10:
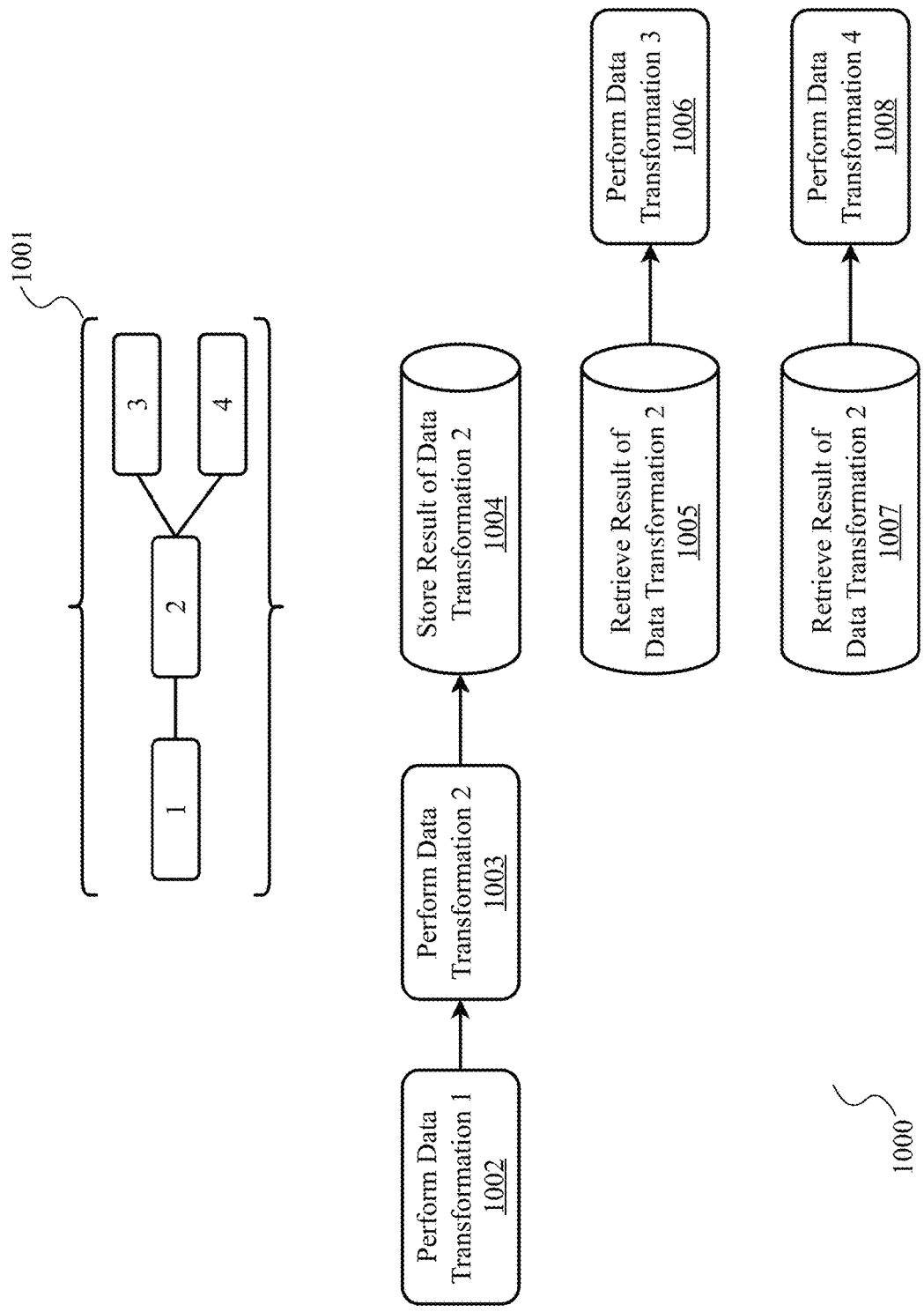
FIG. 10 is a process flow diagram of a method for the disposition of output of one data transformation that then serves as input to two postliminary data transformations using a system of the invention.

FIG. 10 is a process flow diagram of a method 1000 for one embodiment of a transformation pipeline where one transformation node 1003 in a transformation pipeline sends output data stream to two destination transformation nodes 1001, 1006, 1008 in potentially two separate transformation pipelines. The invention handles this transformation pipeline configuration by decomposing or serializing the output events 1004, 1005-1006, 1007-1008. The results of the source transformation node 1003 just antecedent to the destination transformation nodes 1006 and placed into a single specialized data storage transformation node 1004, 1005, 1007 (shown three times as storage occurs and retrieval occurs twice). The results of the antecedent transformation node may then be retrieved from a data store 1004 and serves as the input stream for the transformation nodes two downstream transformation pipeline 1006, 1008. The example depicted in this diagram was chosen to convey the configuration of transformation pipelines with individual transformation nodes that send output streams to two destination nodes 1006, 1008 and is the simplest form of the configuration felt to show the point. It in no way implies limitation of the invention. One knowledgeable in the art will realize the great number of permutations and topologies possible, especially as the invention places no design restrictions on the number of transformation nodes sending output to greater than one destination or the number destinations receiving input from a source node.

Figure 11:
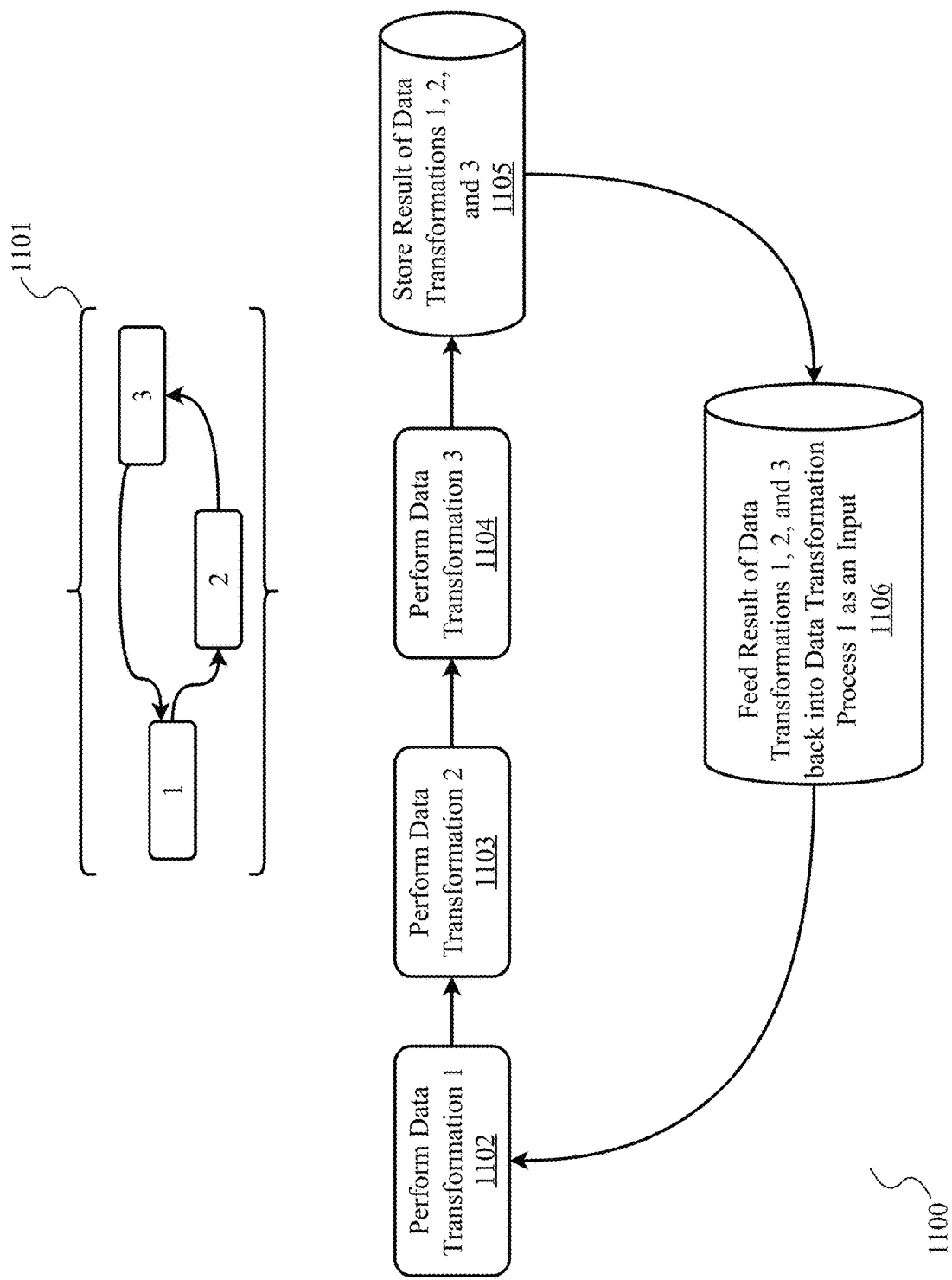
FIG. 11 is a process flow diagram of a method for processing a set of three or more data transformations within a data transformation pipeline where output of the last member transformation of the set serves as input of the first member transformation thereby creating a cyclical relationship using a system of the invention.

FIG. 11 is a process flow diagram of a method 1100 for one embodiment of a transformation pipeline where the topology of all or part of the pipeline is cyclical 1101. In this configuration the output stream of one transformation node 1104 acts as an input of an antecedent transformation node within the pipeline 1102 serialization or decomposition linearizes this cyclical configuration by completing the transformation of all of the nodes that make up a single cycle 1102, 1103, 1104 and then storing the result of that cycle in a data store 1105. That result of a cycle is then reintroduced to the transformation pipeline as input to the first transformation node of the cycle. As this configuration is by nature recursive, special programming to unfold the recursions was developed for the invention to accommodate it. The example depicted in this diagram was chosen to convey the configuration of transformation pipelines with individual transformation nodes that for a cyclical configuration 1101, 1102, 1103, 1104 and is the simplest form of the configuration felt to show the point. It in no way implies limitation of the invention. One knowledgeable in the art will realize the great number of permutations and topologies possible, especially as the invention places no design restrictions on the number of transformation nodes participating in a cycle nor the number of cycles in a transformation pipeline.

Figure 12:
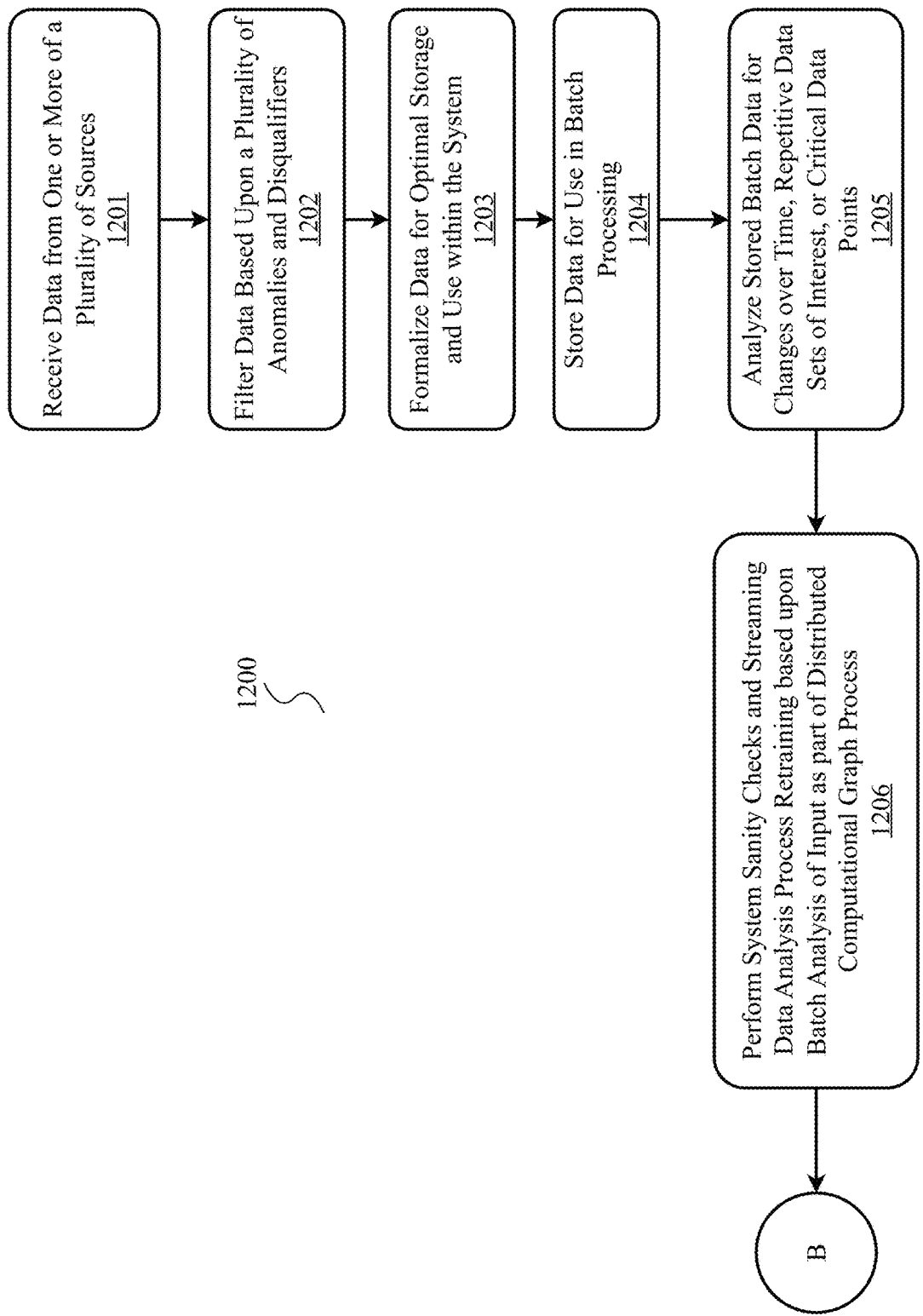
FIG. 12 is a process flow diagram of a method for the receipt and use of streaming data into batch storage and analysis of changes over time, repetition of specific data sequences or the presence of critical data points using a system of the invention.

FIG. 12 is a process flow diagram of a method 1200 for one embodiment of the batch data stream analysis pathway which forms part of the invention and allows streaming data to be interpreted with historic context. One or more streams of data from a plurality of sources, which includes, but is in no way not limited to, a number of physical sensors, web based questionnaires and surveys, monitoring of electronic infrastructure, crowd sourcing campaigns, and direct human interaction, is received by the system 1201. The received stream may be filtered 1202 to exclude data that has been corrupted, data that is incomplete or misconfigured and therefore unusable, data that may be intact but nonsensical within the context of the analyses being run, as well as a plurality of predetermined analysis related and unrelated criteria set by the authors. Data formalization 1203 for batch analysis acts to reformat the stream data for optimal, reliable use during analysis. Reformatting might entail, but is not limited to: setting data field order, standardizing measurement units if choices are given, splitting complex information into multiple simpler fields, and stripping unwanted characters, again, just to name a few simple examples. The filtered and formalized stream is then added to a distributed data store 1204 due to the vast amount of information accrued over time. The invention has no dependency for specific data stores or data retrieval model. During transformation pipeline analysis of the streaming pipeline, data stored in the batch pathway store can be used to track changes in specifics of the data important to the ongoing analysis over time, repetitive data sets significant to the analysis or the occurrence of critical points of data 1205. The functions of individual transformation nodes 220 may be saved and can be edited also all nodes of a transformation pipeline 200 keep a summary or summarized view (analogous to a network routing table) of applicable parts of the overall route of the pipeline along with detailed information pertaining to adjacent two nodes. This framework information enables steps to be taken and notifications to be passed if individual transformation nodes 240 within a transformation pipeline 200 become unresponsive during analysis operations. Combinations of results from the batch pathway, partial and streaming output results from the transformation pipeline, administrative directives from the authors of the analysis as well as operational status messages from components of the distributed computational graph are used to perform system sanity checks and retraining of one or more of the modules of the system 1206. These corrections are designed to occur without administrative intervention under all but the most extreme of circumstances with deep learning capabilities present as part of the system manager and retrain module 163 responsible for this task.

Figure 13:
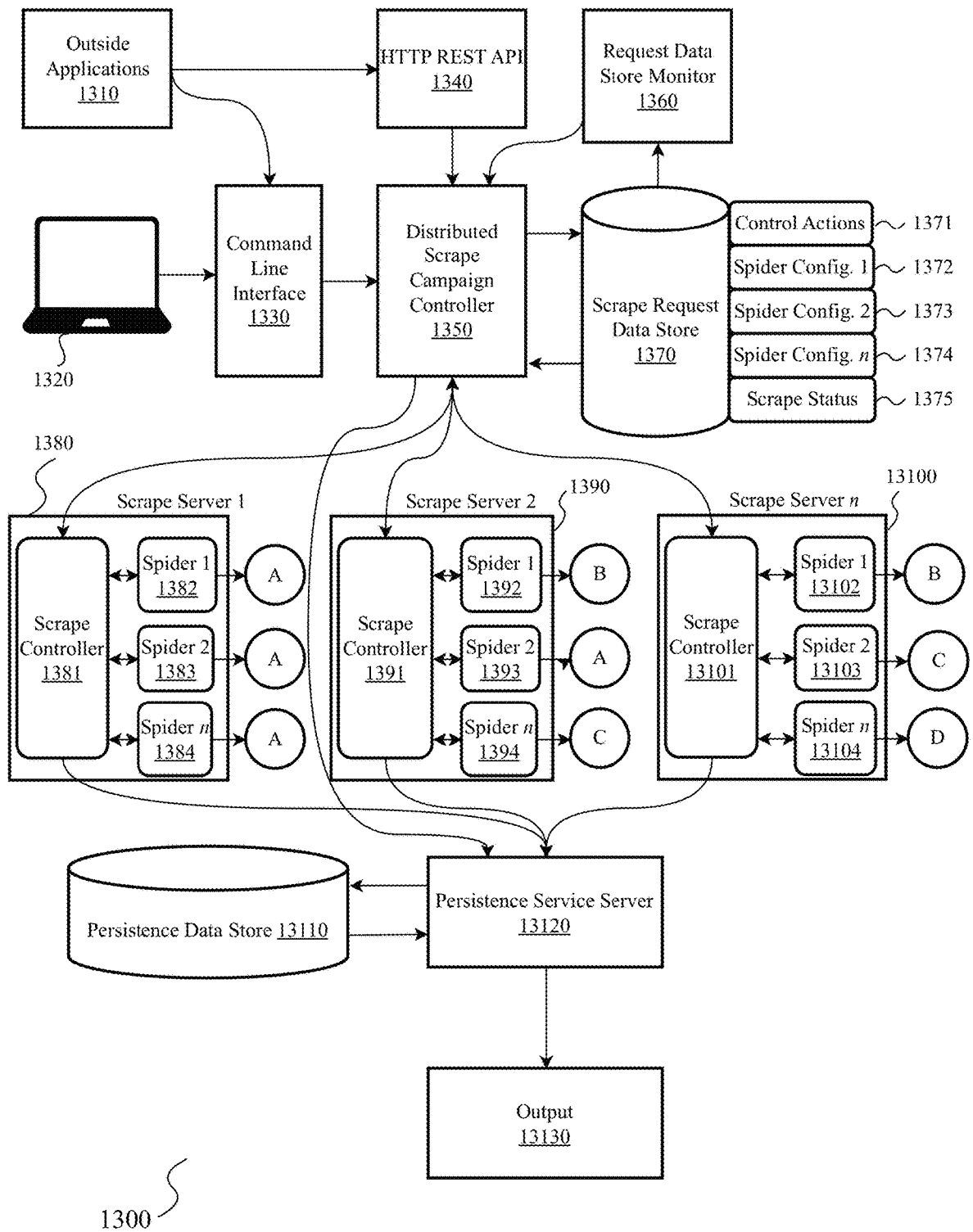
FIG. 13 is a diagram of an exemplary architecture of a distributed system for rapid, large volume, search and retrieval of unstructured or loosely structured information found on sources such as the World Wide Web according to an embodiment of the invention.

FIG. 13 is a diagram of an exemplary architecture of a distributed system 1300 for rapid, large volume, search and retrieval of unstructured or loosely structured information found on sources such as the World Wide Web, according to a preferred embodiment of the invention. According to the embodiment, scrape campaign requests, which are comprised of a plurality of scrape agent (spider) configuration parameters as well as scrape campaign control directives, may be entered from a connected computer terminal 1320 or by terminal-like commands issued by external software applications 1310 using a built in command line interface 1330. Alternatively, similar scrape campaign requests may enter the system through an HTTP REST-based API using JSON-compliant instructions 1340. Scrape campaign parameters enter a distributed scrape campaign controller module 1350, where they are formalized and stored in a scrape request data store 1370 as one or more scrape campaign-related spider configurations 1372, 1373, 1374 and associated scrape campaign control directives 1371. Scrape campaigns remain persistently stored until a command to run one or more of them is received through command line interface 1330 or HTTP-based API 1340, at which time request parameters 1371, 1372, etc. for a campaign are retrieved by distributed scrape campaign controller module 1350 from scrape request data store 1370. Persistent storage of scrape campaign request parameters also allows the same scrape campaign to be run multiple times and used as a starting point for design of similar scrape campaigns. Upon receipt of a command to run a specific scrape campaign and retrieval of that scrape campaign's configuration and control parameters, distributed scrape campaign controller module 1350 coordinates the scrape campaign in regards to the number of spiders 1382, 1383, 1384 to be used, and the number of distributed scrape servers 1380, 1390, 13100 to be used based upon the control directives for that campaign. Distributed scrape campaign controller module 1350 then sends appropriate instructions to scrape servers 1380, 1390, 13100 to initiate and run the requested scrape campaign. If there are multiple spider configurations present in a scrape campaign request so as to cause the scraping of multiple web pages or sites 1400, how many spiders to assign to each page and the priority each spider type has for scrape server resources is also coordinated by distributed scrape campaign controller module 1350, which directs the scrape servers 1380, 1390, 13100 accordingly to initiate and run the requested multipage or multisite scrape campaign. Once the data to run a scrape campaign is sent to it, scrape controller module 1381, 1391, 13101 of each scrape server 1380, 1390, 13110 executes the required scrapes. Scrape controller module 1380 1390, 13110 hosts the programming for the spiders into which it loads scrape campaign spider configuration parameters sent to scrape server 1380, 1390, 13110 from distributed scrape campaign controller module 1350 using the co-sent scrape campaign control directives to determine the number of spider instances 1382, 1383, 1384 to create and the resource usage priority each spider is given on the server. It is possible that all spider 1382, 1383, 1384 instances on a given scrape server 1380 will be scraping the same web target 1413; however, the invention does not require this and is instead set up to make efficient use of scrape server resources. Therefore, a single scrape server 1390; 13110 may execute spiders scraping different web targets 1392, 1393, 1394; 13102, 13103, 13104 and the spiders scraping a single web target 1382, 1383, 1393; 1392, 13102; 1394, 13103 may be distributed across multiple servers 1380; 1390; 13100. Scrape controller module 1381, 1391, 13101 of each scrape server 1380, 1390, 13100 monitors the progress and operational status of the spiders it has executed and returns that information back to distributed scrape controller module 1350. Both the progress and operational data is stored as log data 1375 in scrape request store 1370 and is made available to the authors of the scrape campaign during its operation, which may result in directives being issued that change one or more aspects of the scrape campaign. The invention is designed to allow such mid-campaign parameter changes without downtime or loss of collected, intermediate, data. Results of the scrapes returned to scrape controller module 1381, 1391, 13100 by individual spiders 1382, 1383, 1384, 1392, 1393, 1394, 13102, 13103, 13104 are sent to persistence service server 13120, which aggregates the data from individual scrape server spiders 1382, 1383, 1384, 1392, 1393, 1394, 13102, 13103, 13104, and performs any transformations pre-designed by the authors of the scrape campaign prior to outputting the data in a format determined by the authors of the campaign. This may involve sending the output to external software applications for further processing. The data may also be processed for storage by persistence service server 13120 and sent to a persistence data store for more permanent archival.

It is should be noted that, while the core distributed scrape campaign system distributes load across a pool of scrape servers, coordinates the number of spiders employed within a scrape campaign, and prioritizes allotment of scrape server resources among spiders, it does not internally manage or control spider web page and link follow restrictions, crawling frequencies, and so forth. Individual spiders must implement suitable controls and crawling orchestration (which is external to the distributed scrape campaign system). All of these considerations are part of the scrape campaign spider configuration parameters that are received from the authors of scrape campaigns 1310, 1320 by distributed scrape campaign controller module 1350. This is done to give the authors of the scrape maximal flexibility in the behavior of the spiders during a scrape campaign while allowing the use of a robust yet easily deployed spider programming interface 1600.

Figure 14:
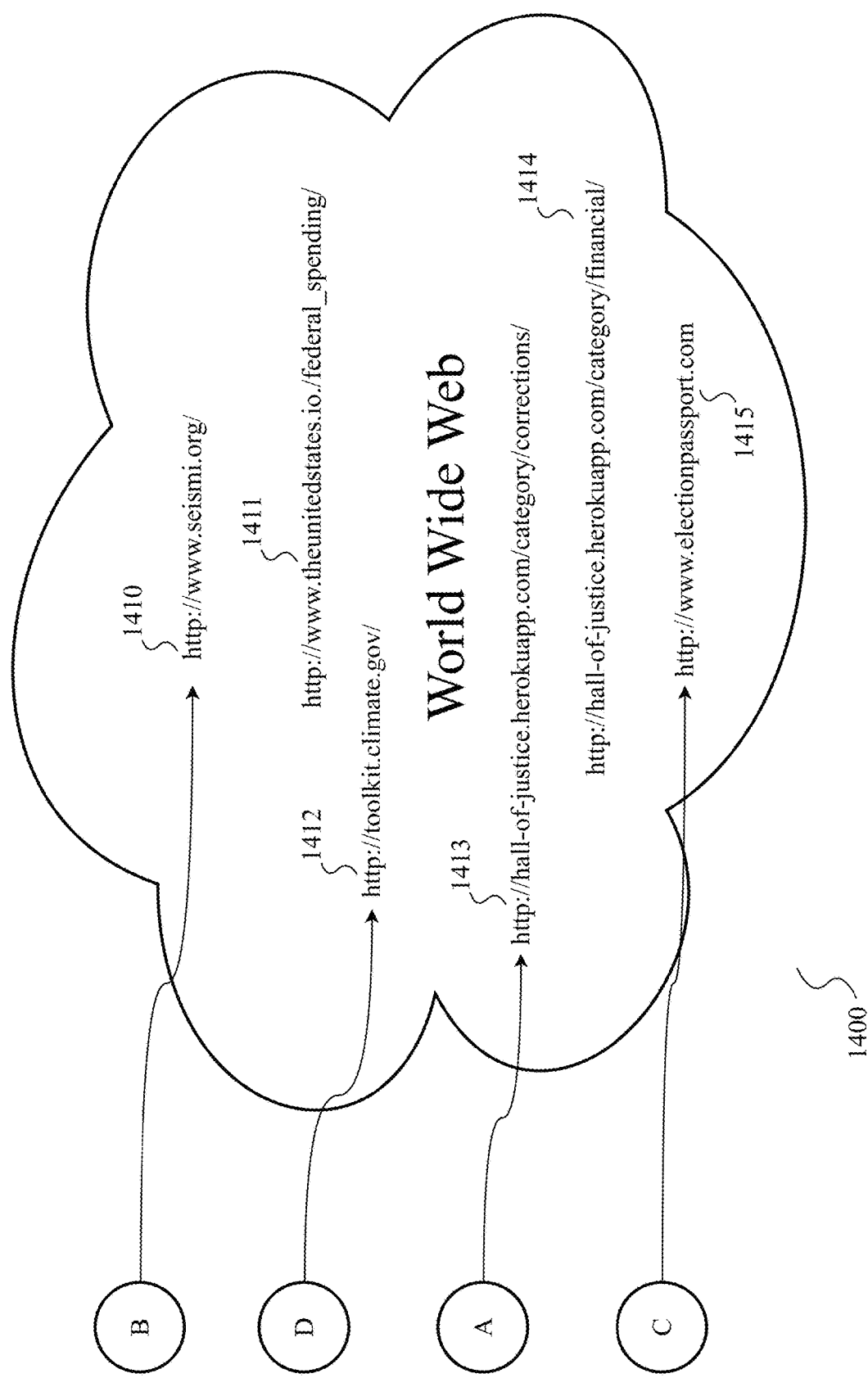
FIG. 14 is a diagram showing exemplary World Wide Web target sites containing the type of loosely structured, large volume, data that make them candidates for search and retrieval by the invention according to an embodiment of the invention.

FIG. 14 is a block diagram 1400 of websites on the World Wide Web that are example target types of a distributed system for large volume extraction of deep web data. Www.seismi.org 1410, for example, is a website of seismic data that by nature is non-textual and therefore has very few tags that might be useful to conventional web crawlers. Data retrieved from this type of web site also does not fit well into a relational data store setting and might require extensive post-scrape transformation before storage in a document type data store. As another example, theunitedstates.io/federal_spending/ 1411 is a web site that publishes raw spending data reports that are largely textual, but has extremely few, if any, web related tags and is thus poorly indexed or retrieved by conventional scraping. This type of web site also is expected to have a very large volume of data, which again serves to thwart conventional web crawling tools. Further, the raw spending data might require significant pre-processing prior to meaningful data store storage. Similarly, toolkit.climate.gov 1412, like www.seismi.org 1410, is a site that would be expected to have large amounts of non-textual climate data that needs to be processed with few if any web related tags meaning that climate intrinsic keywords would need to be employed for meaningful retrieval of the scraped data and, again both data transformation steps and pre-storage processing may be needed prior to meaningful storage. Moreover, http://hall-of-justice.herokuapp.com/category/corrections/ 1413, http://hall-of-justice.herokuapp.com/category/financial/ 1414, and http://www.electionpassport.com 1415 are all similar in that they are sites with extremely large volumes of free-form textual data with few if any web tags and with a high probability that data retrieved will need to be processed prior to output or storage.

Figure 15:
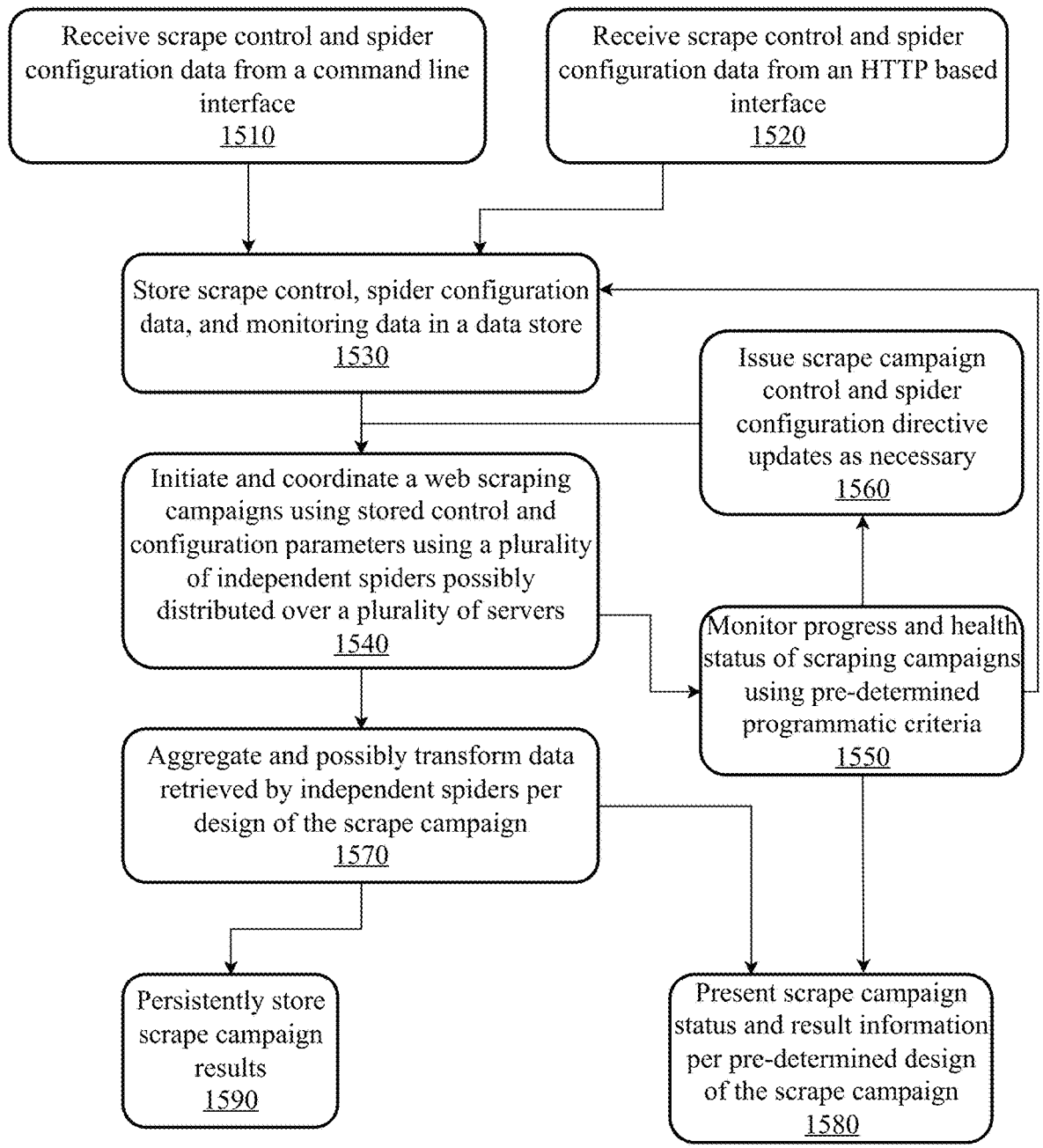
FIG. 15 is a process flow diagram of a method for the load of search agent configuration and search control directives, the coordination of a web scrape using those data and the presentation of the results according to an embodiment of the invention.

FIG. 15 is a process flow diagram of a method 1500 for a distributed system for large volume deep web data extraction 1300. Parameters for one or more scrape campaigns, which include, but may not be limited to; scrape agent (spider) 1382, 1383, 1384, 1392, 1393, 1394, 13102, 13103, 13104, configuration data which may be comprised of, but is not limited to; web sites or web pages to be traversed, keywords or tags for web document data to be parsed, and search expansion rules for following links or other references found on the sites scraped, as well as any other spider configuration information included by the authors of the scrape campaign; and scrape campaign control directives-which may include but would not be limited to: the number of spiders to be used in the campaign, relative resource usage priorities for specific web sites or pages within the intended scrape campaigns, directives for adjustments to be made to the scrape campaign upon the encounter of specific results or types of results, directives for application of specific scrape campaign result data pre-processing and post-processing steps and output format directives including persistent storage formalization rules—are received through either a command line interface 1510, 1330 that may receive commands either from an interactive terminal 1320 or another software application on a computing system 1310 or from software applications 1310 through a HTTP-based RESTful JSON application programming interface (API) 1520, 1340. The use of REST and JSON within API 1520, 1340 should not be construed to mean that the invention is dependent on use of only those protocols for this task, as one knowledgeable in the art will realize that any similar protocols such as, but not limited to, SOAP or AJAX could also be employed according to the invention. The use of REST and JSON is only in accordance with current practice and inventor decision. Scrape campaign control and spider configuration parameters received are formalized, as necessary and stored in data store for future use when the scrape campaign is initiated. In initiation may be immediate or delayed and the same scrape campaign may be repeatedly run as parameters persist until purged. One knowledgeable in the art will comprehend that key-value data stores such as Redis are very well suited for storage of scrape campaign parameter data, however, the invention does not dictate the use of any specific type of data store for scrape campaign data. Once the command to initiate a scrape campaign 1540 is received, the invention uses the control directives passed to it by the scrape campaign authors to coordinate scrape campaign 1540. Directives from a list comprising the number and complexity of the web sites to be scraped, the priorities assigned to specific web sites or pages, the number different spider configurations to be employed, the speed the author desires the scrape to progress among other factors are used to determine the number of spiders that will be deployed and the number of scrape servers to be included in the scrape as per predetermined programming within the invention. While the scrape is active, progress and operational information such as stuck spiders and intermediate scrape results is continuously monitored 1550 by the scrape campaign controller module 1350 through the scrape controllers 1381, 1391, 13101 such that the authors of the scrape campaign can determine the progress made in the scrape, have some indication of what results have been produced, know what tasks the spiders still have pending as well as any links that may have been followed and the impact on the scrape as a whole of those additions as per pre-programmed reporting parameters 1580. Monitoring 1550 and reporting 1580 are useful to make users aware of operational issues that have arisen, if any. Monitoring data is logged to a data store 1530 for future analysis. Program design of the invention allows for adjustments to scrape campaign 1540 be made, either due to the just disclosed progress and operational health reports, or other unforeseen factors, without having to shut down the running scrape and without loss of previously accrued scrape results 1560. Raw scrape results obtained by the individual spiders are passed through scrape controller modules 1381, 1391, 13101 of scrape servers 1380, 1390, 13100 and are aggregated and then possibly transformed in specific ways depending on the predetermined goals of scrape campaign 1570. The invention offers pre-programmed algorithm toolsets for this purpose and also offers API hooks that allow the data to be passed to external processing algorithms prior to final output in a format pre-decided to be most appropriate for the needs of the scrape campaign authors. Result data may also be appropriately processed and formalized for persistent storage in a document based data store 1590 such as MongoDB, although, depending on the needs of the authors and the type of data retrieved during the scrape, any NOSQL type data storage or even a relational database may be used. The invention has no dependency for any particular data store type for persistent storage of scrape results.

FIG. 16 is a listing of a very simple example web spider configuration file 1600. This listing requires that the Scrapy framework (used for exemplary purposes only, and not limiting)—as well as libraries on which Scrapy depends (http://doc.scrapy.org/en/1.0/intro/install.html)—be present on the system running the web scrape. While highly simplified, listing 1600 shows major sections needed to create a scrape-specific spider 1610, 1620, 1630,1640 At the top of listing 1610 is found a section that declares the portions of the Scrapy framework that are to be included in the creation of the current spider. Going down the listing, section 1620 declares a name to be used to identify this spider type as well as the World Wide Web domains the spider is allowed to traverse during the scrape, as well as the URL of the starting point of the scrape. In section 1630 are any rules to apply when encountering HTML links during a scrape, and also what algorithms should be used when processing target information of the scrape, in this case the spider is scraping specific types of HTML links from the example.com domain. The last section 1640 provides instructions on how to process target data, including instructions for data associated to specific web tags. While the spider created by this sample configuration would have limited capability, it is functional and would, as written, complete its scrape. One will immediately appreciate that all of the directives in the listed spider definition have to do with retrieving data and are not concerned with the minutia of how the spider gets to the web site or implements the instructions given in the listed file, and so forth.

FIG. 17 is a diagram of an exemplary architecture of a system for the capture and storage of time series data from sensors with heterogeneous reporting profiles according to an embodiment of the invention 1700. In this embodiment, a plurality of sensor devices 1710*a-n* stream data to a collection device, in this case a web server acting as a network gateway 1715. These sensors 1710*a-n* can be of several forms, some non-exhaustive examples being: physical sensors measuring humidity, pressure, temperature, orientation, and presence of a gas; or virtual such as programming measuring a level of network traffic, memory usage in a controller, and number of times the word "refill" is used in a stream of email messages on a particular network segment, to name a small few of the many diverse forms known to the art. In the embodiment, the sensor data is passed without transformation to the data management engine 1720, where it is aggregated and organized for storage in a specific type of data store 1725 designed to handle the multidimensional time series data resultant from sensor data. Raw sensor data can exhibit highly different delivery characteristics. Some sensor sets may deliver low to moderate volumes of data continuously. It would be infeasible to attempt to store the data in this continuous fashion to a data store as attempting to assign identifying keys and the to store real time data from multiple sensors would invariably lead to significant data loss. In this circumstance, the data stream management engine 1720 would hold incoming data in memory, keeping only the parameters, or "dimensions" from within the larger sensor stream that are pre-decided by the administrator of the study as important and instructions to store them transmitted from the administration device 1712. The data stream management engine 1720 would then aggregate the data from multiple individual sensors and apportion that data at a predetermined interval, for example, every 10 seconds, using the the timestamp as the key when storing the data to a multidimensional time series data store over a single swimlane of sufficient size. This highly ordered delivery of a foreseeable amount of data per unit time is particularly amenable to data capture and storage but patterns where delivery of data from sensors occurs irregularly and the amount of data is extremely heterogeneous are quite prevalent. In these situations, the data stream management engine cannot successfully use strictly single time interval over a single swimlane mode of data storage. In addition to the single time interval method the invention also can make use of event based storage triggers where a predetermined number of data receipt events, as set at the administration device 1712, triggers transfer of a data block consisting of the apportioned number of events as one dimension and a number of sensor ids as the other. In the embodiment, the system time at commitment or a time stamp that is part of the sensor data received is used as the key for the data block value of the value-key pair. The invention can also accept a raw data stream with commitment occurring when the accumulated stream data reaches a predesigned size set at the administration device 1712.

It is also likely that that during times of heavy reporting from a moderate to large array of sensors, the instantaneous load of data to be committed will exceed what can be reliably transferred over a single swimlane. The embodiment of the invention can, if capture parameters pre-set at the administration device 1712, combine the data movement capacity of two or more swimlanes, the combined bandwidth dubbed a metaswimlane, transparently to the committing process, to accommodate the influx of data in need of commitment. A diagrammatic representation of the formation of metaswimlanes 1915a, 1915b from individual swimlanes 1911a-z is shown in FIG. 19. All sensor data, regardless of delivery circumstances are stored in a multidimensional time series data store 1725 which is designed for very low overhead and rapid data storage and minimal maintenance needs to sap resources. The embodiment uses a key-value pair data store examples of which are Riak, Redis and Berkeley DB for their low overhead and speed, although the invention is not specifically tied to a single data store type to the exclusion of others known in the art should another data store with better response and feature characteristics emerge. Due to factors easily surmised by those knowledgeable in the art, data store commitment reliability is dependent on data store data size under the conditions intrinsic to time series sensor data analysis. The number of data records must be kept relatively low for the herein disclosed purpose. As an example one group of developers restrict the size of their multidimensional time series key-value pair data store to approximately $8.64 \times 10^4$ records, equivalent to 24 hours of 1 second interval sensor readings or 60 days of 1 minute interval readings. In this development system the oldest data is deleted from the data store and lost. This loss of data is acceptable under development conditions but in a production environment, the loss of the older data is almost always significant and unacceptable. The invention accounts for this need to retain older data by stipulating that aged data be placed in long term storage. In the embodiment, the archival storage is included 1730. This archival storage might be locally provided by the user, might be cloud based such as that offered by Amazon Web Services or Google or could be any other available very large capacity storage method known to those skilled in the art.

Reliably capturing and storing sensor data as well as providing for longer term, offline, storage of the data, while important, is only an exercise without methods to repetitively retrieve and analyze most likely differing but specific sets of data over time. The invention provides for this requirement with a robust query language that both provides straightforward language to retrieve data sets bounded by multiple parameters, but to then invoke several transformations on that data set prior to output. In the embodiment isolation of desired data sets and transformations applied to that data occurs using pre-defined query commands issued from the administration device 1712 and acted upon within the database by the structured query interpreter 1735. Below is a highly simplified example statement to illustrate the method by which a very small number of options that are available using the structured query interpreter 1735 might be accessed.

SELECT [STREAMING|EVENTS] data_spec FROM [unit] timestamp TO timestamp GROUPBY (sensor_id, identifier) FILTER [filter_identifier] FORMAT [sensor [AS identifier] [, sensor [AS identifier]] . . . ] (TEXT|JSON|FUNNEL|KML|GEOJSON|TOPOJSON);

Here "data_spec" might be replaced by a list of individual sensors from a larger array of sensors and each sensor in the list might be given a human readable identifier in the format "sensor AS identifier". "unit" allows the researcher to assign a periodicity for the sensor data such as second (s), minute (m), hour (h). One or more transformational filters, which include but a not limited to: mean, median, variance, standard deviation, standard linear interpolation, or Kalman filtering and smoothing, may be applied and then data formatted in one or more formats examples of with are text, JSON, KML, GEOJSON and TOPOJSON among others known to the art, depending on the intended use of the data.

FIG. 18 is a method flow diagram showing an exemplary method 1800 used in the capture and storage of time series data from sensors with heterogeneous reporting profiles according to an embodiment of the invention. In the first step of the method 1805, data is received from a set of sensors connected to a capture and analysis device as in the embodiment depicted in FIG. 17. The sensor data received might be captured and stored under two main paradigms. One is that the sensor data arrives at a defined, reliable periodicity, which may be continuously, but the amount of data per unit time is reliably homogeneous and thus the capture and storage of the sensor data is easy to perform using simple time based models. This paradigm and its resolution is prior art and is not depicted. The second paradigm occurs when the sensors being monitored send data at irregular intervals and the amount of data received by the capture and analysis device can vary greatly overtime. This heterogeneous sensor data behavior demands different processing strategies than does the homogeneous counterpart. Sensor data capture devices that store sensor data at strictly regular time intervals fair badly as the amounts of data per storage cycle can vary greatly. Two strategies that have been found to work reliably in conditions of heterogeneous data influx are event driven and stream capture. The event driven strategy holds data in the memory of a data stream management engine 1720 until a preset number of data events have occurred 1810-1820. Data is processed by selecting the parameters, or dimensions within it that are of importance to the administrator and then stored to the data store when a predetermined threshold of events is reached 1820, 1830. The streaming strategy uses the quantity of data accumulated in a data stream management engine 1720 as the trigger 1810-1815 to commit the processed sensor data to storage 1815-1830. According to the embodiment, an administrator may preselect either event driven or stream driven commitment, as well as many other parameters pertaining to analysis of sensor data using the administration device 1712.

Under conditions of heterogeneous sensor data transmission, there will be times when the rate at which the incoming data to be committed to data store, exceeds the transmission capacity of a single data swimlane 1825. This possibility is accounted for by allowing the system to transparently assign more than one real swimlane to a single data transfer. For example if a single real swimlane can transfer 5 sensors worth of data per unit time and the data from 8 sensors must be committed in that unit time, the system can, if pre-set by the administrator, a metaswimlane, illustrated in FIG. 19 can use real 2 swimlanes, one to transfer 5 sensors worth of data to the data store and the other to transfer three sensors' worth of data to the data store, maintaining the appearance that a single swimlane is in use to the committing process.

All sensor data, regardless of delivery circumstances are stored in a multidimensional time series data store 1830 which is designed for very low overhead, rapid data storage and minimal maintenance needs to sap resources. The embodiment uses a key-value pair data store examples of which are Riak, Redis and Berkeley DB for their low overhead and speed although the invention is not specifically tied to a single data store type that is known in the art should another with better response to feature characteristics emerge. Due to factors easily surmised by those knowledgeable in the art, data store commitment reliability is dependent on data store data size under the conditions intrinsic to time series sensor data analysis. The number of data records must be kept relatively low for the herein disclosed purpose. As an example one group of developers restrict the size of their multidimensional time series key-value pair data store to approximately $8.64 \times 10^4$ records, equivalent to 24 hours of 1 second interval sensor readings or 60 days of 1 minute interval readings. In this development system the oldest data is deleted from the data store and lost. This loss of data is acceptable under development conditions but in a production environment, the loss of the older data is almost always significant and unacceptable. The invention accounts for this need to retain older data by stipulating that aged data be placed in long term storage. In the embodiment, the archival storage is included 1870. This archival storage as shown provided by data archive 1730 might be locally provided by the user, might be cloud based such as that offered by Amazon Web Services or Google or could be any other available very large capacity storage method known to those skilled in the art. Sensor data can be specifically retrieved, using complex query logic 1835 and transformed using such tools as mean reading of all query included sensors, variance of all readings of all sensors queried, standard deviation of queried sensors and more complex types such as standard linear interpolation, Kalman filtering and smoothing, may be applied. Data can then be represented in various formats such as, but not limited to text, JSON, KML, GEOJSON and TOPOJSON by the system depending on the ultimate use of the resultant information 1880.

FIG. 19 is a process flow diagram of a method for the use of metaswimlanes to transparently accommodate levels of data streaming which would overload a single swimlane according to an embodiment of the invention. As previously described in the text for FIG. 17 and FIG. 18, when attempting to commit data from sets of real time sensors that send data at irregular time intervals and probably heterogeneous amounts per unit time, it is likely that situations will arise when the instantaneous influx of data to be transferred from a data stream management engine 1910, also shown in context to an entire embodiment of the invention as 1720 in system 1700, to a multidimensional time series data store 1920 shown in context as 1725 in a system embodiment of the invention 1700, will exceed the instantaneous data capacity of a single data channel, or swimlane 1911*a* between the data stream management engine 1910 and the multidimensional time series data store 1920. Under those conditions, if a remedy could not be brought to bare, important, possibly crucial data could be lost. The remedy taken and shown in this embodiment is the ability of the system to, when configured, combine the transfer and commitment bandwidth of two or more real swimlanes 1915*a*, 1915*b* in a way that is transparent to the committing process. This means that the invention handles the physical transfer pathway as well as the logical details such as tracking the multiple key-value pairs, process identifications and any application specific bookkeeping involved as overhead to the process and then creating a data structure to have the data records act as a single entity in subsequent data manipulations.

FIG. 20 is a simplified example of the use a Kalman filter to extract and smooth estimated system state from noisy sensor data according to an embodiment of the invention. Because of its ability to extract reliably accurate, interpretable data in cases of noisy input data, heavy use is made of Kalman filters in data transformation functions of various embodiments of the invention. It is useful to provide a simple demonstration of how such filters might work in one or more embodiments of the invention. For exemplary purposes, let us imagine that miners in a deep underground mine dig into a large underground repository of carbon dioxide, which rushes into the lowest level of the mine displacing a significant amount of the atmosphere in the mine's lowest level; assume the $CO_2$ level there stabilizes at 50%. The mine company decides to use a combination of lithium hydroxide canisters and the mine shaft's ventilation to handle the problem. A system 1700 according to the invention, may be connected to an array of $CO_2$ sensors to monitor the progress of the cleanup. In the example, 50% $CO_2$ registers as 1000 on the $CO_2$ sensors and as a whole the manufacturer states the array will have a noise level of 400. It is believed that the efforts can remove 15.0% of the present $CO_2$ per hour.

Looking at the Kalman filter equations listed in 2010:
a is equal to the percent of CO2 that will be left, compared to the percent in the previous measurement period or 100%–15%=85%. So a=0.85.
$\hat{x}_k$ represents an estimated current result
$\hat{x}_{k-1}$ represents the previous estimated result
r is the publish noise level of the sensor or sensor array
$z_k$ represents the current observed result $p_k$ is the prediction error between the last previous expected result and the last previous observed result.

Lastly, gk is the factor by which the difference between the last expected result and the current observed result that when added to the last expected result will produce the current expected result.

For each data point plotted in analysis of the sensor data the expected results are calculated using the top equation in 2010 and the error prediction using the second equation. The lower equations are used to update the numbers used to calculate the next set of estimated values $\hat{x}_k$. Looking at 2020, 2020e shows calculated $CO_2$ values ($x_k$) determined by multiplying the previous $CO_2$ expected value by the expected reduction of 15% (a) 2030a. 2020d are the actual values reported by the $CO_2$ sensors 2030b at the displayed time points 2020f. The Kalman estimated values, starting at the initial reported $CO_2$ sensor value is shown 2020b. When graphed, this set of estimated values is depicted in line 2030c. The effect of Kalman filter smoothing can be seen by comparing the graphed actual $CO_2$ sensor readings 2030b to the graphed Kalman filter data 2030c. As the embodiment stores data long term, users of it can also take advantage of a variant of the Kalman filter known as Kalman soothing where data from an another time period is used to better visualize current data. An example would be to use correction data from hours four through eight of the $CO_2$ analysis to smooth hours 12 thorough 14, not depicted.

FIG. 21 is a diagram of an exemplary architecture of a business operating system 2100 according to an embodiment of the invention. Client access to the system 2105 both for system control and for interaction with system output such as automated predictive decision making and planning and alternate pathway simulations, occurs through the system's highly distributed, very high bandwidth cloud interface 2110 which is application driven through the use of the Scala/Lift development environment and web interaction operation mediated by AWS ELASTIC BEANSTALK™, both used for standards compliance and ease of development. Much of the business data analyzed by the system both from sources within the confines of the client business, and from cloud based sources, also enter the system through the cloud interface 2110, data being passed to the analysis and transformation components of the system, the directed computational graph module 2155, high volume web crawling module 2115 and multidimensional time series database 2120. The directed computational graph retrieves one or more streams of data from a plurality of sources, which includes, but is in no way not limited to, a number of physical sensors, web based questionnaires and surveys, monitoring of electronic infrastructure, crowd sourcing campaigns, and human input device information. Within the directed computational graph, data may be split into two identical streams, wherein one sub-stream may be sent for batch processing and storage while the other sub-stream may be reformatted for transformation pipeline analysis. The data is then transferred to general transformer service 2160 for linear data transformation as part of analysis or decomposable transformer service 2150 for branching or iterative transformations that are part of analysis. The directed computational graph 2155 represents all data as directed graphs where the transformations are nodes and the result messages between transformations edges of the graph. These graphs which contain considerable intermediate transformation data are stored and further analyzed within graph stack module 2145. High volume web crawling module 2115 uses multiple server hosted preprogrammed web spiders to find and retrieve data of interest from web based sources that are not well tagged by conventional web crawling technology. Multiple dimension time series database module 2120 receives data from a large plurality of sensors that may be of several different types. The module is designed to accommodate irregular and high volume surges by dynamically allotting network bandwidth and server processing channels to process the incoming data. Data retrieved by the multidimensional time series database 2120 and the high volume web crawling module 2115 may be further analyzed and transformed into task optimized results by the directed computational graph 2155 and associated general transformer service 2150 and decomposable transformer service 2160 modules.

Results of the transformative analysis process may then be combined with further client directives, additional business rules and practices relevant to the analysis and situational information external to the already available data in the automated planning service module 2130 which also runs powerful predictive statistics functions and machine learning algorithms to allow future trends and outcomes to be rapidly forecast based upon the current system derived results and choosing each a plurality of possible business decisions. Using all available data, the automated planning service module 2130 may propose business decisions most likely to result is the most favorable business outcome with a usably high level of certainty. Closely related to the automated planning service module in the use of system derived results in conjunction with possible externally supplied additional information in the assistance of end user business decision making, the business outcome simulation module 2125 coupled with the end user facing observation and state estimation service 2140 allows business decision makers to investigate the probable outcomes of choosing one pending course of action over another based upon analysis of the current available data. For example, the pipelines operations department has reported a very small reduction in crude oil pressure in a section of pipeline in a highly remote section of territory. Many believe the issue is entirely due to a fouled, possibly failing flow sensor, others believe that it is a proximal upstream pump that may have foreign material stuck in it. Correction of both of these possibilities is to increase the output of the effected pump to hopefully clean out it or the fouled sensor. A failing sensor will have to be replaced at the next maintenance cycle. A few, however, feel that the pressure drop is due to a break in the pipeline, probably small at this point, but even so, crude oil is leaking and the remedy for the fouled sensor or pump option could make the leak much worse and waste much time afterwards. The company does have a contractor about 8 hours away, or could rent satellite time to look but both of those are expensive for a probable sensor issue, significantly less than cleaning up an oil spill though and then with significant negative public exposure. These sensor issues have happened before and the business operating system 2100 has data from them, which no one really studied due to the great volume of columnar figures, so the alternative courses 2125, 2140 of action are run. The system, based on all available data predicts that the fouled sensor or pump are unlikely the root cause this time due to other available data and the contractor is dispatched. She finds a small breach in the pipeline. There will be a small cleanup and the pipeline needs to be shutdown for repair but multiple tens of millions of dollars have been saved. This is just one example of a great many of the possible use of the business operating system, those knowledgeable in the art will easily formulate more.

FIG. 22 is a process flow diagram showing an exemplary set of steps used in the function of the very high bandwidth cloud interface 2200, also depicted in FIG. 21, 2110. Data flowing into and out of the very high bandwidth cloud interface 2200 may come from human interactions through desktop or mobile computing devices 2202, reading data sent from remote sensor arrays 2203 and data retrieved from web pages 2204 both of which 2203, 2204 may reach a very high instantaneous volume for moderate time intervals which must be accommodated by the interface to assure reliable data capture. It should be noted that while the cloud 2201 may usually mean the internet, often the World Wide Web in the current context, it also extends here to data transmitted from the confines of the client business to the business operating system which may use a separate network topology. Within the very high bandwidth cloud interface, web apps, constructed and supported using mostly open source resources, present graphical interfaces for end users to both submit new information 2207 and to visualize the results of analyses and predictive decisions as well as simulations created by the business operating system 2208. Programming is also used to accept and properly route command line directives and parameters from analysts and programmers to the system as analyses are carried out 2208. Sensor data and raw webpage data being retrieved by the multiple dimension time series database module, depicted in 2120, and high volume web crawling module depicted in 2115, also may pass through the high volume interface 2205. While this embodiment represents the cloud interface as a monolithic portion of the business operating system architecture, the invention has no such requirement and thus in other embodiments, data, programming command and campaign parameters may enter the system from multiple portal to the cloud.

FIG. 23 is a method process flow diagram showing the operation of an automated planning service module according to an embodiment of the invention. The analytics data results from the system are supplied to the automated planning service module 2302 as depicted in 2130. Within the module the analytic data results are mapped to all possible business actions or decisions which are suggested by the broad findings and known within the system. Many of these actions may have been entered specifically for the current campaign 2302. Any external source information such as existing business practices that impact the decision, legal and regulatory considerations that impact the proposed action among an additional plurality of possible factors known to the art, are then incorporated into the action selection process 2303. Once the broadest set of possible prospective actions accounting for external parameters is known, information theory statistics algorithms and machine learning principles are employed on the analytic data developed by the system 2100 to reliably predict the probable outcomes of pursuing each choice and provide statistical data associated with each action 2304. The data pertaining to actions with a favorable outcome value above a predetermined threshold are sent to the simulation module 2125 and the observation and state estimation 2140 modules for appropriate presentation to end users as dictated by the authors of the related analytical campaign 2305.

FIG. 24 is a diagram of an exemplary architecture of a business operating system 2400 according to an embodiment of the invention. Client access to the system 2405 for specific data entry, system control and for interaction with system output such as automated predictive decision making and planning and alternate pathway simulations, occurs through the system's distributed, extensible high bandwidth cloud interface 2410 which uses a versatile, robust web application driven interface for both input and display of client-facing information and a data store 2412 such as, but not limited to MONGODB™, COUCHDB™, CASSANDRA™ or REDIS™ depending on the embodiment. Much of the business data analyzed by the system both from sources within the confines of the client business, and from cloud based sources, also enter the system through the cloud interface 2410, data being passed to the analysis and transformation components of the system, the directed computational graph module 2455, high volume web crawler module 2415, multidimensional time series database 2420 and the graph stack service. The directed computational graph module 2455 retrieves one or more streams of data from a plurality of sources, which includes, but is in no way not limited to, a plurality of physical sensors, web based questionnaires and surveys, monitoring of electronic infrastructure, crowd sourcing campaigns, and human input device information. Within the directed computational graph module 2455, data may be split into two identical streams in a specialized pre-programmed data pipeline 2455a, wherein one sub-stream may be sent for batch processing and storage while the other sub-stream may be reformatted for transformation pipeline analysis. The data is then transferred to the general transformer service module 2460 for linear data transformation as part of analysis or the decomposable transformer service module 2450 for branching or iterative transformations that are part of analysis. The directed computational graph module 2455 represents all data as directed graphs where the transformations are nodes and the result messages between transformations edges of the graph. The high volume web crawling module 2415 uses multiple server hosted preprogrammed web spiders, which while autonomously configured are deployed within a web scraping framework 2415a of which SCRAPY™ is an example, to identify and retrieve data of interest from web based sources that are not well tagged by conventional web crawling technology. The multiple dimension time series database module 2420 receives data from a large plurality of sensors that may be of several different types. The module is designed to accommodate irregular and high volume surges by dynamically allotting network bandwidth and server processing channels to process the incoming data. Inclusion of programming wrappers for languages examples of which are, but not limited to C++, PERL, PYTHON, and ERLANG™ allows sophisticated programming logic to be added to the default function of the multidimensional time series database 2420 without intimate knowledge of the core programming, greatly extending breadth of function. Data retrieved by the multidimensional time series database 2420 and the high volume web crawling module 2415 may be further analyzed and transformed into task optimized results by the directed computational graph 2455 and associated general transformer service 2450 and decomposable transformer service 2460 modules. Alternately, data from the multidimensional time series database and high volume web crawling modules may be sent, often with scripted cuing information determining important vertexes 2445a, to the graph stack service module 2445 which, employing standardized protocols for converting streams of information into graph representations of that data, for example, open graph internet technology although the invention is not reliant on any one standard. Through the steps, the graph stack service module 2445 represents data in graphical form influenced by any pre-determined scripted modifications 2445a and stores it in a graph data store 2445b such as GIRAPH™ or a key value pair type data store REDIS™, or RIAK™, among others, all of which are suitable for storing graph represented information.

Results of the transformative analysis process may then be combined with further client directives, additional business rules and practices relevant to the analysis and situational information external to the already available data in the automated planning service module 2430 which also runs powerful information theory 2430*a* based predictive statistics functions and machine learning algorithms to allow future trends and outcomes to be rapidly forecast based upon the current system derived results and choosing each a plurality of possible business decisions. The using all available data, the automated planning service module 2430 may propose business decisions most likely to result is the most favorable business outcome with a usably high level of certainty. Closely related to the automated planning service module in the use of system derived results in conjunction with possible externally supplied additional information in the assistance of end user business decision making, the action outcome simulation module 2425 with its discrete event simulator programming module 2425*a* coupled with the end user facing observation and state estimation service 2440 which is highly scriptable 2440*b* as circumstances require and has a game engine 2440*a* to more realistically stage possible outcomes of business decisions under consideration, allows business decision makers to investigate the probable outcomes of choosing one pending course of action over another based upon analysis of the current available data. For example, the pipelines operations department has reported a very small reduction in crude oil pressure in a section of pipeline in a highly remote section of territory. Many believe the issue is entirely due to a fouled, possibly failing flow sensor, others believe that it is a proximal upstream pump that may have foreign material stuck in it. Correction of both of these possibilities is to increase the output of the effected pump to hopefully clean out it or the fouled sensor. A failing sensor will have to be replaced at the next maintenance cycle. A few, however, feel that the pressure drop is due to a break in the pipeline, probably small at this point, but even so, crude oil is leaking and the remedy for the fouled sensor or pump option could make the leak much worse and waste much time afterwards. The company does have a contractor about 8 hours away, or could rent satellite time to look but both of those are expensive for a probable sensor issue, significantly less than cleaning up an oil spill though and then with significant negative public exposure. These sensor issues have happened before and the business operating system 2400 has data from them, which no one really studied due to the great volume of columnar figures, so the alternative courses 2425, 2440 of action are run. The system, based on all available data, predicts that the fouled sensor or pump is unlikely to be the root cause this time due to other available data, and the contractor is dispatched. She finds a small breach in the pipeline. There will be a small cleanup and the pipeline needs to be shutdown for repair but multiple tens of millions of dollars have been saved. This is just one example of a great many of the possible use of the business operating system, those knowledgeable in the art will easily formulate more.

FIG. 25 is a process flow diagram showing an exemplary set of steps by an embodiment of the invention to monitor security exploits against a business's KERBEROS based domain controller 2500. These exploits occur when an intruder is able to obtain a functional user level authentication credential (ticket-granting-ticket exploit) without passing challenge, is able to gain access to system or network services for which they are not authorized (service-ticket exploit) or are able to steal user sign on credentials (principle-key exploit) and masquerade as that user. To monitor for these and possible other security related activities the multidimensional time series database (MDTSDB) as depicted in FIG. 24, 2420 may be programmed to retrieve all KERBEROS™ domain controller ticket requests, including ticket-granting-ticket requests, service-session ticket requests, and user sign on attempts from one or more of the business's domain controllers. With that basic information, the MDTSDB may also retrieve information such as but not necessarily limited to: the userid attached to each request, the time of the request, the workstation from which the request was made, and for derivative credentials such as a service-ticket, the requesting ticket-granting-ticket credential. Using pre-programmed logic specific to the circumstances, the MDTSDB may transform the data in some way. That data may then go to the graph stack service module depicted in 2445 which may map the data into a relational graph where the objects, for example a user 2512, 2518 the KERBEROS™ ticket granting service (KTGS, 2510) and requested services 2514, 2516, 2520, 2524 are represented as graph vertices and the information passage relationships between them 2511, 2513, 2515, 2517, 2519, 2521, 2523 forming the edges of the graph 2503. Such graph analysis may allow abnormal activity to be rapidly identified as shown in edge 2513 and vertex 2514 is an extremely simplified example of service ticket exploit where a user illegally accesses a system or network service for which she has no authority and 2521 where an intruder gains access to the system using an exploitively gained ticket-granting-ticket and then uses a system service. Panel 2525 shows a highly simplified example of time series authorization data that may be attached to a specific service and shows the granting ticket used to access the service, the service key that allows access the user that requested the service and a timestamp for receipt of the information.

Events including security breaches are often preceded by smaller occurrences that either go totally unnoticed or are not recognized as significant to the future calamity. Under this embodiment the directed computational graph module depicted in 2455, with its multi-transformation capable data pipeline depicted in 2455*a*, 2450 (non-linear transformations), 2460 (linear transformations) and machine learning abilities may be used to deeply analyze the data retrieved by the MDTSDB depicted in 2420 in complex ways which may allow prediction of an impending security exploit. As an extremely simple example, mass sign on attempts from ip address ranges of an organization known to infiltrate KERBEROS™ domain controllers similar to that of the client business may occur during off hours every third day and this may be uncovered during directed computational graph 2455 analysis. Output (not depicted) would be formatted to best serve its pre-decided purpose.

FIG. 26 is a process flow diagram of a preferred method for use of the invention to monitor enterprise IT infrastructure both hardware and software, especially customer facing services supported by this infrastructure for slowdown, bottleneck or failure. In one embodiment, IT infrastructure including, but not limited to workstations 2601*a*, servers 2601*b*, 2601*c* and peripherals which may include printers 2601*d* are monitored by multidimensional time series database module (MDTSDB), depicted in 2420, 2601 possibly using a standard network messaging protocol such as SNMP, as an example, or a specifically programmed adaptor present in the MDTSDB for this purpose. The MDTSDB may transform data as it is captured depending on the requirements of the task prior to the data passing to other modules of the embodiment such as the graph stack service module depicted in 2445, 2602 where the data from the MDTSDB is processed into a open graph IT ontology compliant relational graph representation as a prelude to further analysis. The relational graph is created within the graph stack service by assigning the objects of the system under analysis, for example: data centers, servers, workstations, and peripherals, as vertices of the graph and the relationships between them as edges. A generic example of such a relational graph if depicted in 2620, 2620*a* through 2620*k*. Looking at 2620*a* through 2620*k*, line 2620*a* depicts the relationship between the Data Center 1 vertex 2620 and the generic "System 1" vertex 2620*b*, thus 2620*a* may be thought of as the "Data Center 1"—"System 1" relation. From "System 1" 2620*b*, the graph progresses a complexity gradient first encountering metric group vertices 2620*c*, 2620*g*, 2620*i* and then the individual metrics measured within those groups, 2620*d*, 2620*e*, 2620*k*. Another relationship between "System 1" 2620*b* and "metric group n" 2620*i* is depicted 2620*h* this is the "System1"-"metric group n" relation. Finally, an generic example of specific MDTSDB captured data, stored in the vertices is shown in 2620*f* and is expanded from "metric 2" 2620*e*.

Now familiar with a general relational graph example, an application of graph creation from IT infrastructure monitoring application specific example MDTSDB (see 2420) captured data is depicted 2620, 26201 through 2620*z*. Starting at "Titan Server" 26201, which forms a graph vertex and also which, consulting the graph, is shown located in "Data Center 1" 2620, which is another, more complex, graph vertex. A representative, though certainly not exhaustive, sample of the Titan Server's 26201 constituent hardware parts are depicted 2620*m*, 2620*z*, 2620*u*. Relationships are denoted by the lines, or edges between the vertices. The vertices that occur as constituents of "Titan Server" 26201 in this example are "CPU" 2620*m*, "memory" 2620*z* and "peripheral" 2620*u* with the direct connection relationships denoted by the graph edges between them and "Titan Server" 26201. From the graph, it can be easily seen that "Titan Server" 26201 has a CPU 2620*m* with two cores, "core 1" 2620n, and "core 2" 2620*p*, one occupied memory slot, 'slot 2" 2620*q* and a directly connected printer "printer 47" 2620*s*, "scanner 120" 2620*x* and "RAID 3" 2620*v* designated as peripherals "periph." 2620*u*. MDTSDB (see 2420) captured data pertaining to "core 1" 2620*n*, the memory in memory 2620*z* "slot 2" 2620*q*, "printer 47" 2620*s*, "scanner 120" 2620*x* and "RAID 3" 2620*v* are displayed 2620*o*, 2620*r*, 2620*t*, 2620*y* and 2620*w* respectively. Focusing on the component data display for "printer 47" 2620*t* one can determine that the current toner cartridge has approximately 35% toner remaining and the current fuser has printer 10,000 pages. The timestamp indicates when the data was collected. The data displays for the other components show comparably useful information. It must be noted that the server specific graph shown 26201 through 2620*z* is extensively simplified in that only a very few of the possible component groups (CPU, memory, peripherals to be monitored are depicted, a minimal number of underlying components 2620*n*, 2620*p*, 2620*q*, 2620*s* 2620*x* 2620*v* are present and data shown in the data displays 2620*o*, 2620*r*, 2620*t*, 2620*y*, 2620*w* is minimal, incomplete and haphazardly chosen. Also vertex data displays 2620*o*, 2620*r*, 2620*t*, 2620*y*, 2620*w* occur only at the termini. All of these characteristics of the example graph are present solely for presentation clarity purposes and in no way should be interpreted as limiting the invention. The invention is able to monitor any reported component characteristic known to those knowledgeable in the field. The graph stack service module see 2445 is able to map relationships of any foreseeable complexity and while the example data displays 2620*o*, 2620*r*, 2620*t*, 2620*y*, 2620*w* showed a few lines of data and all displays were at terminal vertices, the length or content of the data displayed in not limited by the invention and data displays can be associated with any vertex of the graph, so, for example one could cause a possibly very lengthy data display showing all pre-determined applicable data to be shown for "Titan Server" vertex 26201.

While displaying the current operating data of a business's infrastructure is a very powerful tool and can disclose certain issues, the ability to predict likely future significant slowdowns, deficiencies and outages through the intelligent interpretation of small variances in current data and event chain progressions so as to prevent noticeable degradation of service is an extremely powerful tool offered by the invention. Under this embodiment the directed computational graph module depicted in 2455, with its multi-transformation capable data pipeline depicted in 2455*a*, 2450 (non-linear transformations), 2460 (linear transformations) and machine learning abilities may be used to deeply analyze the data retrieved by the MDTSDB depicted in 2420 in complex ways which, when coupled with historic data that may span months or years may allow prediction of an impending degradation or loss of a business's customer facing IT services, whether hardware or software is the root cause. As an extremely simple example, web site based requests for further information about a business's newer product lines may, when it reaches a certain level may cause thrashing and bottlenecks in the database storing those documents which up until this point has caused negligible loss of retrieval speed, but recent historical data shows demand for the documents is building and the issue in the database is escalating at a disproportional rate. Within the embodiment, data from the MDTSDB is retrieved by the directed computational graph module 2603 which then performs more complex analyses on the data and determines that the issue lies in that the customer document mailing software in use has a long revision history and is writing customer contact information to several tables in the database, some no longer used and some better done asynchronously, also the routines within the software for mailing materials is also outdated an inefficient, again taxing the database but also not using all of the currently available printer queues, delaying print job confirmation and again indirectly slowing the database as it records those confirmations. Last, the database manager is no longer optimally tuned for current business realities. These example emerging issues would have eventually become noticeable and serious. It should be remembered that as a single example, the above should in no way be regarded as defining of constraining the capabilities of the invention.

Output would be formatted to best serve its pre-decided purpose 2604 and may involve use of the action outcome simulation module to create a simulation of future infrastructure events 2425 and the game engine and scriptability of observation and state estimation service module 2440 to present the results in a easily comprehended, dramatic and memorable way.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Referring now to FIG. 27, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one embodiment, a computing device 10 may be configured or designed to function as a server system utilizing CPU 12, local memory 11 and/or remote memory 16, and interface(s) 15. In at least one embodiment, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a specific embodiment, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a Qualcomm SNAPDRAGON™ or Samsung EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown and described above illustrates one specific architecture for a computing device 10 for implementing one or more of the inventions described herein, it is by no means the only device architecture on which at least a portion of the features and techniques described herein may be implemented. For example, architectures having one or any number of processors 13 may be used, and such processors 13 may be present in a single device or distributed among any number of devices. In one embodiment, a single processor 13 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

In some embodiments, systems according to the present invention may be implemented on a standalone computing system. Referring now to FIG. 28, there is shown a block diagram depicting a typical exemplary architecture of one or more embodiments or components thereof on a standalone computing system. Computing device 20 includes processors 21 that may run software that carry out one or more functions or applications of embodiments of the invention, such as for example a client application 24. Processors 21 may carry out computing instructions under control of an operating system 22 such as, for example, a version of Microsoft's WINDOWS™ operating system, Apple's Mac OS/X or iOS operating systems, some variety of the Linux operating system, Google's ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above). Examples of storage devices 26 include flash memory, magnetic hard drive, CD-ROM, and/or the like.

In some embodiments, systems of the present invention may be implemented on a distributed computing network, such as one having any number of clients and/or servers. Referring now to FIG. 29, there is shown a block diagram depicting an exemplary architecture 30 for implementing at least a portion of a system according to an embodiment of the invention on a distributed computing network. According to the embodiment, any number of clients 33 may be provided. Each client 33 may run software for implementing client-side portions of the present invention; clients may comprise a system 20 such as that illustrated above. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, Wimax, LTE, and so forth), or a local area network (or indeed any network topology known in the art; the invention does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in an embodiment where client applications 24 are implemented on a smartphone or other electronic device, client applications 24 may obtain information stored in a server system 32 in the cloud or on an external service 37 deployed on one or more of a particular enterprise's or user's premises.

In some embodiments of the invention, clients 33 or servers 32 (or both) may make use of one or more specialized services or appliances that may be deployed locally or remotely across one or more networks 31. For example, one or more databases 34 may be used or referred to by one or more embodiments of the invention. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, Hadoop Cassandra, Google BigTable, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 36 or configuration system 35 or approach is specifically required by the description of any specific embodiment.

FIG. 30 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of the present invention may be distributed among any number of client and/or server components. For example, various software modules may be implemented for performing various functions in connection with the present invention, and such modules may be variously implemented to run on server and/or client.

The skilled person will be aware of a range of possible modifications of the various embodiments described above. Accordingly, the present invention is defined by the claims and their equivalents.

What is claimed is:

1. A system comprising:
a distributed computing cluster comprising a first plurality of computer systems, a second plurality of computer systems, and a third plurality of computer systems,
wherein the first plurality of computer systems is configured to execute software instructions that:
receive a first data stream,
process at least a portion of the first data stream using a first transformation pipeline,
wherein the first transformation pipeline generates a database query,
and cause the database query to be transmitted to the second plurality of computer systems,
wherein the second plurality of computer systems is configured to execute software instructions that:
receive a second data stream and store, in a time-series database, at least a portion of the data received in the second data stream,
receive the database query, and
cause at least a portion of any data responsive to the database query in the time-series database to be transmitted to the third plurality of computer systems as a result of the database query,
wherein the third plurality of computer systems is configured to execute software instructions that:
receive a third data stream,
receive the result of the database query,
process at least a portion of the third data stream using a second transformation pipeline to generate first pipeline output messages,
wherein the third plurality of computer systems provides at least a portion of the result of the database query as an input to the second transformation pipeline, and transmit the first pipeline output messages.

2. The system of claim 1, wherein the first plurality of computer systems and the third plurality of computer systems are identical.

3. The system of claim 1, wherein at least one of the first data stream, the second data stream, and the third data stream is received from an input feed.

4. The system of claim 1, wherein the first plurality of computer systems and the second plurality of computer systems are not identical pluralities.

5. The system of claim 1, wherein the first plurality of computer systems and the second plurality of computer systems are distinct pluralities.

6. The system of claim 1, wherein the second transformation pipeline is configured to output a determination about whether one or more authentication credentials has been presented by an unauthorized actor.

7. The system of claim 1,
wherein the distributed computing cluster further comprises a fourth plurality of computer systems, and
wherein the fourth plurality of computer systems executes software instructions that process the first pipeline output messages to output a determination about whether one or more authentication credentials has been presented by an unauthorized user.

8. The system of claim 1, wherein the second transformation pipeline is configured to output a determination about whether one or more authentication credentials has been forged.

9. The system of claim 1,
wherein the distributed computing cluster further comprises a fourth plurality of computer systems, and
wherein the fourth plurality of computer systems executes software instructions that process the first pipeline output messages to output a determination about whether one or more authentication credentials has been forged.

10. The system of claim 1, wherein the second transformation pipeline is configured to output a determination about whether one or more authentication credentials has been accessed by an unauthorized actor.

11. The system of claim 1,
wherein the distributed computing cluster further comprises a fourth plurality of computer systems, and
wherein the fourth plurality of computer systems executes software instructions that process the first pipeline output messages to output a determination about whether one or more authentication credentials has accessed by an unauthorized actor.

12. The system of claim 1, wherein the second transformation pipeline is configured to output a prediction about an impending security exploit.

13. The system of claim 12, wherein the result of the database query includes information about one or more sign-on attempts.

14. The system of claim 13, wherein the second plurality of computer systems utilizes information about network address ranges associated with an organization known to infiltrate authentication controllers to locate the result of the database query.

15. The system of claim 1, wherein the second transformation pipeline is configured to output a prediction about future events.

16. The system of claim 1,
wherein the distributed computing cluster further comprises a fourth plurality of computer systems, and
wherein the fourth plurality of computer systems executes software instructions that process the first pipeline output messages to output a prediction about future events.

* * * * *